United States Patent
Paul et al.

(10) Patent No.: US 7,042,842 B2
(45) Date of Patent: May 9, 2006

(54) FIBER CHANNEL SWITCH

(75) Inventors: Harry V. Paul, Haddonfield, NJ (US);
Anthony G. Tornetta, King of Prussia, PA (US); Henry G. Gonzalez, Belle Mead, NJ (US); Larry Cantwell, Moorestown, NJ (US); Gregory L. Koellner, Medford, NJ (US); Steven G. Schmidt, Westampton, NJ (US); Jereld W. Pearson, Somerdale, NJ (US); Jason Workman, Bensalem, NJ (US); James C. Wright, Sewell, NJ (US); Scott Carlsen, Mount Laurel, NJ (US); Govindaswamy Nallur, Maple Shade, NJ (US)

(73) Assignee: Computer Network Technology Corporation, Minneapolis, MN (US)

( * ) Notice: Subject to any disclaimer, the term of this patent is extended or adjusted under 35 U.S.C. 154(b) by 104 days.

(21) Appl. No.: 10/873,532

(22) Filed: Jun. 21, 2004

(65) Prior Publication Data

US 2005/0047334 A1 Mar. 3, 2005

Related U.S. Application Data

(63) Continuation-in-part of application No. 10/020,968, filed on Dec. 19, 2001, which is a continuation-in-part of application No. 09/995,605, filed on Nov. 29, 2001.

(60) Provisional application No. 60/581,831, filed on Jun. 21, 2004, provisional application No. 60/297,454, filed on Jun. 13, 2001.

(51) Int. Cl.
G06F 11/00 (2006.01)
G06F 15/173 (2006.01)
H04L 12/54 (2006.01)

(52) U.S. Cl. ............... 370/229; 370/235; 370/392; 370/428; 709/238; 709/241

(58) Field of Classification Search ............... 370/218, 370/229, 231, 235, 236, 389, 392–412, 426, 370/462, 395.4; 709/235, 238, 240, 241
See application file for complete search history.

(56) References Cited

U.S. PATENT DOCUMENTS 4,710,868 A 12/1987 Cocke et al.
(Continued)

FOREIGN PATENT DOCUMENTS

EP 0 856 969 A1 8/1998
(Continued)

OTHER PUBLICATIONS

Gregory L. Frazier & Yuval Tamir, The Design & Implementation of a Multi-Queue Buffer for VLSI Communication Switches, Proceedings of the International Conference on Computer Design, Oct. 1989, pp. 466-471, IEEE, New York, NY.

(Continued)

*Primary Examiner*—Afsar Qureshi

(57) ABSTRACT

A Fiber Channel switch is presented that tracks the congestion status of destination ports in an XOFF mask at each input. A mapping is maintained between virtual channels on an ISL and the destination ports to allow changes in the XOFF mask to trigger a primitive to an upstream port that provides virtual channel flow control. The XOFF mask is also used to avoid sending frames to a congested port. Instead, these frames are stored on a single deferred queue and later processed in a manner designed to maintain frame ordering. A routing system is provided that applies multiple routing rules in parallel to perform line speed routing. The preferred switch fabric is cell based, with techniques used to manage path maintenance for variable length frames and to adapt to varying transmission rates in the system. Finally, the switch allows data and microprocessor communication to share the same crossbar network.

14 Claims, 38 Drawing Sheets

U.S. PATENT DOCUMENTS

| | | | |
|---|---|---|---|
| 5,455,820 A | | 10/1995 | Yamada |
| 5,533,201 A | | 7/1996 | Benton et al. |
| 5,781,549 A | | 7/1998 | Dai |
| 5,844,887 A | * | 12/1998 | Oren et al. .................. 370/218 |
| 5,974,467 A | | 10/1999 | Haddock et al. |
| 5,983,260 A | | 11/1999 | Hauser et al. |
| 5,999,527 A | | 12/1999 | Petersen |
| 6,067,286 A | | 5/2000 | Jones et al. |
| 6,160,813 A | | 12/2000 | Banks et al. |
| 6,335,992 B1 | | 1/2002 | Bala et al. |
| 6,370,145 B1 | * | 4/2002 | Dally et al. .................. 370/400 |
| 2001/0043565 A1 | * | 11/2001 | Chen et al. .................. 370/230 |
| 2001/0050913 A1 | * | 12/2001 | Chen et al. .................. 370/360 |
| 2002/0156918 A1 | | 10/2002 | Valdevit et al. |
| 2003/0026267 A1 | * | 2/2003 | Oberman et al. ........... 370/397 |
| 2003/0202474 A1 | | 10/2003 | Kreuzenstein et al. |
| 2004/0017771 A1 | | 1/2004 | Martin et al. |
| 2004/0024906 A1 | | 2/2004 | Valedevit et al. |
| 2004/0081096 A1 | | 4/2004 | Martin |

FOREIGN PATENT DOCUMENTS

| | | |
|---|---|---|
| EP | 0 959 591 A1 | 11/1999 |
| EP | 1 016 980 A2 | 7/2000 |
| WO | WO 01/67672 A2 | 9/2001 |
| WO | WO 03/017103 A1 | 2/2003 |
| WO | WO 03/017583 A1 | 2/2003 |

OTHER PUBLICATIONS

Kohei Shiomoto, Masayuki Murata, Yuji Oie and Mideo Miyahaha, Performance Evaluation of Cell Bypass Queuing Discipline for Buffered Banyan Type ATM Switches, Proceedings INFOCOM '90, Feb. 25, 2005, pp. 677-685 vol. 2, IEEE, New York, NY.

Erwin P. Rathgeb, Redundancy Concepts for a Large ATM Switching Node, Sep. 21, 1997, XVI World Telecom Congress Proceedings.

Wolfgang Fischer, Oswald Fundneider, Ernst-Heinrich Goeldner & K.A. Lutz, A Scalable ATM Switching System Architecture, IEEE Journal on Selected Areas in Communications, Oct. 1991, pp. 1299-1307, vol. 9, No. 8, New York, NY.

M. Shreedhar & George Varghese, Efficient Fair Queuing Using Deficit Round-Robin, IEEE/ACM Transactions on Networking, Jun. 1996, pp. 375-385, vol. 4, No. 3.

Providing Reliable, High-Speed Operations in Large Sans, 2002 Brocade Communications Systems, Inc., Mar. 2002.

Kenneth Y. Yun, A Terabit Multiservice Switch, IEEE Micro, Jan.-Feb. 2001, pp. 58-70.

Packet Switch Chips, Feb. 2, 2003, www.lightreading.com/document.asp?doc_id=25989&print=true, Downloaded Feb. 16, 2005.

The Virtual Output Queue, http://ipoint.vlsi.uiuc.edu/abr/virtqueue.html, Downloaded Feb. 16, 2005.

Applied Micro Circuits Corporation, Cyclone (nPX8005) Switch Fabric, https://www.amcc.com/cardiff/docManagement/displayProduct Summary.jsp?prodId=nPX8005, Downloaded Feb. 16, 2005.

* cited by examiner

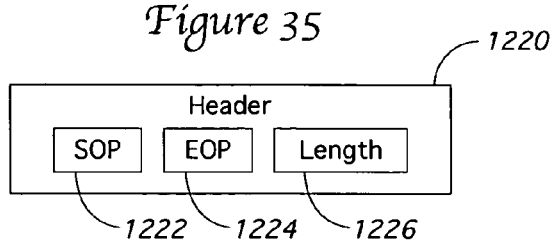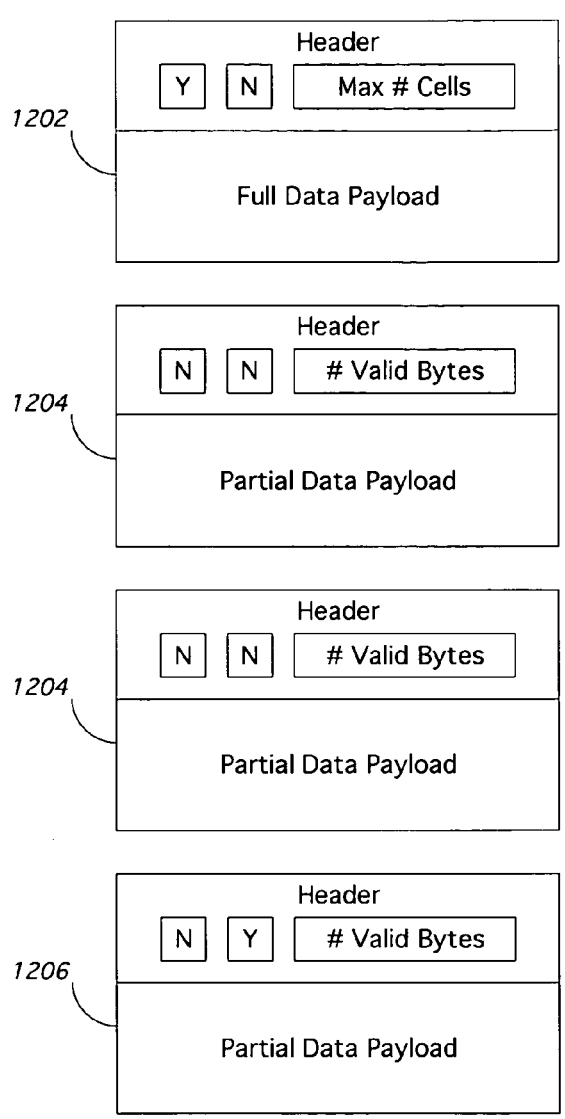

FIBER CHANNEL SWITCH

CLAIM OF PRIORITY

This application claims the benefit of U.S. Provisional Application No. 60/581,831, filed on Jun. 21, 2004, entitled "Improved Data Switch," which is hereby incorporated by reference. This application is also a continuation-in-part application based on U.S. patent application Ser. No. 10/020,968, entitled "Deferred Queuing in a Buffered Switch," filed on Dec. 19, 2001, which is hereby incorporated by reference. This application is a continuation-in-part application based on U.S. patent application Ser. No. 09/995,605, entitled "Method and Apparatus for Rendering a Cell-Based Switch Useful for Frame Based Application Protocols," filed Nov. 29, 2001, which is hereby incorporated by reference and which in turn claims benefit to U.S. provisional application No. 60/297,454, filed Jun. 13, 2001.

FIELD OF THE INVENTION

The present invention relates to a data switch. More particularly, the present invention relates to a Fibre Channel switch having the ability to track congested ports, manage flow control over virtual channels on an interswitch link, avoid head of line blocking through deferred queuing, perform line speed routing, effectively use a cell-based switch fabric, and allow data and microprocessor communication to share the same crossbar network.

BACKGROUND OF THE INVENTION

Fibre Channel is a switched communications protocol that allows concurrent communication among servers, workstations, storage devices, peripherals, and other computing devices. Fibre Channel can be considered a channel-network hybrid, containing enough network features to provide the needed connectivity, distance and protocol multiplexing, and enough channel features to retain simplicity, repeatable performance and reliable delivery. Fibre Channel is capable of full-duplex transmission of frames at rates extending from 1 Gbps (gigabits per second) to 10 Gbps. It is also able to transport commands and data according to existing protocols such as Internet protocol (IP), Small Computer System Interface (SCSI), High Performance Parallel Interface (HIPPI) and Intelligent Peripheral Interface (IPI) over both optical fiber and copper cable.

In a typical usage, Fibre Channel is used to connect one or more computers or workstations together with one or more storage devices. In the language of Fibre Channel, each of these devices is considered a node. One node can be connected directly to another, or can be interconnected such as by means of a Fibre Channel fabric. The fabric can be a single Fibre Channel switch, or a group of switches acting together. Technically, the N_port (node ports) on each node are connected to F_ports (fabric ports) on the switch. Multiple Fibre Channel switches can be combined into a single fabric. The switches connect to each other via E-Port (Expansion Port) forming an interswitch link, or ISL.

Fibre Channel data is formatted into variable length data frames. Each frame starts with a start-of-frame (SOF) indicator and ends with a cyclical redundancy check (CRC) code for error detection and an end-of-frame indicator. In between are a 24-byte header and a variable-length data payload field that can range from 0 to 2112 bytes.

The header includes a 24 bit source identifier (S_ID) that identifies the source for the frame, as well as a 24 bit destination identifier (D_ID) that identifies the desired destination for the frame. These port identifiers are uniquely assigned to every node in a Fibre Channel fabric. Under the standard Fibre Channel switch fabric addressing scheme, each port identifier is considered to contain three 8-bit words: a domain address or Domain_ID (bits 23–16 of the port ID), an area address or Area_ID (bits 15–8), and a port address or Port_ID (bits 0–7). Each switch in a Fibre Channel fabric is generally assigned a unique domain address. Groups of ports can be assigned to a single area within the switch. The addressing scheme allows 256 ports in each area, 256 areas within each switch, and 239 switches in a fabric (this is fewer than 256 switches because some switch address are reserved). The scheme allows certain routing decisions to be made by examining only a single 8-bit word. For example, a frame could be routed to the appropriate E_Port after examining only the domain address that identifies the switch on which the destination is located.

Fibre Channel switches use the D_ID found in the header of a Fibre Channel frame to route the frame from a source port to a destination port. Typically, this is accomplished using a lookup table at each input port. The D_ID is used as an index to the table, and the table returns the appropriate output port in the switch. This output port will either be directly connected to the node identified by the D_ID, or to another switch along the path to the identified destination. Routing tables are shared between multiple switches in a fabric over an ISL so that the switches can learn about the nodes and switches that make up the fabric.

Routing in modern Fibre Channel switches involves more issues than simply determining a destination port for each D_ID. This is because of the advent of virtual channels and ISL grouping. Virtual channels are used to divide up a single physical link between two ports into multiple logical or virtual channels. In most implementations, virtual channels are used to shape traffic across a port, or to provide more useful flow control across the port. ISL grouping is the ability to establish multiple ISL connections between the same two switches. Rather than treating each path as a separate ISL, ISL groups can be created that treat the separate physical paths as single logical path. Although ISL groups simplify the administration of a fabric and allow a greater ability to load balance across multiple interswitch links, it is still necessary to provide a mechanism to select a particular ISL for each frame to be transmitted over the ISL group. The advent of virtual channels and flow groups has made routing decisions in Fibre Channel switches more complicated. This complication means that traditional methods of routing frames have become too slow, and have become a source of undesired latency within a switch. What is needed is an improved technique for routing within a Fibre Channel switch that would avoid these problems.

When Fibre Channel frames are sent between ports, credit-based flow control is used to prevent the recipient port from being overwhelmed. Two types of credit-based flow control are supported in Fibre Channel, end-to-end (EE_Credit) and buffer-to-buffer (BB_Credit). In EE_Credit, flow is managed between two end nodes, and intervening switch nodes do not participate. In BB_Credit, flow control is maintained between each port. Before the sending port is allowed to send data to the receiving port, the receiving port must communicate to the sending port the size of its input buffer in frames. The sending port starts with this number of credits, and then decrements its credit count for each frame it transmits. Each time the receiving port has successfully removed a frame from its buffer, it sends a credit back to the sending port. This allows the sending port to increment its credit count. As long as the sending port stops sending data when its credit count hits zero, it will never overflow the buffer of the receiving port.

Although flow control should prevent the loss of Fibre Channel frames from buffer overflow, it does not prevent another condition known as blocking. Blocking occurs, in part, because Fibre Channel switches are required to deliver frames to any destination in the same order that they arrive from a source. One common approach to insure in order delivery in this context is to process frames in strict temporal order at the input or ingress side of a switch. This is accomplished by managing its input buffer as a first in, first out (FIFO) buffer.

Sometimes, however, a switch encounters a frame that cannot be delivered due to congestion at the destination port. In this switch, the frame at the top of the input FIFO buffer cannot be transmitted to one port because this destination is congested and not accepting more traffic. Because the buffer is a first in, first out buffer, the top frame will remain at the top of the buffer until this port becomes un-congested. This is true even though the next frame in the FIFO is destined for a port that is not congested and could be transmitted immediately. This condition is referred to as head of line blocking.

Various techniques have been proposed to deal with the problem of head of line blocking. Scheduling algorithms, for instance, do not use true FIFOs. Rather, they search the input FIFO buffer looking for matches between waiting data and available output ports. If the top frame is destined for a busy port, the scheduling algorithm merely scans the FIFO buffer for the first frame that is destined for an available port. Such algorithms must take care to avoid sending Fibre Channel frames out of order. Another approach is to divide the input buffer into separate buffers for each possible destination. However, this requires large amounts of memory and a good deal of complexity in large switches having many possible destination ports.

Congestion and blocking are especially troublesome when the destination port is an E_Port providing an inter-switch link to another switch. One reason that the E_Port can become congested is that the input port on the second switch has filled up its input buffer. The flow control between the switches prevents the first switch from sending any more data to the second switch. Often times the input buffer on the second switch becomes filled with frames that are all destined for a single congested port on that second switch. This filled buffer has congested the ISL, so that the first switch cannot send any data to the second switch—including data that is destined for an un-congested port on the second switch. Several manufacturers have proposed the use of virtual channels to prevent the situation where congestion on an interswitch link is caused by traffic to a single destination. In these proposals, traffic on the link is divided into several virtual channels, and no virtual channel is allowed to interfere with traffic on the other virtual channels. However, these techniques do not efficiently track the status of the virtual channels and communicate status changes between the switches.

Switch fabrics that support protocols such as Fibre Channel are generally frame-based and allow variable length frames to be switched from one port to another. However, there are also techniques that use fixed length cells to switch variable length frames, such as that described for example in U.S. Pat. No. 5,781,549. When using fixed length cells for data transmission, the cell size is kept relatively small. In the Ethernet switch described in the '549 patent, for example, variable length Ethernet frames are segmented into 60 bit cells for transmission through the switch. This segmentation is performed by a packet processing unit that is responsible for a group of eight Ethernet ports. Each cell contains a cell header, which contains a packet data byte count and a cell type. The packet data byte count indicates the number of valid data bytes found within the cell. The cell type indicates the type of data found within the cells. There are two cell types that indicate the cell contains actual Ethernet payload data. The first type indicates that the cell does not contain the end of the Ethernet frame. The second type indicates that the cell is the last cell in the Ethernet frame.

The cells are transmitted to Ethernet ports managed by other packet processing units over a shared cell bus. A request to transmit a cell over the cell bus is made by the packet processing unit to a central routing controller. This controller arbitrates competing requests for the shared bus, and grants access to the bus through an acknowledgement signal sent to the selected packet processing unit. Once granted access to the bus, the packet processing unit transmits its data cells over the cell bus. Other packet processing units monitor traffic on the cell bus for cells destined for one of their ports. When cells are discovered, they are reassembled back into Ethernet packets and transmitted out the appropriate Ethernet port.

The Ethernet switch in the '549 patent did not describe the use of a true cell-based switch, since the shared bus configuration meant it was not possible to simultaneously route a plurality of cells between different pairs of source and destination ports. However, true cell-based switches, such as ATM switches, use crossbars that are well known in the prior art. These switches simultaneously route multiple cells through the switch between different pairs of source and destination ports.

Because of the efficiency of these cell-based switches, several vendors have proposed the use of cell-based switches to switch data packets or frames of variable lengths. Like the '549 patent, these proposals segment the frames into fixed-size cells and then transmit the cells through the cell-based switch. Such methods typically require that the number of cells in the packet be known before the packet is sent. That number is placed in the header of every cell in the packet. The cell-based switch uses this information to break the connection through the fabric once the packet transmission has been completed.

Some framing formats indicate the frame length in their header, as is the case with IEEE 802.3 frames. When the beginning of one of these frames enters the switch, the switch can read the header, find the length of the frame in bytes, and calculate the number of cells that will transport the frame. In this case, the process of segmenting the frame into cells can begin almost immediately, with the cell header containing the proper count of cells in the packet length field. This allows the frame to be transmitted through the cell-based switch with a minimum of latency.

The use of cell-based switches to switch Fibre Channel frames 10 is more difficult, since Fibre Channel headers do not contain any information identifying the length of the frame 10 This means that the length of a Fibre Channel frame is not known until the EOF marker is received. It is possible to buffer an entire Fibre Channel frame 10 and count the total number of bytes in the frame. It would then be a simple matter to calculate how many cells will be necessary to accommodate all of the information in the Fibre Channel frame, and then place this value in the cell headers. However, waiting for the entire frame to be buffered before sending the beginning of the frame over the cell-based switch fabric introduces unacceptable latency into the transmission time of the frame (about 20 microseconds at 1 Gbps data rate versus a preferred maximum latency of two microseconds). What is needed is a method to transmit variable length frames that do not contain length information in their frame header over a cell-based switch fabric without introducing an unacceptable level of latency.

In most cases, a Fibre Channel switch having more than a few ports utilizes a plurality of microprocessors to control the various elements of the switch. These microprocessors ensure that all of the components of the switch function appropriately. To operate cooperatively, it is necessary for the microprocessors to communicate with each other. It is also often necessary to communicate with the microprocessors from outside the switch.

In prior art switches, microprocessor messages are kept separate from the data traffic. This is because it is usually necessary to ensure that urgent internal messages are not delayed by data traffic congestion, and also to ensure that routine status messages do not unduly slow data traffic. Unfortunately, creating separate data and message paths within a large Fibre Channel switch can add a great deal of complexity and cost to the switch. What is needed is a technique that allows internal messages and real data to share the same data pathways within a switch without either type of communication unduly interfering with the other.

SUMMARY OF THE INVENTION

In the present invention, the XOFF status of each port in the switch is maintained in an XOFF mask. The XOFF mask provides a congestion status for all destinations in a switch at each ingress port. Data is stored in a memory subsystem queue associated with the destination port at the ingress side of the crossbar. A cell credit manager tracks the amount of data in this memory subsystem for each destination. If the count for any destination exceeds a threshold, the credit manager sends an XOFF signal to the XOFF masks. A lookup table in the XOFF masks maintains the status for every switch destination based on the XOFF signals. An XON history register receives the XOFF signals to allow queuing procedures that do not allow a status change to XON during certain states. Flow control signals directly from the memory subsystem are allowed to flow to each XOFF mask, where they are combined with the lookup table status to provide a congestion status for every destination.

The present invention switch includes flow control mechanism that provides XON/XOFF flow control for each virtual channel in an interswitch link. The entire interswitch link remains under standard Fibre Channel BB_Credit flow control. Each virtual channel in the interswitch link can submit data to multiple ports in the downstream switch. A mapping between each virtual channel and all ports accessible through the virtual channel is then applied to the XOFF mask, which determines the XOFF status of each virtual channel. An ISL XOFF signal is generated by the downstream switch on a change in XOFF status for any virtual channel. The preferred ISL XOFF signal is one or more Fibre Channel primitive containing the status for every virtual channel. Each primitive sends duplicate XOFF information, and always ends in negative running disparity.

The present invention switch also is capable of temporarily deferring the transmission of frames to a congested destination. When a request for transmission of a frame to the destination port is received, the congestion status of that destination is determined from the XOFF mask. If the destination is congested, the frame is stored in a deferred queue. When the status of a destination changes from congested to non-congested, the deferred queue is examined to see if any deferred frames can now be forwarded to their destination. While examining the deferred queue, incoming frames are placed on a backup queue. When the deferred queue is fully analyzed, the backup queue is emptied by either sending those frames to their destination or storing the frames in the deferred queue. While examining the deferred queue, the congested states of the destinations are not allowed to change from congested to non-congested. Instead, the state changes are stored in an XON history register until a later time.

A routing module in the present invention switch applies a plurality of routing rules simultaneously to determine routing for a Fibre Channel frame. Each rule independently determines whether the rule applies to the frame as well as a routing result for the frame. The routing result includes a port address, a zoning indicator, and a priority designation that can be used to route the frame over a virtual channel in an interswitch link. A selector chooses between the results returned by the rules. A component receives routing results specifying an ISL group and selects a physical ISL for the frame. An in-band priority determined by the content of the frame header can also be used in place of the priority designation in the routing result.

The present invention switch segments variable length frames into cells for transmission over a cell-based switch fabric and handles rate differences between the input data rate and the switch fabric data rate. The fabric handles multiple cell packets by maintaining a switch path until a certain number of cells are transmitted as indicated in a length field in the first data cell. The first cell contains a full data payload, and a length field value sufficient to handle a maximum length frame. Subsequent cells can contain less than a full data payload, with the number of valid bytes in the cell being indicated in the length field. The last cell used to segment the frame contains an end of frame indicator. The indicator signals the destination port side of the switch to terminate the packet path in the switch fabric prematurely—before the number of cells indicated in the first data cell.

A queuing mechanism is also used that allows port data and processor data to share the same crossbar data pathway without interference. An ingress memory subsystem is dividing into a plurality of virtual output queues according to the switch destination address of the data. Port data is assigned to the address of the physical destination port, while processor data is assigned to the address of one of the physical ports serviced by the processor. Different classes of service are maintained in the virtual output queues to distinguish between port data and processor data. This allows flow control to apply separately to these two classes of service, and also allows a traffic shaping algorithm to treat port data differently than processor data.

BRIEF DESCRIPTION OF THE DRAWINGS

FIG. 35 is a block drawing showing a header of a fixed length data cell.

FIG. 36 is a block drawing showing a first data cell, two intermediate data cells, and a last data cell used to transmit a Fibre Channel frame.

DETAILED DESCRIPTION OF THE INVENTION

0. Switch 100

Figure 1:
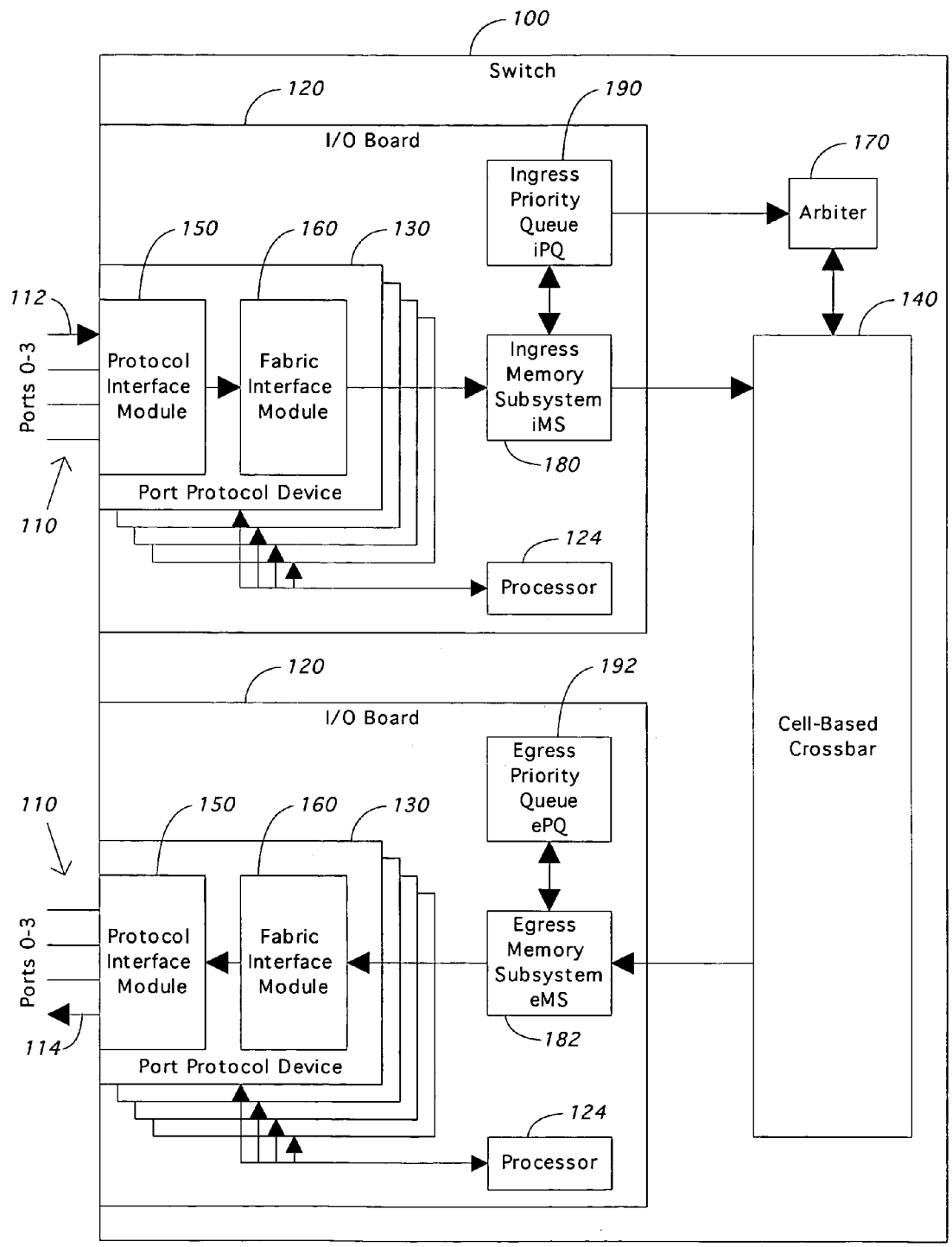
FIG. 1 is a block diagram of one possible Fibre Channel switch in which the present invention can be utilized.

The present invention is best understood after examining the major components of a Fibre Channel switch, such as switch 100 shown in FIG. 1. The components shown in FIG. 1 are helpful in understanding the applicant's preferred embodiment, but persons of ordinary skill will understand that the present invention can be incorporated in switches of different construction, configuration, or port counts.

Switch 100 is a director class Fibre Channel switch having a plurality of Fibre Channel ports 110. The ports 110 are physically located on one or more I/O boards inside of switch 100. Although FIG. 1 shows only two I/O boards, namely ingress board 120 and egress board 122, a director class switch 100 would contain eight or more such boards. The preferred embodiment described in the application can contain thirty-two such I/O boards 120, 122. Each board 120, 122 contains a microprocessor 124 that, along with its RAM and flash memory (not shown), is responsible for controlling and monitoring the other components on the boards 120, 122 and for handling communication between the boards 120, 122.

In the preferred embodiment, each board 120, 122 also contains four port protocol devices (or PPDs) 130. These PPDs 130 can take a variety of known forms, including an ASIC, an FPGA, a daughter card, or even a plurality of chips found directly on the boards 120, 122. In the preferred embodiment, the PPDs 130 are ASICs, and can be referred to as the FCP ASICs, since they are primarily designed to handle Fibre Channel protocol data. Each PPD 130 manages and controls four ports 110. This means that each I/O board 120, 122 in the preferred embodiment contains sixteen Fibre Channel ports 110.

The I/O boards 120, 122 are connected to one or more crossbars 140 designed to establish a switched communication path between two ports 110. Although only a single crossbar 140 is shown, the preferred embodiment uses four or more crossbar devices 140 working together. In the preferred embodiment, crossbar 140 is cell-based, meaning that it is designed to switch small, fixed-size cells of data. This is true even though the overall switch 100 is designed to switch variable length Fibre Channel frames.

The Fibre Channel frames are received on a port, such as input port 112, and are processed by the port protocol device 130 connected to that port 112. The PPD 130 contains two major logical sections, namely a protocol interface module 150 and a fabric interface module 160. The protocol interface module 150 receives Fibre Channel frames from the ports 110 and stores them in temporary buffer memory. The protocol interface module 150 also examines the frame header for its destination ID and determines the appropriate output or egress port 114 for that frame. The frames are then submitted to the fabric interface module 160, which segments the variable-length Fibre Channel frames into fixed-length cells acceptable to crossbar 140.

The fabric interface module 160 then transmits the cells to an ingress memory subsystem (iMS) 180. A single iMS 180 handles all frames received on the I/O board 120, regardless of the port 110 or PPD 130 on which the frame was received.

When the ingress memory subsystem 180 receives the cells that make up a particular Fibre Channel frame, it treats that collection of cells as a variable length packet. The iMS 180 assigns this packet a packet ID (or "PID") that indicates the cell buffer address in the iMS 180 where the packet is stored. The PID and the packet length is then passed on to the ingress Priority Queue (iPQ) 190, which organizes the packets in iMS 180 into one or more queues, and submits those packets to crossbar 140. Before submitting a packet to crossbar 140, the iPQ 190 submits a "bid" to arbiter 170. When the arbiter 170 receives the bid, it configures the appropriate connection through crossbar 140, and then grants access to that connection to the iPQ 190. The packet length is used to ensure that the connection is maintained until the entire packet has been transmitted through the crossbar 140, although the connection can be terminated early.

A single arbiter 170 can manage four different crossbars 140. The arbiter 170 handles multiple simultaneous bids from all iPQs 190 in the switch 100, and can grant multiple simultaneous connections through crossbar 140. The arbiter 170 also handles conflicting bids, ensuring that no output port 114 receives data from more than one input port 112 at a time.

The output or egress memory subsystem (eMS) 182 receives the data cells comprising the packet from the crossbar 140, and passes a packet ID to an egress priority queue (ePQ) 192. The egress priority queue 192 provides scheduling, traffic management, and queuing for communication between egress memory subsystem 182 and the PPD 130 in egress I/O board 122. When directed to do so by the ePQ 192, the eMS 182 transmits the cells comprising the Fibre Channel frame to the egress portion of PPD 130. The fabric interface module 160 then reassembles the data cells and presents the resulting Fibre Channel frame to the protocol interface module 150. The protocol interface module 150 stores the frame in its buffer, and then outputs the frame through output port 114.

In the preferred embodiment, crossbar 140 and the related components are part of a commercially available cell-based switch chipset, such as the nPX8005 or "Cyclone" switch fabric manufactured by Applied Micro Circuits Corporation of San Diego, Calif. More particularly, in the preferred embodiment, the crossbar 140 is the AMCC S8705 Crossbar product, the arbiter 170 is the AMCC S8605 Arbiter, the iPQ 190 and ePQ 192 are AMCC S8505 Priority Queues, and the iMS 180 and eMS 182 are AMCC S8905 Memory Subsystems, all manufactured by Applied Micro Circuits Corporation.

1. Port Protocol Device 130 a) Link Controller Module 300

Figure 2:
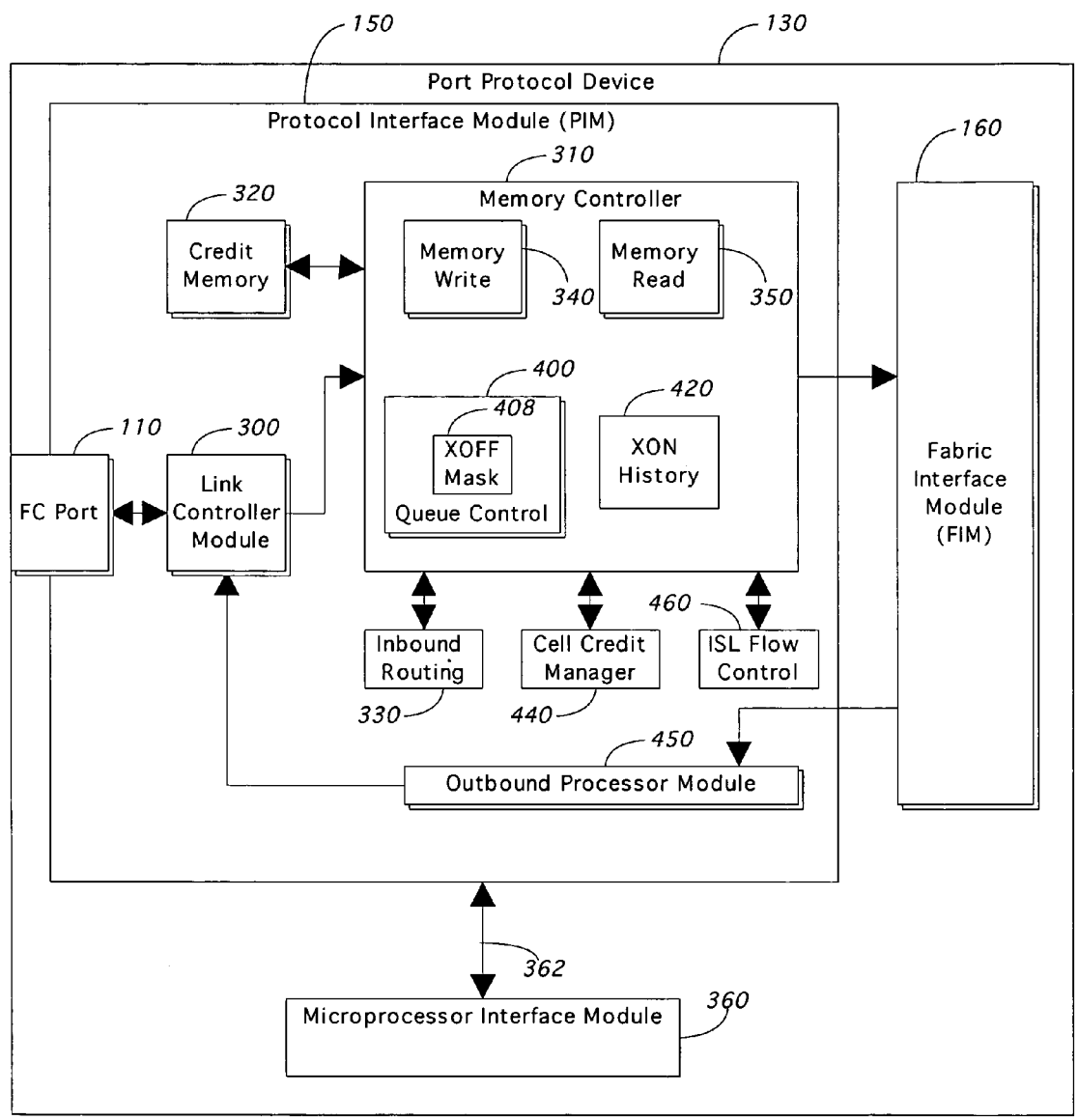
FIG. 2 is a block diagram showing the details of the port protocol device of the Fibre Channel switch shown in FIG. 1.

FIG. 2 shows the components of one of the four port protocol devices 130 found on each of the I/O Boards 120, 122. As explained above, incoming Fibre Channel frames are received over a port 110 by the protocol interface 150. A link controller module (LCM) 300 in the protocol interface 150 receives the Fibre Channel frames and submits them to the memory controller module 310. One of the primary jobs of the link controller module 300 is to compress the start of frame (SOF) and end of frame (EOF) codes found in each Fibre Channel frame. By compressing these codes, space is created for status and routing information that must be transmitted along with the data within the switch 100. More specifically, as each frame passes through PPD 130, the PPD 130 generates information about the frame's port speed, its priority value, the internal switch destination address (or SDA) for the source port 112 and the destination port 114, and various error indicators. This information is added to the SOF and EOF in the space made by the LCM 300. This "extended header" stays with the frame as it traverses through the switch 100, and is replaced with the original SOF and EOF as the frame leaves the switch 100.

The LCM 300 uses a SERDES chip (such as the Gigablaze SERDES available from LSI Logic Corporation, Milpitas, Calif.) to convert between the serial data used by the port 110 and the 10-bit parallel data used in the rest of the protocol interface 150. The LCM 300 performs all low-level link-related functions, including clock conversion, idle detection and removal, and link synchronization. The LCM 300 also performs arbitrated loop functions, checks frame CRC and length, and counts errors.

b) Memory Controller Module 310

The memory controller module 310 is responsible for storing the incoming data frame on the inbound frame buffer memory 320. Each port 110 on the PPD 130 is allocated a separate portion of the buffer 320. Alternatively, each port 110 could be given a separate physical buffer 320. This buffer 320 is also known as the credit memory, since the BB_Credit flow control between switch 100 and the upstream device is based upon the size or credits of this memory 320. The memory controller 310 identifies new Fibre Channel frames arriving in credit memory 320, and shares the frame's destination ID and its location in credit memory 320 with the inbound routing module 330.

The routing module 330 of the present invention examines the destination ID found in the frame header of the frames and determines the switch destination address (SDA) in switch 100 for the appropriate destination port 114. The router 330 is also capable of routing frames to the SDA associated with one of the microprocessors 124 in switch 100. In the preferred embodiment, the SDA is a ten-bit address that uniquely identifies every port 110 and processor 124 in switch 100. A single routing module 330 handles all of the routing for the PPD 130. The routing module 330 then provides the routing information to the memory controller 310.

Figure 3:
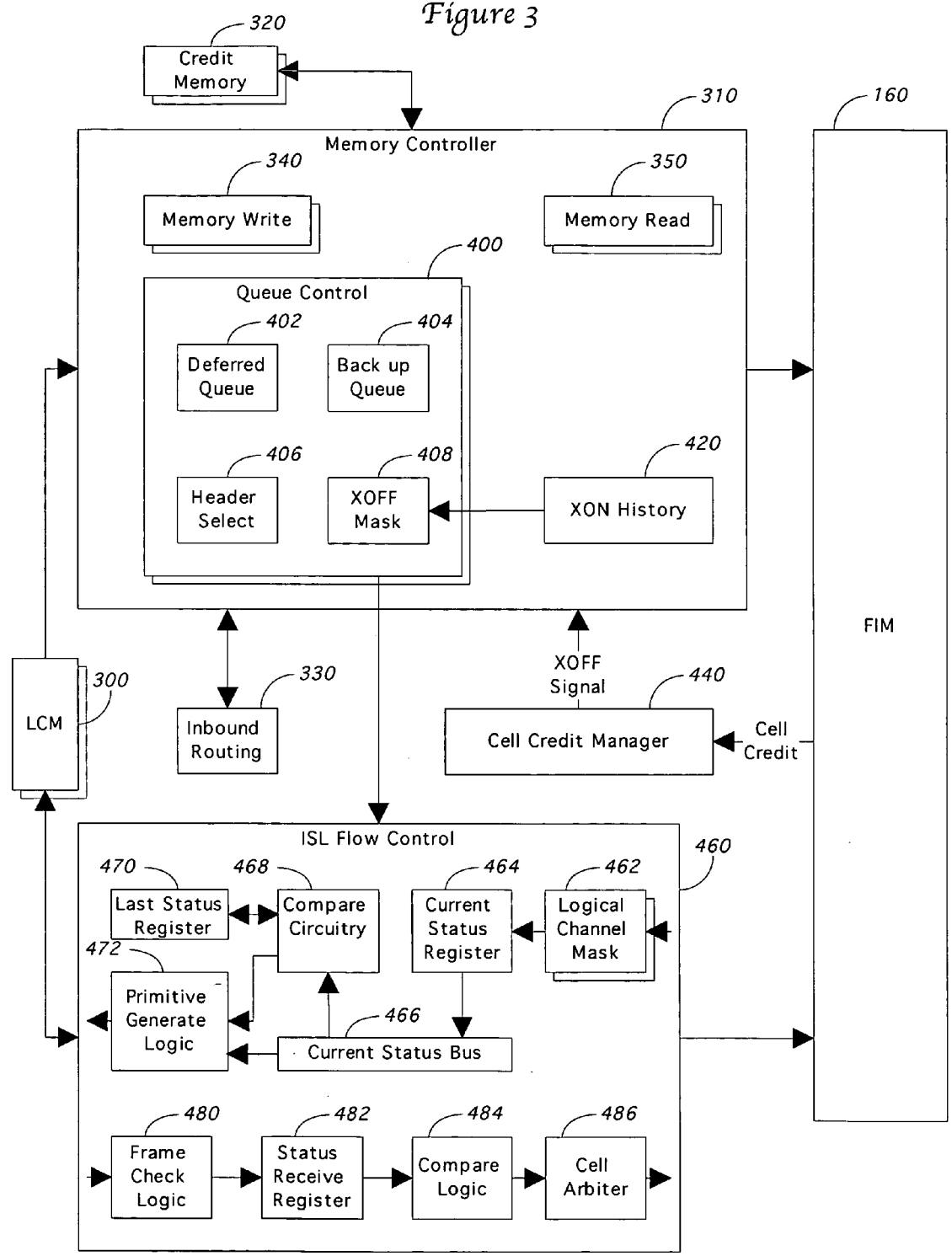
FIG. 3 is a block diagram showing the details of the memory controller and the ISL flow control module of the port protocol device shown in FIG. 2.

As shown in FIG. 3, the memory controller 310 consists of four primary components, namely a memory write module 340, a memory read module 350, a queue control module 400, and an XON history register 420. A separate write module 340, read module 350, and queue control module 400 exist for each of the four ports 110 on the PPD 130. A single XON history register 420 serves all four ports 110. The memory write module 340 handles all aspects of writing data to the credit memory 320. The memory read module 350 is responsible for reading the data frames out of memory 320 and providing the frame to the fabric interface module 160.

c) Queue Control Module 400

The queue control module 400 stores the routing results received from the inbound routing module 330. When the credit memory 320 contains multiple frames, the queue control module 400 decides which frame should leave the memory 320 next. In doing so, the queue module 400 utilizes procedures that avoid head-of-line blocking.

The queue control module 400 has four primary components, namely the deferred queue 402, the backup queue 404, the header select logic 406, and the XOFF mask 408. These components work in conjunction with the XON History register 420 and the cell credit manager or credit module 440 to control ingress queuing and to assist in managing flow control within switch 100. The deferred queue 402 stores the frame headers and locations in buffer memory 320 for frames waiting to be sent to a destination port 114 that is currently busy. The backup queue 404 stores the frame headers and buffer locations for frames that arrive at the input port 112 while the deferred queue 402 is sending deferred frames to their destination. The header select logic 406 determines the state of the queue control module 400, and uses this determination to select the next frame in credit memory 320 to be submitted to the FIM 160. To do this, the header select logic 406 supplies to the memory read module 350 a valid buffer address containing the next frame to be sent. The functioning of the backup queue 404, the deferred queue 402, and the header select logic 406 are described in more detail below.

The XOFF mask 408 contains a congestion status bit for each port 110 within the switch 100. In one embodiment of the switch 100, there are five hundred and twelve physical ports 110 and thirty-two microprocessors 124 that can serve as a destination for a frame. Hence, the XOFF mask 408 uses a 544 by 1 look up table to store the "XOFF" status of each destination. If a bit in XOFF mask 408 is set, the port 110 corresponding to that bit is busy and cannot receive any frames. In the preferred embodiment, the XOFF mask 408 returns a status for a destination by first receiving the SDA for that port 110 or microprocessor 124. The look up table is examined for that SDA, and if the corresponding bit is set, the XOFF mask 408 asserts a "defer" signal which indicates to the rest of the queue control module 400 that the selected port 110 or processor 124 is busy.

The XON history register 420 is used to record the history of the XON status of all destinations in the switch. Under the procedure established for deferred queuing, the XOFF mask 408 cannot be updated with an XON event when the queue control 400 is servicing deferred frames in the deferred queue 402. During that time, whenever a port 110 changes status from XOFF to XON, the cell credit manager 440 updates the XON history register 420 rather than the XOFF mask 408. When the reset signal is active, the entire content of the XON history register 420 is transferred to the XOFF mask 408. Registers within the XON history register 420 containing a zero will cause corresponding registers within the XOFF mask 408 to be reset. The dual register setup allows for XOFFs to be written at any time the cell credit manager 440 requires traffic to be halted, and causes XONs to be applied only when the logic within the header select 406 allows for changes in the XON values. While a separate queue control module 400 and its associated XOFF mask 408 is necessary for each port in the PPD 130, only one XON history register 420 is necessary to service all four ports in the PPD 130. The XON history register 420 and the XOFF mask 408 are updated through the credit module 440 as described in more detail below.

The XOFF signal of the credit module 440 is a composite of cell credit availability maintained by the credit module 440 and output channel XOFF signals. The credit module 440 is described in more detail below.

d) Fabric Interface Module 160

Figure 33:
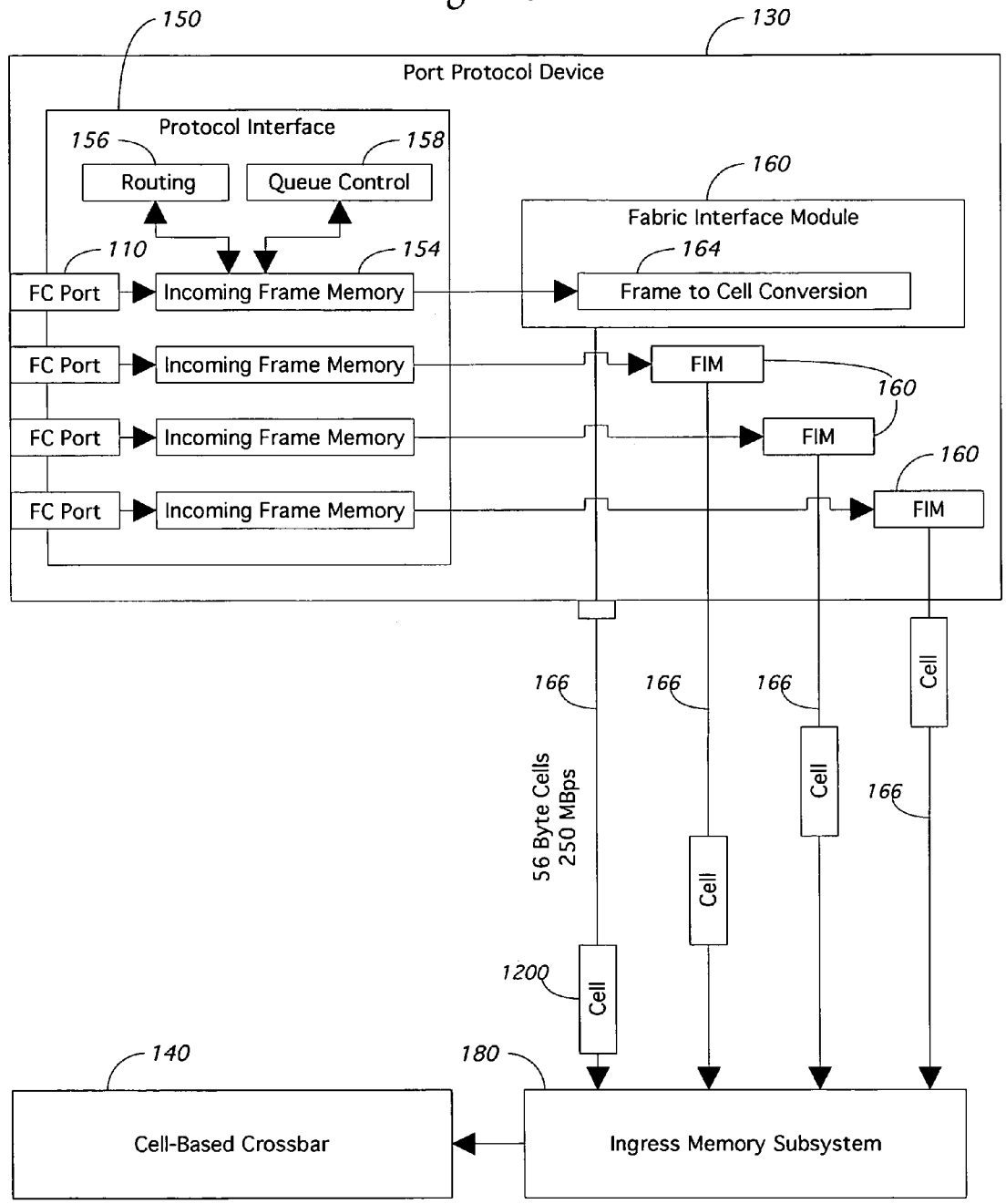
FIG. 33 is a block drawing showing the details of the input port protocol device of the Fibre Channel switch shown in FIG. 1.

When a Fibre Channel frame is ready to be submitted to the ingress memory subsystem 180 of I/O board 120, the queue control 400 passes the frame's routed header and pointer to the memory read portion 350. This read module 350 then takes the frame from the credit memory 320 and provides it to the fabric interface module 160. As seen in FIG. 33, there are multiple links 166 between each PPD 130 and the iMS 180. Each separate link 166 uses a separate FIM 160, which is responsible for interfacing through data path 166 to the ingress memory subsystem 180.

The rate of data transfer between the protocol interface device 150 and the fabric interface module 160 in the preferred embodiment is 2.12 Gbps, or 212 MBps. The data transfer rate between each fabric interface module 160 and the iMS 180 in the present invention is 250 MBps. Since the fabric interface module 160 receives data at a rate of 212 MBps, the module 160 must adapt between the two data rates. The rate difference is even greater when data is being received from a 1 Gbps Fibre Channel device and the received data frames are not completely stored in the buffer 154 before transmission to the iMS 180. In the preferred embodiment, it is possible to receive data from Fibre Channel devices over the ports 110 at a variety of rates, include 4 Gbps. In this embodiment, it is necessary for each port 110 to communicate to the iMS 180 over two serial data paths 166, with each path 166 having its own fabric interface module 160. The protocol interface 150 takes responsibility for dividing the traffic between the two FIMs 160 serving that port 110.

Each FIM 160 contains a conversion component 164 that converts the variable-length Fibre Channel frames 10 received from the protocol interface 150 into fixed-sized data cells 1200 acceptable to the cell-based crossbar 140 and the iMS 180. Each cell 1200 is constructed with a cell header identifying the destination port 114, as identified by routing module 330. When using the Cyclone switch fabric of Applied Micro Circuits Corporation, the cell header includes a starting sync character, the switch destination address of the egress port 114 and a priority assignment from the inbound routing module 330, a flow control field and ready bit, an ingress class of service assignment, a packet length field, and a start-of-packet and end-of-packet identifier. The cells 1200 are placed sequentially on each of the paths 166 in a round robin matter. FIG. 33 illustrates this round robin nature by placing a gap on each path 166 when other paths 166 contain a data cell 1200. In actuality, no significant gap exists between the end of one cell 1200 and the beginning of the next cell 1200 on a single path 166. It is acceptable to send empty (or "idle") data cells 1200 from the port protocol device 130 and the iMS 180 between Fibre Channel frames, but it is not acceptable to send idle cells 1200 during the transmission of a Fibre Channel frame. Idle cells 1200 are simply ignored by the iMS 180.

When necessary, the preferred embodiment of the fabric interface 160 creates fill data to compensate for the speed difference between the memory controller 310 output data rate and the ingress data rate of the cell-based crossbar 140. This process is described in more detail below.

Egress data cells are received from the crossbar 140 and stored in the egress memory subsystem 182. When these cells leave the eMS 182, they enter the egress portion of the fabric interface module 160. The FIM 160 then examines the cell headers, removes fill data, and concatenates the cell payloads to re-construct Fibre Channel frames with extended SOF/EOF codes. If necessary, the FIM 160 uses a small buffer to smooth gaps within frames caused by cell header and fill data removal.

e) Outbound Processor Module 450

Figure 39:
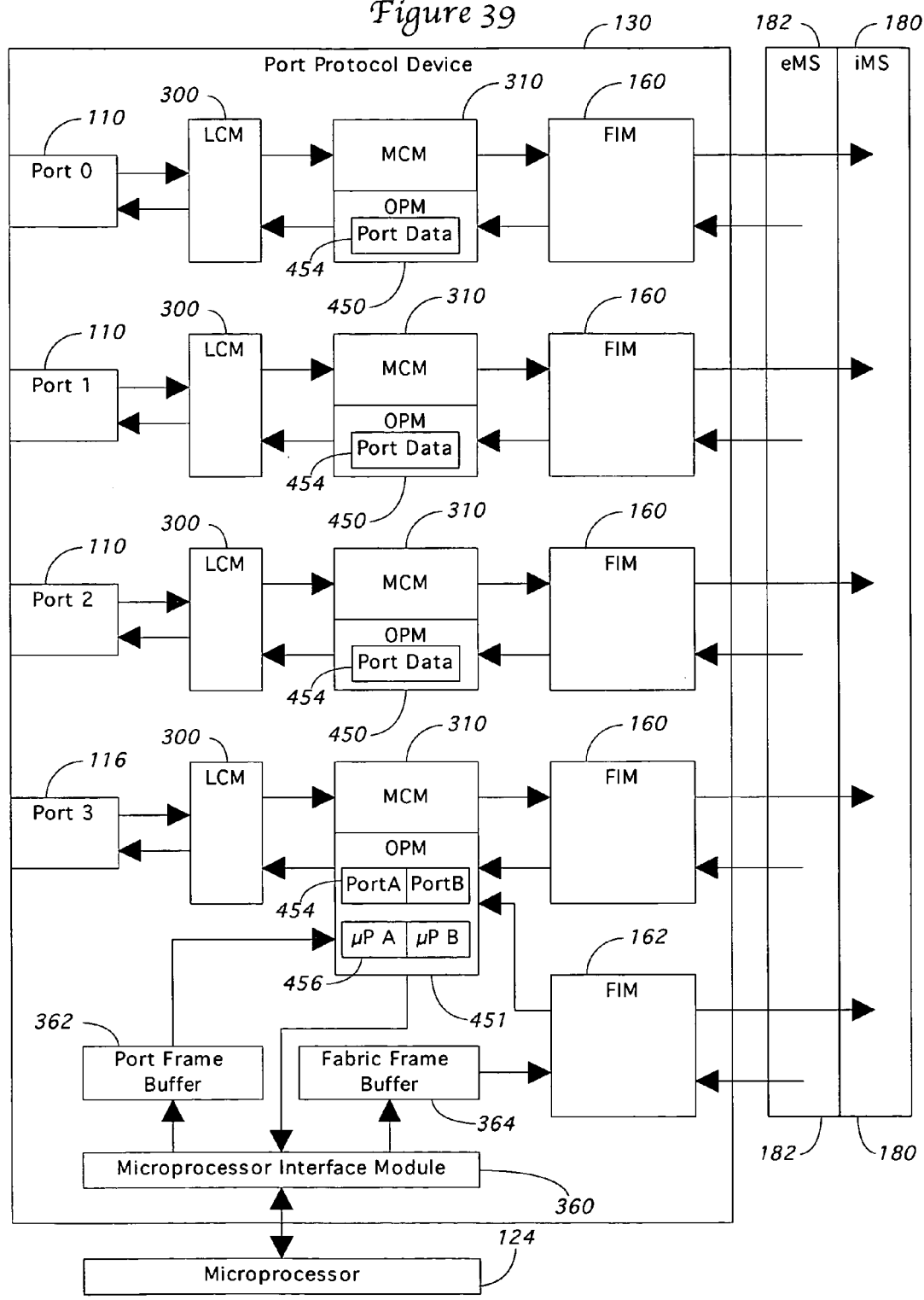
FIG. 39 is a block diagram showing the interrelationships between the duplicated elements on the port protocol device of FIG. 2.
Figure 40:
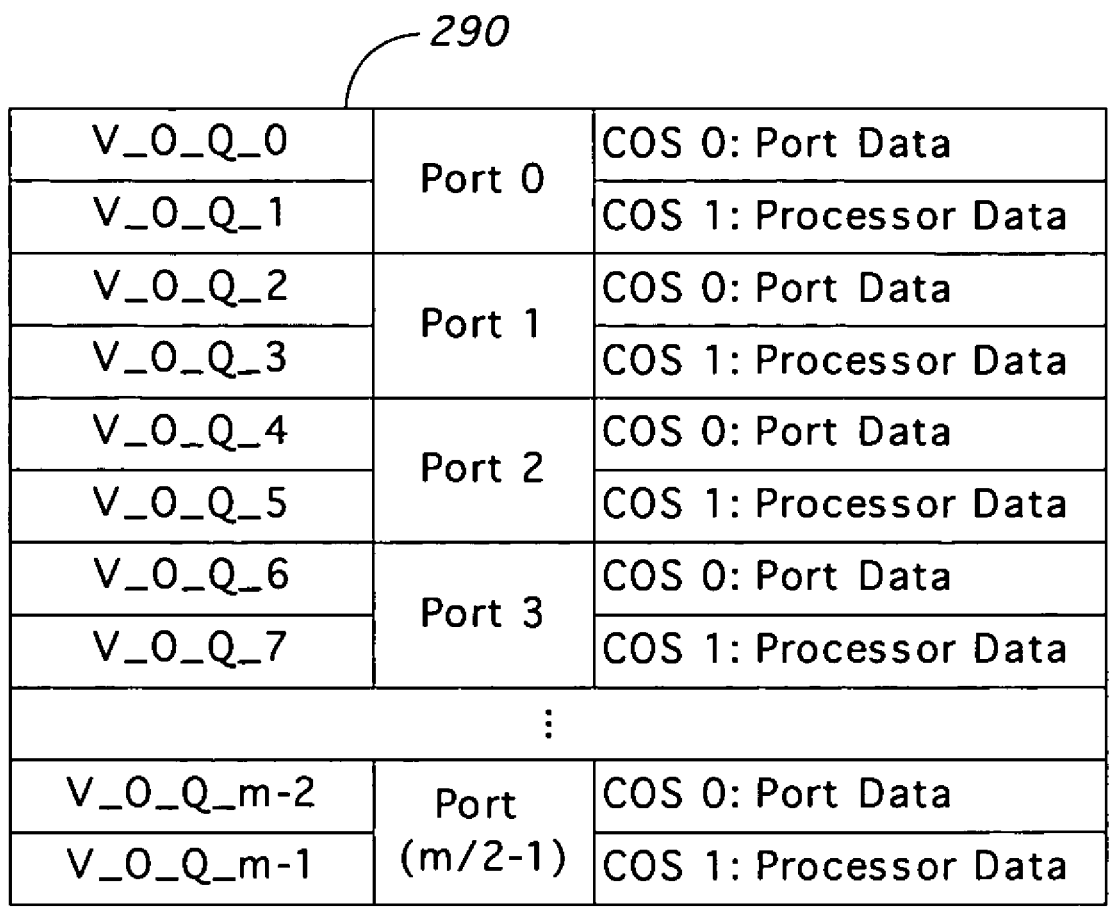
FIG. 40 is a block diagram showing additional details of the virtual output queues of FIG. 5.

The FIM 160 submits frames received from the egress memory subsystem 182 to the outbound processor module (OPM) 450. As seen in FIG. 39, a separate OPM 450 is used for each port 110 on the PPD 130. The outbound processor module 450 checks each frame's CRC, and uses a port data buffer 454 to account for the different data transfer rates between the fabric interface 160 and the ports 110. The port data buffer 454 also helps to handle situations where the microprocessor 124 is communicating directly through one of the ports 110. When this occurs, the microprocessor-originating data has priority, the port data buffer 454 stores data arriving from the FIM 160 and holds it until the microprocessor-originated data frame is sent through the port 110. If the port data buffer 454 ever becomes too full, the OPM 450 is able to signal the eMS 182 to stop sending data to the port 110 using an XOFF flow control signal. An XON signal can later be used to restart the flow of data to the port 110 once the buffer 454 is less full.

The primary job of the outbound processor modules 450 is to handle data frames received from the cell-based crossbar 140 and the eMS 182 that are destined for one of the Fibre Channel ports 110. This data is submitted to the link controller module 300, which replaces the extended SOF/EOF codes with standard Fibre Channel SOF/EOF characters, performs 8b/10b encoding, and sends data frames through its SERDES to the Fibre Channel port 110.

Each port protocol device 130 has numerous ingress links to the iMS 180 and an equal number of egress links from the eMS 182. Each pair of links uses a different fabric interface module 160. Each port 110 is provided with its own outbound processor module 450. In the preferred embodiment, an I/O board 120 has a total of four port protocol devices 130, and a total of seventeen link pairs to the ingress and egress memory subsystems 180, 182. The first three PPDs 130 have four link pairs each, one pair for every port 110 on the PPD 130. The last PPD 130 still has four ports 110, but this PPD 130 has five link pairs to the memory subsystems 180, 182, as shown in FIG. 39. The fifth link pair is associated with a fifth FIM 162, and is connected to the OPM 451 handling outgoing communication for the highest numbered port 116 (i.e., the third port) on this last PPD 130. This last OPM 451 on the last PPD 130 on a I/O board 120 is special in that it has two separate FIM interfaces. The purpose of this special, dual port OPM 451 is to receive data frames from the cell-based switch fabric that are directed to the microprocessor 124 for that I/O board 120. This is described in more detail below.

In an alternative embodiment, the ports 110 might require additional bandwidth to the iMS 180, such as where the ports 110 can communicates at four gigabits per second and each link to the memory subsystems 180, 182 communicate at only 2.5 Gbps. In these embodiments, multiple links can be made between each port 110 and the iMS 180, each communication path having a separate FIM 160. In these embodiments, all OPMs 450 will communicate with multiple FIMs 160, and will have at least one port data buffer 454 for each FIM 160 connection.

2. Fabric 200

Figure 4:
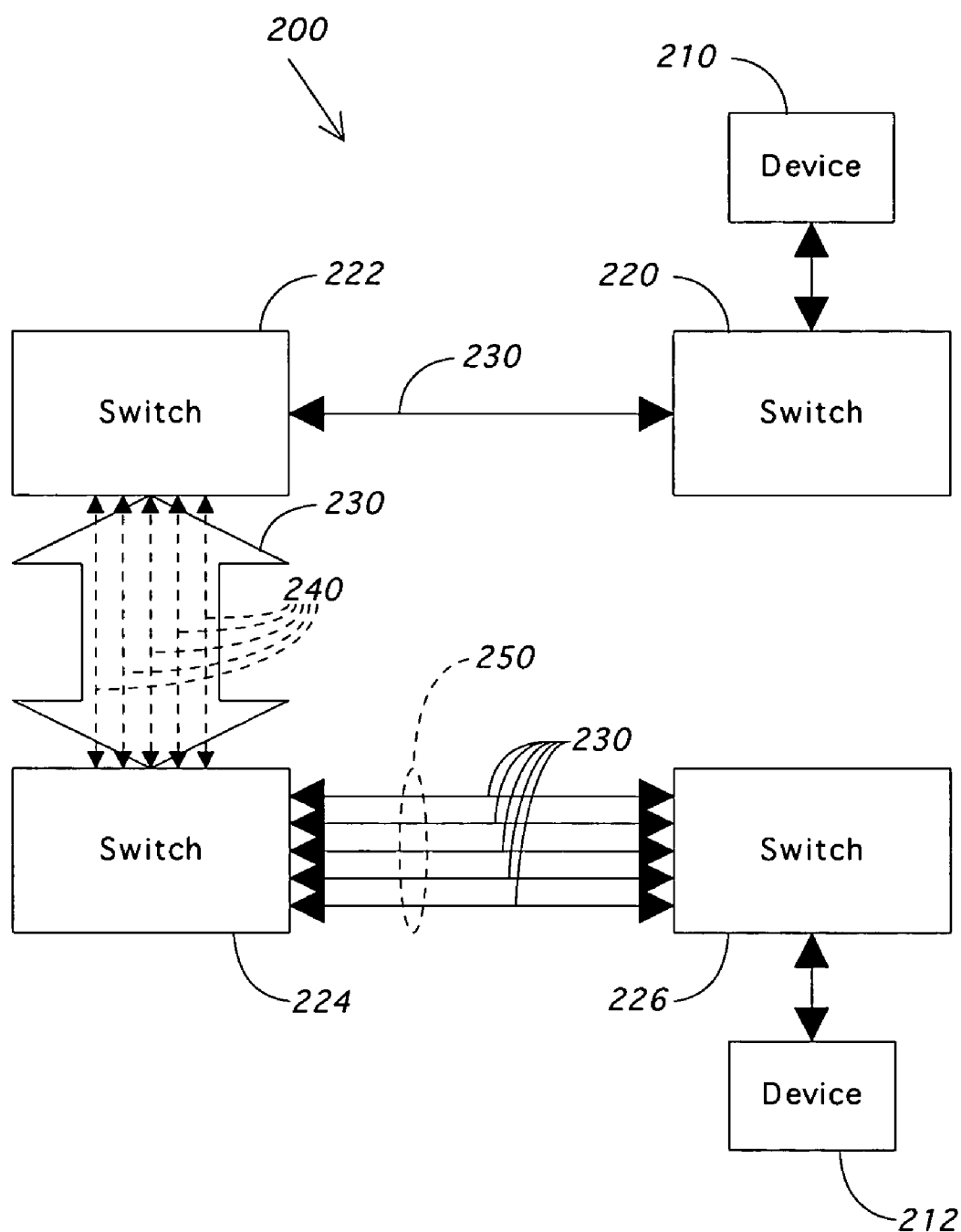
FIG. 4 is a block diagram of a Fibre Channel fabric in which the present invention can be utilized.

FIG. 4 shows two devices 210, 212 connected together over a fabric 200 consisting of four switches 220–228. Each of these switches 220–228 is connected together using one or more interswitch links 230. Switch 220 connects to switch 222 through a single ISL 230. Likewise, the connection between switch 222 and switch 224 uses a single ISL 230 as well. This ISL 230, however, is subdivided into a plurality of logical or virtual channels 240. The channels 240 can be used to shape traffic flow over the ISL 230. In the preferred embodiment, the virtual channels 240 are also used to enhance flow control over the interswitch link 230.

The inbound routing module 330 in the preferred embodiment allows for the convenient assignment of data traffic to a particular virtual channel 240 based upon the source and destination of the traffic. For instance, traffic between the two devices 210, 212 can be assigned to a different logical channel 240 than all other traffic between the two switches 222, 224. The assignment of traffic to a virtual channel 240 can be based upon individual pairs of source devices 210 and destination devices 212, or it can be based on groups of source-destination pairs.

In the preferred embodiment, the inbound routing module 330 assigns a priority to an incoming frame at the same time the frame is assigned a switch destination address for the egress port 114. The assigned priority for a frame heading over an ISL 230 will then be used to assign the frame to a logical channel 240. In fact, the preferred embodiment uses the unaltered priority value as the logical channel 240 assignment for a data frame heading over an interswitch link 230.

Every ISL 230 in fabric 200 can be divided into separate virtual channels 240, with the assignment of traffic to a particular virtual channel 240 being made independently at each switch 220–226 submitting traffic to an ISL 230. For instance, assuming that each ISL 230 is divided into eight virtual channels 240, the different channels 240 could be numbered 0–7. The traffic flow from device 210 to device 212 could be assigned by switch 220 to virtual channel 0 on the ISL 230 linking switch 220 and 222, but could then be assigned virtual channel 6 by switch 222 on the ISL 230 linking switch 222 and 224.

By managing flow control over the ISL 230 on a virtual channel 240 basis, congestion on the other virtual channels 240 in the ISL 230 would not affect the traffic between the two devices 210, 212. This avoids the situation shown in FIG. 3. Flows that could negatively impact traffic on an interswitch link 240 can be segregated from those that can fully utilize network resources, which will improve overall performance and utilization while delivering guaranteed service levels to all flows. In other words, the use of virtual channels 240 allows the separation of traffic into distinct class of service levels. Hence, each virtual channel 240 is sometimes referred to as a distinct class of service or CoS.

Switch 224 and switch 226 are interconnected using five different interswitch links 230. It can be extremely useful to group these different ISL 230 into a single ISL group 250. The ISL group 250 can then appear as a single large bandwidth link between the two switches 224 and 226 during the configuration and maintenance of the fabric 200. In addition, defining an ISL group 250 allows the switches 224 and 226 to more effectively balance the traffic load across the physical interswitch links 230 that make up the ISL group 250.

3. Queues a) Class of Service Queue 280

Figure 5:
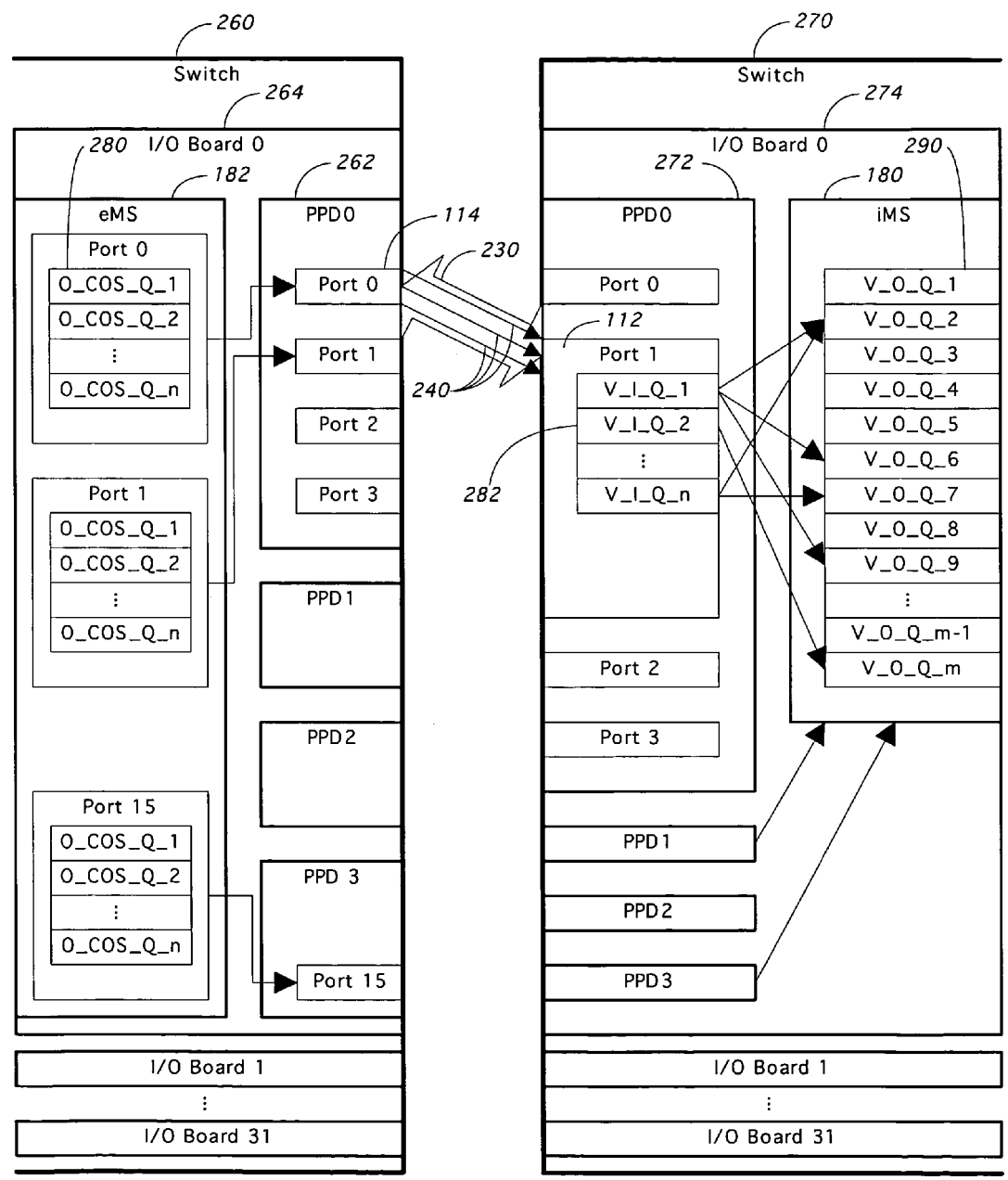
FIG. 5 is a block diagram showing the queuing utilized in an upstream switch and a downstream switch communicating over an interswitch link.

Flow control over the logical channels 240 of the present invention is made possible through the various queues that are used to organize and control data flow between two switches and within a switch. FIG. 5 shows two switches 260, 270 that are communicating over an interswitch link 230. The ISL 230 connects an egress port 114 on upstream switch 260 with an ingress port 112 on downstream switch 270. The egress port 114 is located on the first PPD 262 (labeled PPD 0) on the first I/O Board 264 (labeled I/O Board 0) on switch 260. This I/O board 264 contains a total of four PPDs 130, each containing four ports 110. This means I/O board 264 has a total of sixteen ports 110, numbered 0 through 15. In FIG. 5, switch 260 contains thirty-one other I/O boards 120, 122, meaning the switch 260 has a total of five hundred and twelve ports 110. This particular configuration of I/O Boards 120, 122, PPDs 130, and ports 110 is for exemplary purposes only, and other configurations would clearly be within the scope of the present invention.

I/O Board 264 has a single egress memory subsystem 182 to hold all of the data received from the crossbar 140 (not shown) for its sixteen ports 110. The data in eMS 182 is controlled by the egress priority queue 192 (also not shown). In the preferred embodiment, the ePQ 192 maintains the data in the eMS 182 in a plurality of output class of service queues (O_COS_Q) 280. Data for each port 110 on the I/O Board 264 is kept in a total of "n" O_COS queues, with the number n reflecting the number of virtual channels 240 defined to exist with the ISL 230. When cells are received from the crossbar 140, the eMS 182 and ePQ 192 add the cell to the appropriate O_COS_Q 280 based on the destination SDA and priority value assigned to the cell. This information was placed in the cell header as the cell was created by the ingress FIM 160.

The output class of service queues 280 for a particular egress port 114 can be serviced according to any of a great variety of traffic shaping algorithms. For instance, the queues 280 can be handled in a round robin fashion, with each queue 280 given an equal weight. Alternatively, the weight of each queue 280 in the round robin algorithm can be skewed if a certain flow is to be given priority over another. It is even possible to give one or more queues 280 absolute priority over the other queues 280 servicing a port 110. The cells are then removed from the O_COS_Q 280 and are submitted to the PPD 262 for the egress port 114, which converts the cells back into a Fibre Channel frame and sends it across the ISL 230 to the downstream switch 270.

b) Virtual Output Queue 290

The frame enters switch 270 over the ISL 230 through ingress port 112. This ingress port 112 is actually the second port (labeled port 1) found on the first PPD 272 (labeled PPD 0) on the first I/O Board 274 (labeled I/O Board 0) on switch 270. Like the I/O board 264 on switch 260, this I/O board 274 contains a total of four PPDs 130, with each PPD 130 containing four ports 110. With a total of thirty-two I/O boards 120, 122, switch 270 has the same five hundred and twelve ports as switch 260.

When the frame is received at port 112, it is placed in credit memory 320. The D_ID of the frame is examined, and the frame is queued and a routing determination is made as described above. Assuming that the destination port on switch 270 is not XOFFed according to the XOFF mask 408 servicing input port 112, the frame will be subdivided into cells and forwarded to the ingress memory subsystem 180.

The iMS 180 is organized and controlled by the ingress priority queue 190, which is responsible for ensuring in-order delivery of data cells and packets. To accomplish this, the iPQ 190 organizes the data in its iMS 180 into a number ("m") of different virtual output queues (V_O_Qs) 290. To avoid head-of-line blocking, a separate V_O_Q 290 is established for every destination within the switch 270. In switch 270, this means that there are at least five hundred forty-four V_O_Qs 290 (five hundred twelve physical ports 110 and thirty-two microprocessors 124) in iMS 180. The iMS 180 places incoming data on the appropriate V_O_Q 290 according to the switch destination address assigned to that data.

When using the AMCC Cyclone chipset, the iPQ 190 can configure up to 1024 V_O_Qs 290. In an alternative embodiment of the virtual output queue structure in iMS 180, all 1024 available queues 290 are used in a five hundred twelve port switch 270, with two V_O_Qs 290 being assigned to each port 110. One of these V_O_Qs 290 is dedicated to carrying real data destined to be transmitted out the designated port 110. The other V_O_Q 290 for the port 110 is dedicated to carrying traffic destined for the microprocessor 124 at that port 110. In this environment, the V_O_Qs 290 that are assigned to each port can be considered two different class of service queues for that port, with a separate class of service for each type of traffic. The FIM 160 places an indication as to which class of service should be provided to an individual cell in a field found in the cell header, with one class of service for real data and another for internal microprocessor communications. In this way, the present invention is able to separate internal messages and other microprocessor based communication from real data traffic. This is done without requiring a separate data network or using additional crossbars 140 dedicated to internal messaging traffic. And since the two V_O_Qs 290 for each port are maintained separately, real data traffic congestion on a port 110 does not affect the ability to send messages to the port, and vice versa.

Data in the V_O_Qs 290 is handled like the data in O_COS_Qs 280, such as by using round robin servicing. When data is removed from a V_O_Q 290, it is submitted to the crossbar 140 and provided to an eMS 182 on the switch 270.

c) Virtual Input Queue 282

FIG. 5 also shows a virtual input queue structure 282 within each ingress port 112 in downstream switch 270. Each of these V_I_Qs 282 corresponds to one of the virtual channels 240 on the ISL 230, which in turn corresponds to one of the O_COS_Qs 280 on the upstream switch. In other words, a frame that is assigned a class of service level of "2" will be assigned to O_COS_Q_2 at eMS 280, will travel to downstream switch 270 over virtual channel "2," and will be associated with virtual input queue "2" at the ingress port 112.

By assigning frames to a V_I_Q 282 in ingress port 112, the downstream switch 270 can identify which O_COS_Q 280 in switch 260 was assigned to the frame. As a result, if a particular data frame encounters a congested port within the downstream switch 270, the switch 270 is able to communicate that congestion to the upstream switch by performing flow control for the virtual channel 240 assigned to that O_COS_Q 280.

For this to function properly, the downstream switch 270 must provide a signal mapping such that any V_O_Q 290 that encounters congestion will signal the appropriate V_I_Q 282, which in turn will signal the upstream switch 260 to XOFF the corresponding O_COS_Q 280. The logical channel mask 462 handles the mapping between ports in the downstream switch 270 and virtual channels 240 on the ISL 230, as is described in more detail below.

4. Flow Control in Switch

The cell-based switch fabric used in the preferred embodiment of the present invention can be considered to include the memory subsystems 180, 182, the priority queues 190, 192, the cell-based crossbar 140, and the arbiter 170. As described above, these elements can be obtained commercially from companies such as Applied Micro Circuits Corporation. This switch fabric utilizes a variety of flow control mechanisms to prevent internal buffer overflows, to control the flow of cells into the cell-based switch fabric, and to receive flow control instructions to stop cells from exiting the switch fabric. These flow control mechanisms, along with the other methods of flow control existing within switch 100, are shown in FIGS. 9–15.

a) Internal Flow Control between iMS 180 and eMS 182 i) Routing, Urgent, and Emergency XOFF 500

Figure 6:
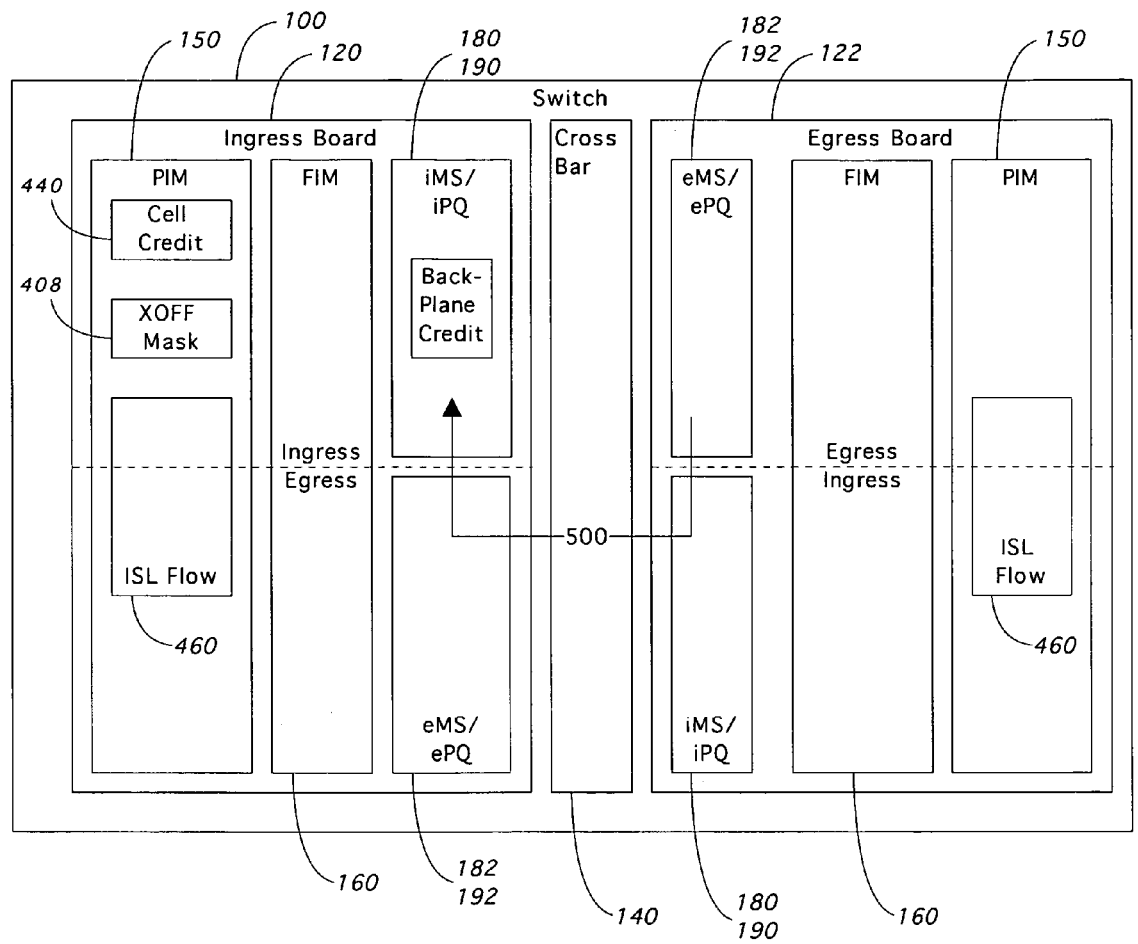
FIG. 6 is a block diagram showing XOFF flow control between the ingress memory subsystem and the egress memory subsystem in the switch of FIG. 1.

XOFF internal flow control within the cell-based switch fabric is shown as communication 500 in FIG. 6. This flow control serves to stop data cells from being sent from iMS 180 to eMS 182 over the crossbar 140 in situations where the eMS 182 or one of the O_COS_Qs 280 in the eMS 182 is becoming full. If there were no flow control, congestion at an egress port 114 would prevent data in the port's associated O_COS_Qs 280 from exiting the switch 100. If the iMS 180 were allowed to keep sending data to these queues 280, eMS 182 would overflow and data would be lost.

This flow control works as follows. When cell occupancy of an O_COS_Q 280 reaches a threshold, an XOFF signal is generated internal to the switch fabric to stop transmission of data from the iMS 180 to these O_COS_Qs 280. The preferred Cyclone switch fabric uses three different thresholds, namely a routine threshold, an urgent threshold, and an emergency threshold. Each threshold creates a corresponding type of XOFF signal to the iMS 180.

Unfortunately, since the V_O_Qs 290 in iMS 180 are not organized into the individual class of services for each possible output port 114, the XOFF signal generated by the eMS 182 cannot simply turn off data for a single O_COS_Q 280. In fact, due to the manner in which the cell-based fabric addresses individual ports, the XOFF signal is not even specific to a single congested port 110. Rather, in the case of the routine XOFF signal, the iMS 180 responds by stopping all cell traffic to the group of four ports 110 found on the PPD 130 that contains the congested egress port 114. Urgent and Emergency XOFF signals cause the iMS 180 and Arbiter 170 to stop all cell traffic to the effected egress I/O board 122. In the case of routine and urgent XOFF signals, the eMS 182 is able to accept additional packets of data before the iMS 180 stops sending data. Emergency XOFF signals mean that new packets arriving at the eMS 182 will be discarded.

ii) Backplane Credits 510

Figure 7:
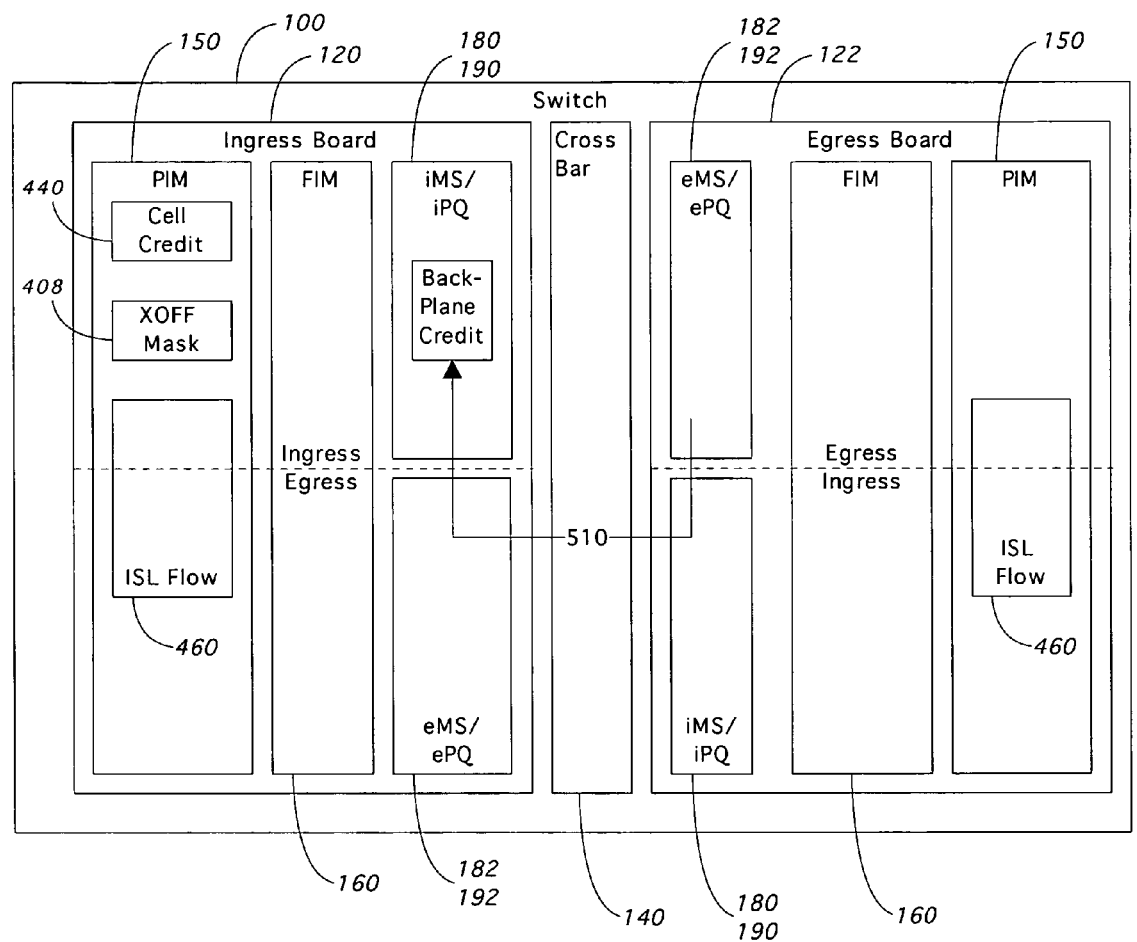
FIG. 7 is a block diagram showing backplane credit flow control between the ingress memory subsystem and the egress memory subsystem in the switch of FIG. 1.

The iPQ 190 also uses a backplane credit flow control 510 (shown in FIG. 7) to manage the traffic from the iMS 180 to the different egress memory subsystems 182 more granularly than the XOFF signals 500 described above. For every packet submitted to an egress port 114, the iPQ 190 decrements its "backplane" credit count for that port 114. When the packet is transmitted out of the eMS 182, a backplane credit is returned to the iPQ 190. If a particular O_COS_Q 280 cannot submit data to an ISL 230 (such as when the associated virtual channel 240 has an XOFF status), credits will not be returned to the iPQ 190 that submitted those packets. Eventually, the iPQ 190 will run out of credits for that egress port 114, and will stop making bids to the arbiter 170 for these packets. These packets will then be held in the iMS 180.

Note that even though only a single O_COS_Q 280 is not sending data, the iPQ 190 only maintains credits on an port 110 basis, not a class of service basis. Thus, the effected iPQ 190 will stop sending all data to the port 114, including data with a different class of service that could be transmitted over the port 114. In addition, since the iPQ 190 services an entire I/O board 120, all traffic to that egress port 114 from any of the ports 110 on that board 120 is stopped. Other iPQs 190 on other I/O boards 120, 122 can continue sending packets to the same egress port 114 as long as those other iPQs 190 have backplane credits for that port 114.

Thus, the backplane credit system 510 can provide some internal switch flow control from ingress to egress on the basis of a virtual channel 240, but it is inconsistent. If two ingress ports 112 on two separate I/O boards 120, 122 are each sending data to different virtual channels 240 on the same ISL 230, the use of backplane credits will flow control those channels 240 differently. One of those virtual channels 240 might have an XOFF condition. Packets to that O_COS_Q 280 will back up, and backplane credits will not be returned. The lack of backplane credits will cause the iPQ 190 sending to the XOFFed virtual channel 240 to stop sending data. Assuming the other virtual channel does not have an XOFF condition, credits from its O_COS_Q 280 to the other iPQ 190 will continue, and data will flow through that channel 240. However, if the two ingress ports 112 sending to the two virtual channels 240 utilize the same iPQ 190, the lack of returned backplane credits from the XOFFed O_COS_Q 280 will stop traffic to all virtual channels 240 on the ISL 230.

b) Input to Fabric Flow Control 520

Figure 8:
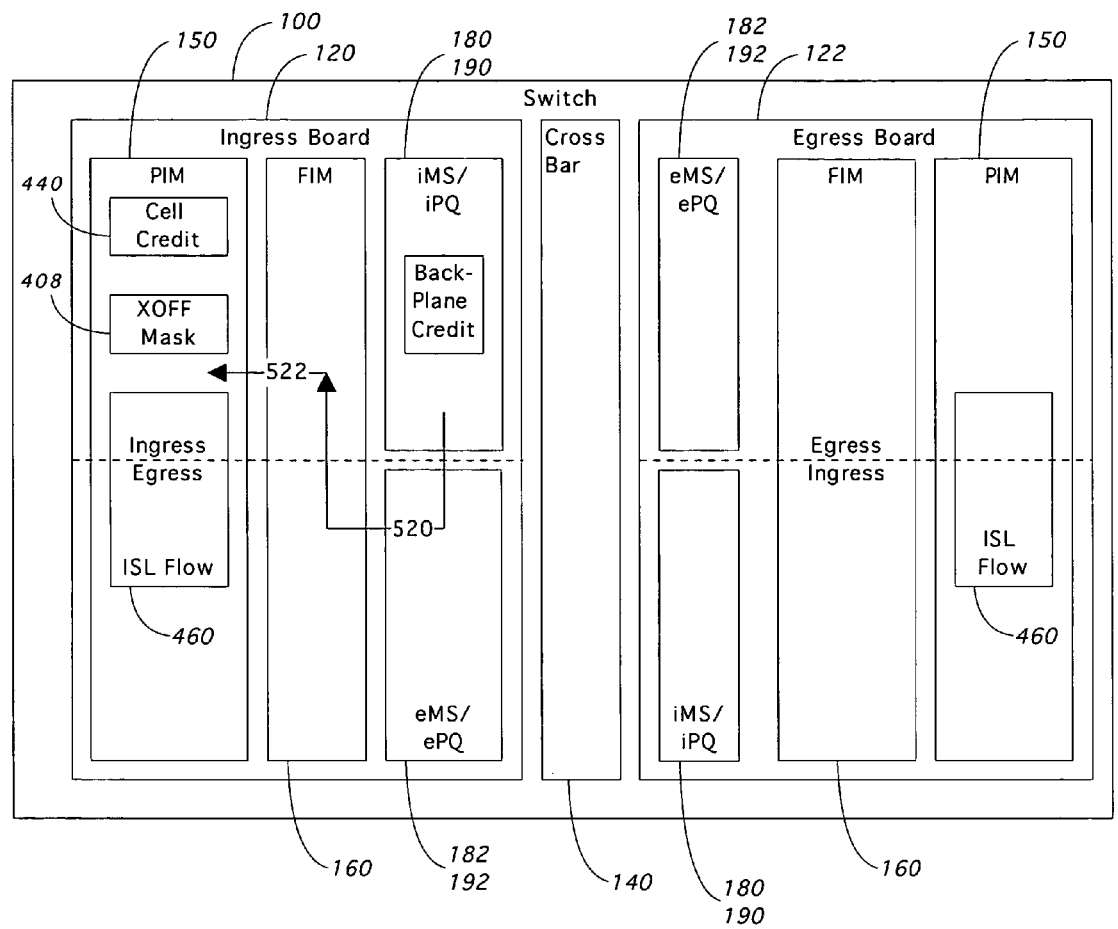
FIG. 8 is a block diagram showing flow control between the ingress memory subsystem and the protocol interface module in the switch of FIG. 1.

The cell-based switch fabric must be able to stop the flow of data from its data source (i.e., the FIM 160) whenever the iMS 180 or a V_O_Q 290 maintained by the iPQ 190 is becoming full. The switch fabric signals this XOFF condition by setting the RDY (ready) bit to 0 on the cells it returns to the FIM 160, shown as flow control 520 on FIG. 8. Although this XOFF is an input flow control signal between the iMS 180 and the ingress portion of the PPD 130, the signals are communicated from the eMS 182 into the egress portion of the same PPD 130. When the egress portion of the FIM 160 receives the cells with RDY set to 0, it informs the ingress portion of the PPD 130 to stop sending data to the iMS 180.

There are three situations where the switch fabric may request an XOFF or XON state change. In every case, flow control cells 520 are sent by the eMS 182 to the egress portion of the FIM 160 to inform the PPD 130 of this updated state. These flow control cells use the RDY bit in the cell header to indicate the current status of the iMS 180 and its related queues 290.

In the first of the three different situations, the iMS 180 may fill up to its threshold level. In this case, no more traffic should be sent to the iMS 180. When a FIM 160 receives the flow control cells 520 indicating this condition, it sends a congestion signal (or "gross_xoff" signal) 522 to the XOFF mask 408 in the memory controller 310. This signal informs the memory control module 310 to stop all data traffic to the iMS 180. The FIM 160 will also broadcast an external signal to the FIMs 160 on its PPD 130, as well as to the other three PPDs 130 on its I/O board 120, 122. When a FIM 160 receives this external signal, it will send a gross_xoff signal 522 to its memory controller 310. Since all FIMs 160 on a board 120, 122 send the gross_xoff signal 522, all traffic to the iMS 180 will stop. The gross_xoff signal 522 will remain on until the flow control cells 520 received by the FIM 160 indicate the buffer condition at the iMS 180 is over.

In the second case, a single V_O_Q 290 in the iMS 180 fills up to its threshold. When this occurs, the signal 520 back to the PPD 130 will behave just as it did in the first case, with the generation of a gross_xoff congestion signal 522 to all memory control modules 310 on an I/O board 120, 122. Thus, the entire iMS 180 stops receiving data, even though only a single V_O_Q 290 has become congestion.

The third case involves a failed link between a FIM 160 and the iMS 180. Flow control cells indicating this condition will cause a gross_xoff signal 522 to be sent only to the MCM 310 for the corresponding FIM 160. No external signal is sent to the other FIMs 160 in this situation, meaning that only the failed link will stop sending data to the iMS 180.

c) Output from Fabric Flow Control 530

Figure 9:
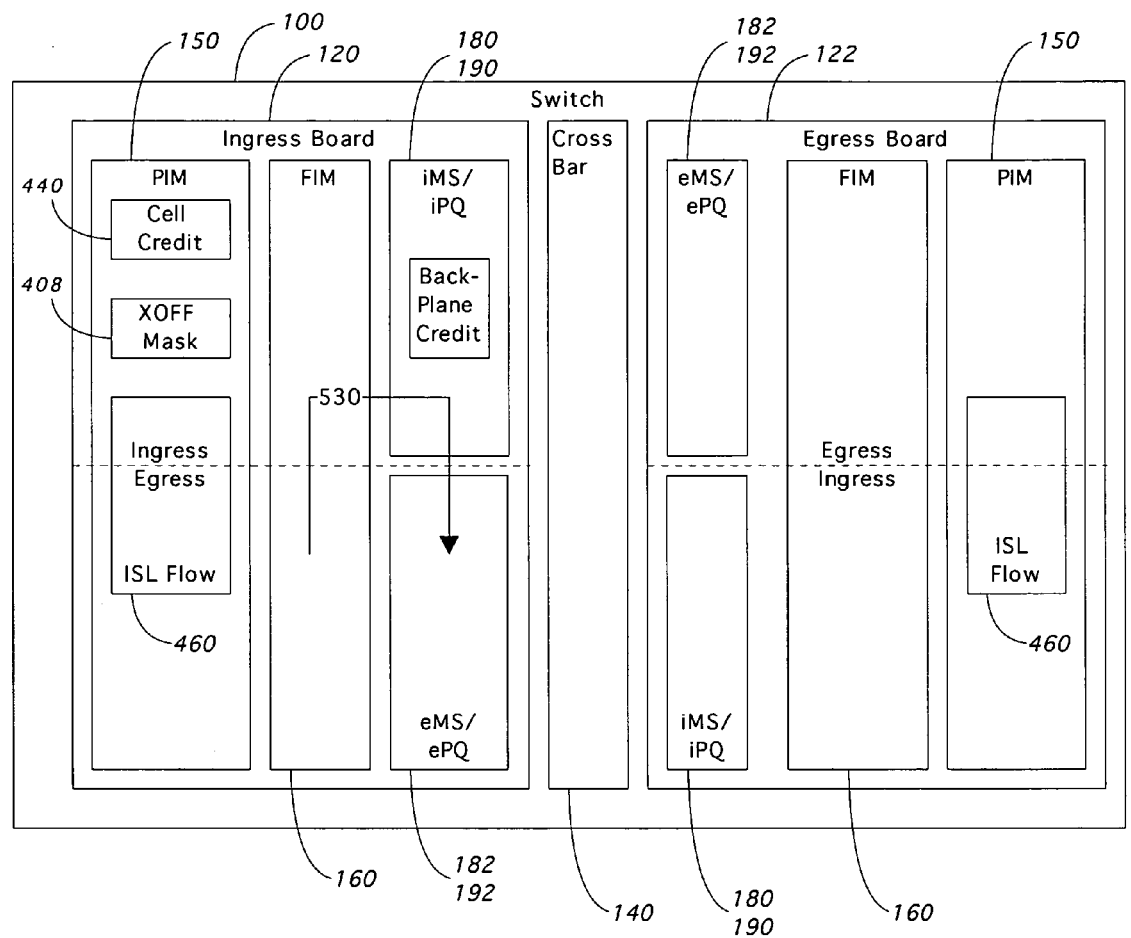
FIG. 9 is a block diagram showing flow control between the fabric interface module and the egress memory subsystem in the switch of FIG. 1.
Figure 10:
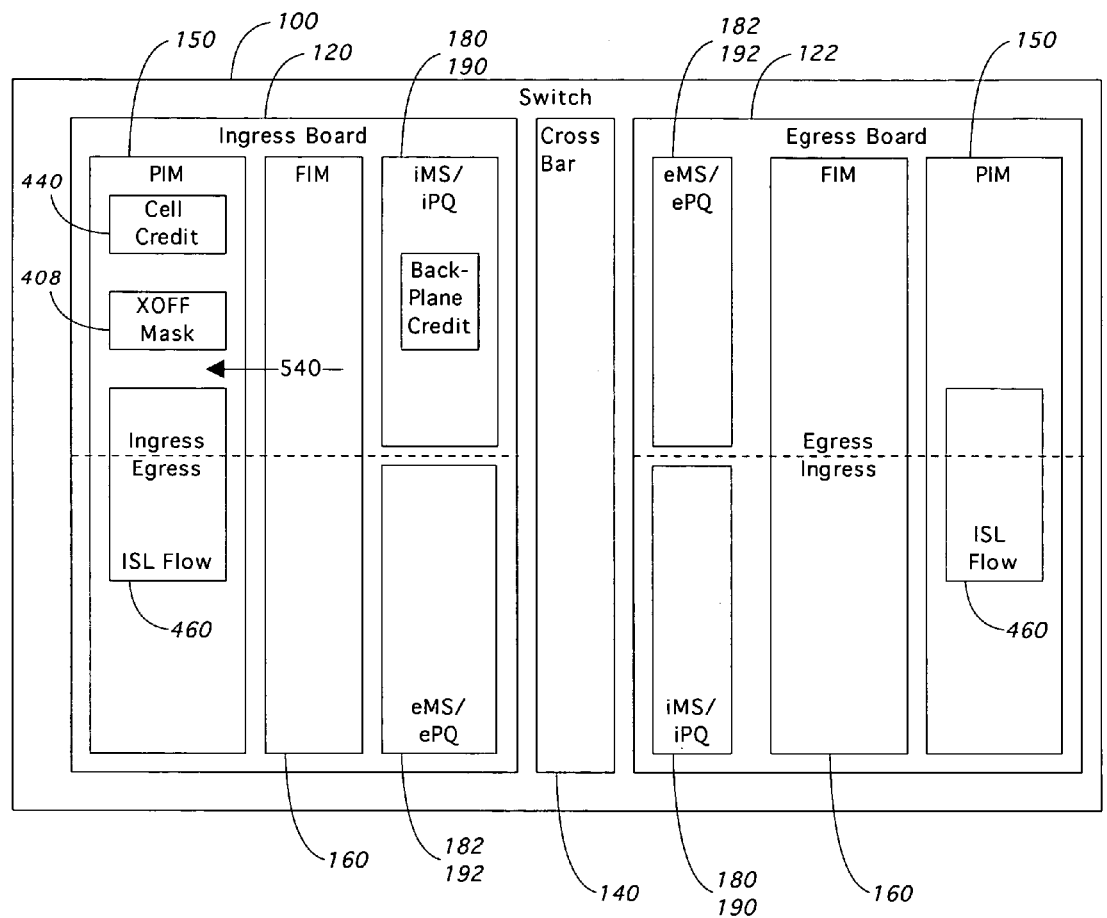
FIG. 10 is a block diagram showing flow control between the fabric interface module and the protocol interface module in the switch of FIG. 1.

When an egress portion of a PPD 130 wishes to stop traffic coming from the eMS 182, it signals an XOFF to the switch fabric by sending a cell from the input FIM 160 to the iMS 180, which is shown as flow control 530 on FIG. 9. The cell header contains a queue flow control field and a RDY bit to help define the XOFF signal. The queue flow control field is eleven bits long, and can identify the class of service, port 110 and PPD 130, as well as the desired flow status (XON or XOFF).

The OPM 450 maintains separate buffers for real data heading for an egress port 114 and data heading for a microprocessor 124. These buffers are needed because buffering of data within the OPM 450 is often needed. For instance, the fabric interface module 160 may send data to the OPM 450 at a time when the link controller module 300 cannot accept that data, such as when the link controller 300 is accepting microprocessor traffic directed to the port 110. In addition, the OPM 450 will maintain separate buffers for each FIM 160 connection to the iMS 180. Thus, an OPM 450 that has two FIM 160 connections and handles both real data and microprocessor data will have a total of four buffers.

With separate real-data buffers and microprocessor traffic buffers, the OPM 450 and the eMS 182 can manage real data flow control separately from the microprocessor directed data flow. In order to manage flow control differently based upon these destinations, separate flow control signals are sent through the iMS 180 to the eMS 182.

When the fabric-to-port buffer or fabric-to-micro buffer becomes nearly full, the OPM 450 sends "f2p_xoff" or a "f2m_xoff" signal to the FIM 160. The FIM 160 then sends the XOFF to the switch fabric in an ingress cell header directed toward iMS 180. The iMS 180 extracts each XOFF instruction from the cell header, and sends it to the eMS 182, directing the eMS 182 to XOFF or XON a particular O_COS_Q 280. If the O_COS_Q 280 is sending a packet to the FIM 160, it finishes sending the packet. The eMS 182 then stops sending fabric-to-port or fabric-to-micro packets to the FIM 160.

As explained above, microprocessor traffic in the preferred embodiment is directed toward on PPD 3, port 3, COS 7. Hence, only the OPM 450 associated with the third PPD 130 needs to maintain buffers relating to microprocessor traffic. In the preferred embodiment, this third PPD 130 utilizes two connections to the eMS 182, and hence two microprocessor traffic buffers are maintained. In this configuration, four different XOFF signals can be sent to the switch fabric, two for traffic directed to the ports 110 and two for traffic directed toward the microprocessor 124.

d) Flow Control 540 between PIM 150 and FIM 160

Flow control is also maintained between the memory controller module 310 and the ingress portion of the FIM 160. The FIM 160 contains an input frame buffer that receives data from the MCM 310. Under nominal conditions, this buffer is simply a pass through intended to send data directly through the FIM 160. In real world use, this buffer may back up for several reasons, including a bad link. There will be a watermark point that will trigger flow control back to the MCM 310. When the buffer level exceeds this level, a signal known as a gross_XOFF 540 (FIG. 10) is asserted, which directs the MCM 310 to stop all flow of data to the FIM 160.

5. Congestion Notification a) XOFF Mask 408

Figure 11:
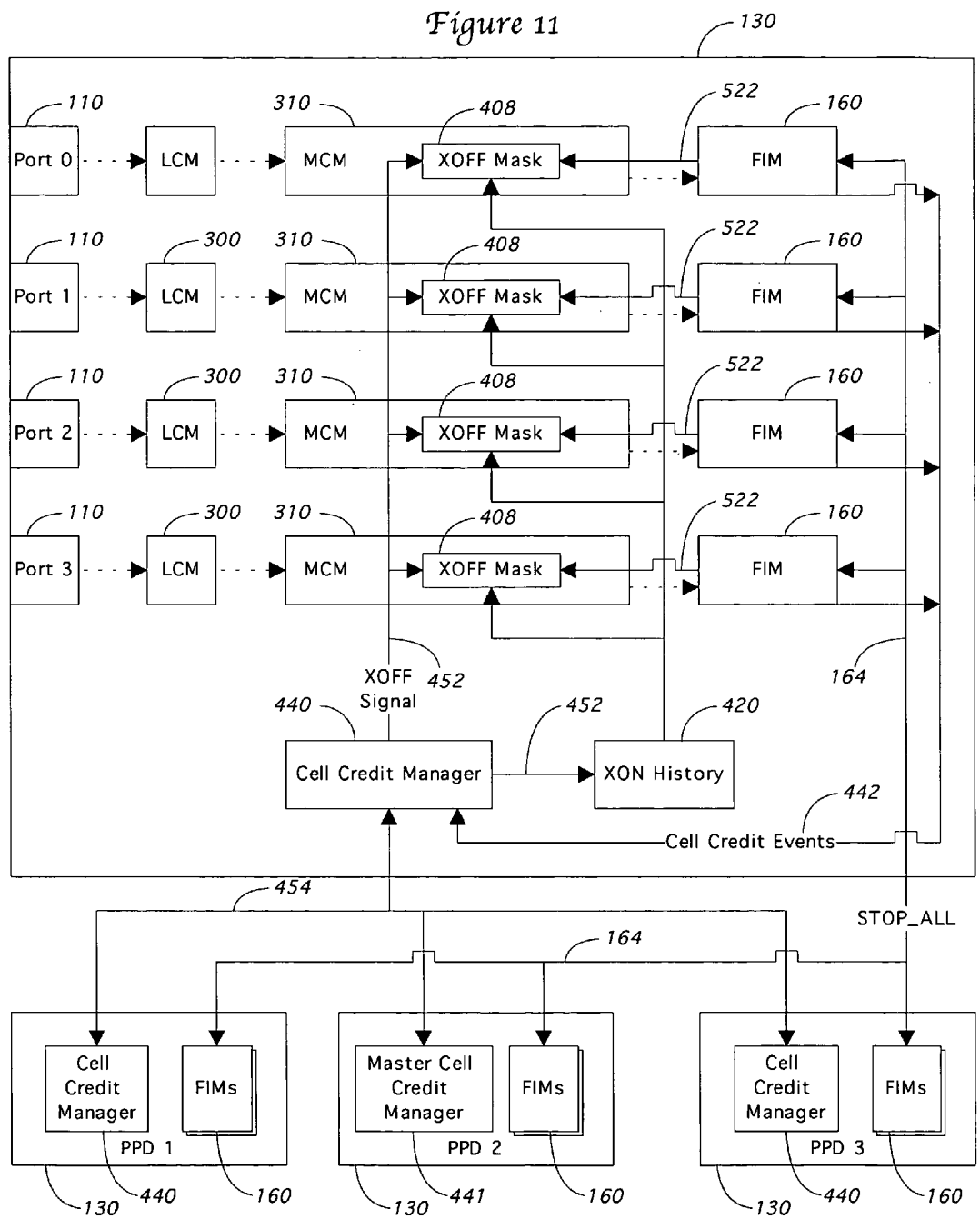
FIG. 11 is a block diagram showing the interactions of the fabric interface modules, the XOFF masks, and the cell credit manager in the switch of FIG. 1.
Figure 12:
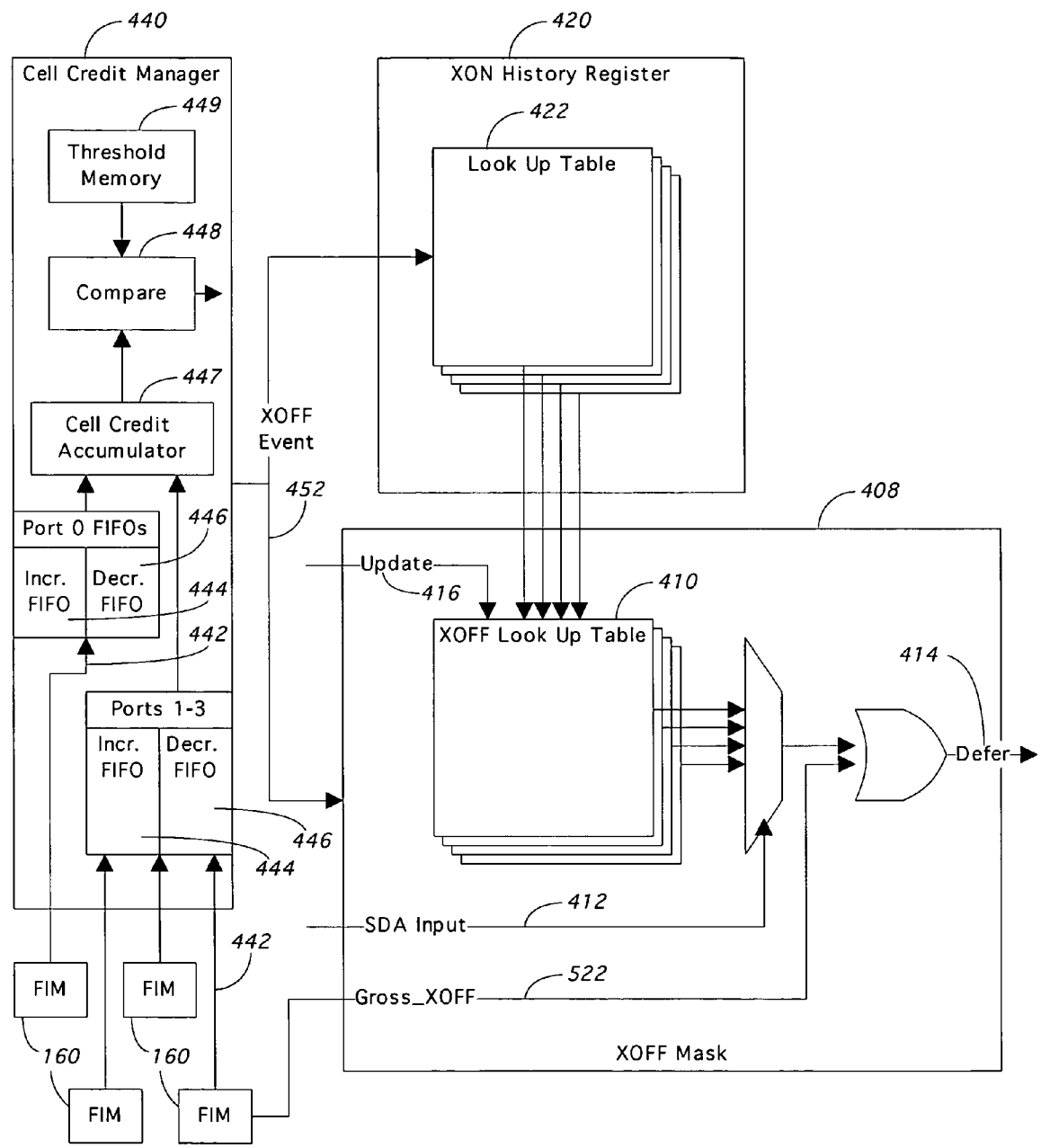
FIG. 12 is a block diagram showing the details of the cell credit manager, the XON history register, and the XOFF mask in the switch of FIG. 1.

The XOFF mask 408 shown in FIG. 12 is responsible for notifying the ingress ports 112 of the congestion status of all egress ports 114 and microprocessors 124 in the switch. Every port 112 has its own XOFF mask 408, as shown in FIG. 11. The XOFF mask 408 is considered part of the queue control module 400 in the memory controller 310, and is therefore shown within the MCM 330 in FIG. 11.

Each XOFF mask 408 contains a separate status bit for all destinations within the switch 100. In one embodiment of the switch 100, there are five hundred and twelve physical ports 110 and thirty-two microprocessors 124 that can serve as a destination for a frame. Hence, the XOFF mask 408 uses a 544 by 1 look up table 410 to store the "XOFF" status of each destination. If a bit in XOFF look up table 410 is set, the port 110 corresponding to that bit is busy and cannot receive any frames.

In the preferred embodiment, the XOFF mask 408 returns a status for a destination by first receiving the switch destination address for that port 110 or microprocessor 124 on SDA input 412. The look up table 410 is examined for the SDA on input 412, and if the corresponding bit is set, the XOFF mask 408 asserts a signal on "defer" output 414, which indicates to the rest of the queue control module 400 that the selected port 110 or processor 124 is busy. This construction of the XOFF mask 408 is the preferred way to store the congestion status of possible destinations at each port 110. Other ways are possible, as long as they can quickly respond to a status query about a destination with the congestion status for that destination.

In the preferred embodiment, the output of the XOFF look up table 410 is not the sole source for the defer signal 414. In addition, the XOFF mask 408 receives the gross_xoff signal 522 from its associated FIM 160. This signal 522 is ORed with the output of the lookup table 410 in order to generate the defer signal 414. This means that whenever the gross_xoff signal 522 is set, the defer signal 414 will also be set, effectively stopping all traffic to the iMS 180. In another embodiment (not shown), a force defer signal that is controlled by the microprocessor 124 is also able to cause the defer signal 414 to go on. When the defer signal 414 is set, it informs the header select logic 406 and the remaining elements of the queue module 400 that the port 110 having the address on next frame header output 415 is congested, and this frame should be stored on the deferred queue 402.

b) XOFF History Register 420

The XON history register 420 is used to record the history of the XON status of all destinations in the switch 100. Under the procedure established for deferred queuing, the XOFF mask 408 cannot be updated with an XON event when the queue control 400 is servicing deferred frames in the deferred queue 402. During that time, whenever a port 110 changes status from XOFF to XON, the XOFF mask 408 will ignore (or not receive) the XOFF signal 452 from the cell credit manager 440 and will therefore not update its lookup table 410. The signal 452 from the cell credit manager 440 will, however, update the lookup table 422 within the XON history register 420. Thus, the XON history register 420 maintains the current XON status of all ports 110. When the update signal 416 is made active by the header select 406 portion of the queue control module 400, the entire content of the lookup table 422 in the XON history register 420 is transferred to the lookup table 410 of the XOFF mask 408. Registers within the table 422 containing a zero (having a status of XON) will cause corresponding registers within the XOFF mask lookup table 410 to be reset to zero. The dual register setup allows for XOFFs to be written directly to the XOFF mask 408 at any time the cell credit manager 440 requires traffic to be halted, and causes XONs to be applied only when the logic within the queue control module 400 allows for a change to an XON value. While a separate queue control module 400 and its associated XOFF mask 408 is necessary for each port 110 in the PPD 130, only one XON history register 420 is necessary to service all four ports 110 in the PPD 130, which again is shown in FIG. 11.

c) Cell Credit Manager 440

The cell credit manager or credit module 440 sets the XOFF/XON status of the possible destination ports 110 in the lookup tables 410, 422 of the XOFF mask 408 and the XON history register 420. To update these tables 410, 422, the cell credit manager 440 maintains a cell credit count of every cell in the virtual output queues 290 of the iMS 180. Every time a cell addressed to a particular SDA leaves the FIM 160 and enters the iMS 180, the FIM 160 informs the credit module 440 through a cell credit event signal 442. The credit module 440 then decrements the cell count for that SDA. Every time a cell for that destination leaves the iMS 180, the credit module 440 is again informed and adds a credit to the count for the associated SDA. The iPQ 190 sends this credit information back to the credit module 440 by sending a cell containing the cell credit back to the FIM 160 through the eMS 182. The FIM 160 then sends an increment credit signal 442 to the cell credit manager 440. This cell credit flow control is designed to prevent the occurrence of more drastic levels of flow control from within the cell-based switch fabric described above, since these flow control signals 500–520 can result in multiple blocked ports 110, shutting down an entire iMS 180, or even the loss of data.

In the preferred embodiment, the cell credits are tracked through increment and decrement credit events 442 received from FIM 160. These events are stored in dedicated increment FIFOs 444 and decrement FIFOs 446. Each FIM 160 is associated with a separate increment FIFO 444 and a separate decrement FIFO 446, although ports 1–3 are shown as sharing FIFOs 444, 446 for the sake of simplicity. Decrement FIFOs 446 contain SDAs for cells that have entered the iMS 180. Increment FIFOs 444 contain SDAs for cells that have left the iMS 180. These FIFOs 444, 446 are handled in round robin format, decrementing and incrementing the credit count that the credit module 440 maintains for each SDA in its cell credit accumulator 447. In the preferred embodiment, the cell credit accumulator 447 is able to handle one increment event from one of the FIFOs 444 and one decrement event from one of the FIFOs 446 at the same time. An event select logic services the FIFOs 444, 446 in a round robin manner while monitoring the status of each FIFOs 444, 446 so as to avoid giving access to the accumulator 447 to empty FIFOs 444, 446.

The accumulator 447 maintains separate credit counts for each SDA, with each count reflecting the number of cells contained within the iMS 180 for a given SDA. A compare module 448 detects when the count for an SDA within accumulator 447 crosses an XOFF or XON threshold stored in threshold memory 449. When a threshold is crossed, the compare module 448 causes a driver to send the appropriate XOFF or XON event 452 to the XOFF mask 408 and the XON history register 420. If the count gets too low, then that SDA is XOFFed. This means that Fibre Channel frames that are to be routed to that SDA are held in the credit memory 320 by queue control module 400. After the SDA is XOFFed, the credit module 440 waits for the count for that SDA to rise to a certain level, and then the SDA is XONed, which instructs the queue control module 400 to release frames for that destination from the credit memory 320. The XOFF and XON thresholds in threshold memory 449 can be different for each individual SDA, and are programmable by the processor 124.

When an XOFF event or an XON event occurs, the credit module 440 sends an XOFF instruction 452 to the XON history register 420 and all four XOFF masks 408 in its PPD 130. In the preferred embodiment, the XOFF instruction 452 is a three-part signal identifying the SDA, the new XOFF status, and a validity signal.

In the above description, each cell credit manager 440 receives communications from the FIMs 160 on its PPD 130 regarding the cells that each FIM 160 submits to the iMS 180. The FIMs 160 also report back to the cell credit manager 440 when those cells are submitted by the iMS 180 over the crossbar 140. As long as the system works as described, the cell credit managers 440 are able to track the status of all cells submitted to the iMS 180. Even though each cell credit manager 440 is only tracking cells related to its PPD 130 (approximately one fourth of the total cells passing through the iMS 180), this information could be used to implement a useful congestion notification system.

Unfortunately, the preferred embodiment ingress memory system 180 manufactured by AMCC does not return cell credit information to the same FIM 160 that submitted the cell. In fact, the cell credit relating to a cell submitted by the first FIM 160 on the first PPD 130 might be returned by the iMS 180 to the last FIM 160 on the last PPD 130. Consequently, the cell credit managers 440 cannot assume that each decrement credit event 442 they receive relating to a cell entering the iMS 180 will ever result in a related increment credit event 442 being returned to it when that cell leaves the iMS 180. The increment credit event 442 may very well end up at another cell credit manager 440.

To overcome this issue, an alternative embodiment of the present invention has the four cell credit managers 440 on an I/O board 120, 122 combine their cell credit events 442 in a master/slave relationship. In this embodiment, each board 120, 122 has a single "master" cell credit manager 441 and three "slave" cell credit manager 440. When a slave unit 440 receives a cell credit event signal 442 from a FIM 160, the signal 442 is forwarded to the master cell credit manager 441 over a special XOFF bus 454 (as seen in FIG. 11). The master unit 441 receives cell credit event signals 442 from the three slave units 440 as well as the FIMs 160 that directly connect to the master unit 441. In this way, the master cell credit manager 441 receives the cell credit event signals 442 from all of the FIMs 160 on an I/O board 120. This allows the master unit to maintain a credit count for each SDA in its accumulator 447 that reflects all data cells entering and leaving the iMS 180.

The master cell credit manager 441 is solely responsible for maintaining the credit counts and for comparing the credit counts with the threshold values stored in its threshold memory 449. When a threshold is crossed, the master unit 441 sends an XOFF or XON event 452 to its associated XON history register 420 and XOFF masks 408. In addition, the master unit 441 sends an instruction to the slave cell credit managers 440 to send the same XOFF or XON event 452 to their XON history registers 420 and XOFF masks 408. In this manner, the four cell credit managers 440, 441 send the same XOFF/XON event 452 to all four XON history registers 442 and all sixteen XOFF masks 408 on the I/O board 120, 122, effectively unifying the cell credit congestion notification across the board 120, 122.

Due to error probabilities, there is a possibility that the cell credit counts in accumulator 447 may drift from actual values over time. The present invention overcomes this issue by periodically re-syncing these counts. To do this, the FIM 160 toggles a 'state' bit in the headers of all cells sent to the iMS 180 to reflect a transition in the system's state. At the same time, the credit counters in cell credit accumulator 447 are restored to full credit. Since each of the cell credits returned from the iMS 180/eMS 182 includes an indication of the value of the state bit in the cell, it is possible to differentiate credits relating to cells sent before the state change. Any credits received by the FIM 160 that do not have the proper state bit are ignored. After the iMS 180 recognizes the state change, credits will only be returned for those cells indicating the new state. In the preferred embodiment, this changing of the state bit and the re-syncing of the credit in cell credit accumulator 447 occurs approximately every eight minutes, although this time period is adjustable under the control of the processor 124.

Figure 13:
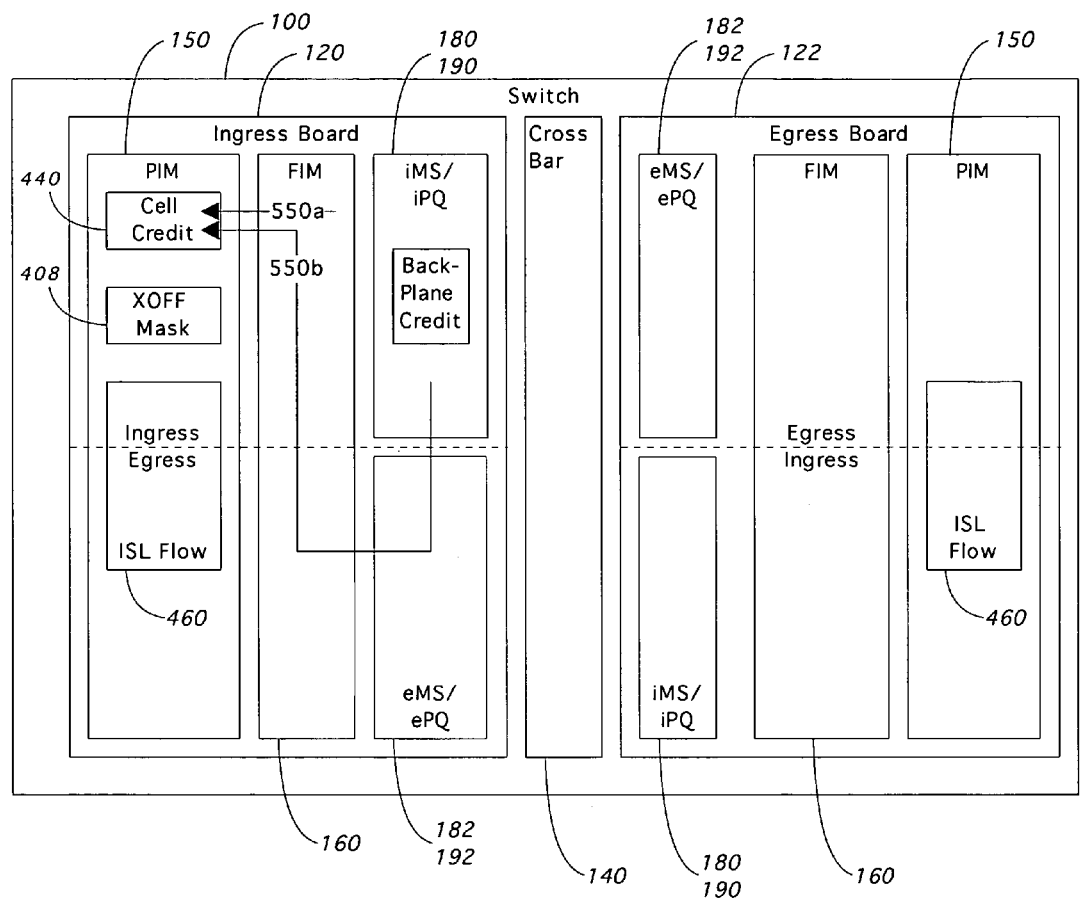
FIG. 13 is a block diagram showing cell credit flow control of the present invention as maintained by the protocol interface module in the switch of FIG. 1.

Every time a cell addressed to a particular SDA leaves the FIM 160 and enters the iMS 180, the FIM 160 informs the credit module 440 through a cell credit event signal 550*a* (FIG. 13). The credit module 440 then decrements the cell count for that SDA. Every time a cell for that destination leaves the iMS 180, the credit module 440 is again informed (550*b*) and adds a credit to the count for the associated SDA. The iPQ 190 sends this credit information back to the credit module 440 by sending a cell containing the cell credit back to the FIM 160 through the eMS 182. The FIM 160 then sends an increment credit signal to the cell credit manager 440.

6. Flow Control Between Switches 560 a) Signaling XOFF Conditions for a Logical Channel 240

The present invention is able to use the above described queuing mechanisms to control the flow over individual logical channels 240 on the ISL 230. This is shown as flow control 560 in FIG. 14. The ISL flow control component 460 in the downstream PPD 272 is responsible for initiating this flow control 560.

As seen in FIG. 3, the flow control component 460 includes a logical channel mask register (LCMR) 462, which is a multi-bit register having a bit for every possible destination within the switch. A separate LCMR 462 exists for each logical channel 240 across the ISL 230. The bits inside each LCMR 462 indicate which destinations are participating in that logical channel 240. The microprocessor 124 writes '1' to the bit position in a logical channel mask 462 that corresponds to the destinations of that logical channel 240. For example, if port destinations 3, 20 and 7 F (hex) were participating in a logical channel, then bit positions 3, 32, and 511 (decimal) would be set and all other bit positions would be held clear.

Each of the "n" LCMRs 462 create a complete mapping between one of the logical channels 240 on the attached ISL 230 and the ports 110 in the downstream switch 270 that are accessed by that logical channel 240. Thus, with one per each logical channel, the LCMRs 462 completely embody the virtual input queues (or V_I_Qs) 282 shown in FIG. 5. This mapping is essential to allow congestion on a physical port 110 in downstream switch 270 to be associated with a logical channel 240 on the ISL 230. Without it, it would not be possible to use knowledge about a congested port 110 on the downstream switch 270 to XOFF the logical channel or channels 240 that are submitting data to that port 110.

Figure 14:
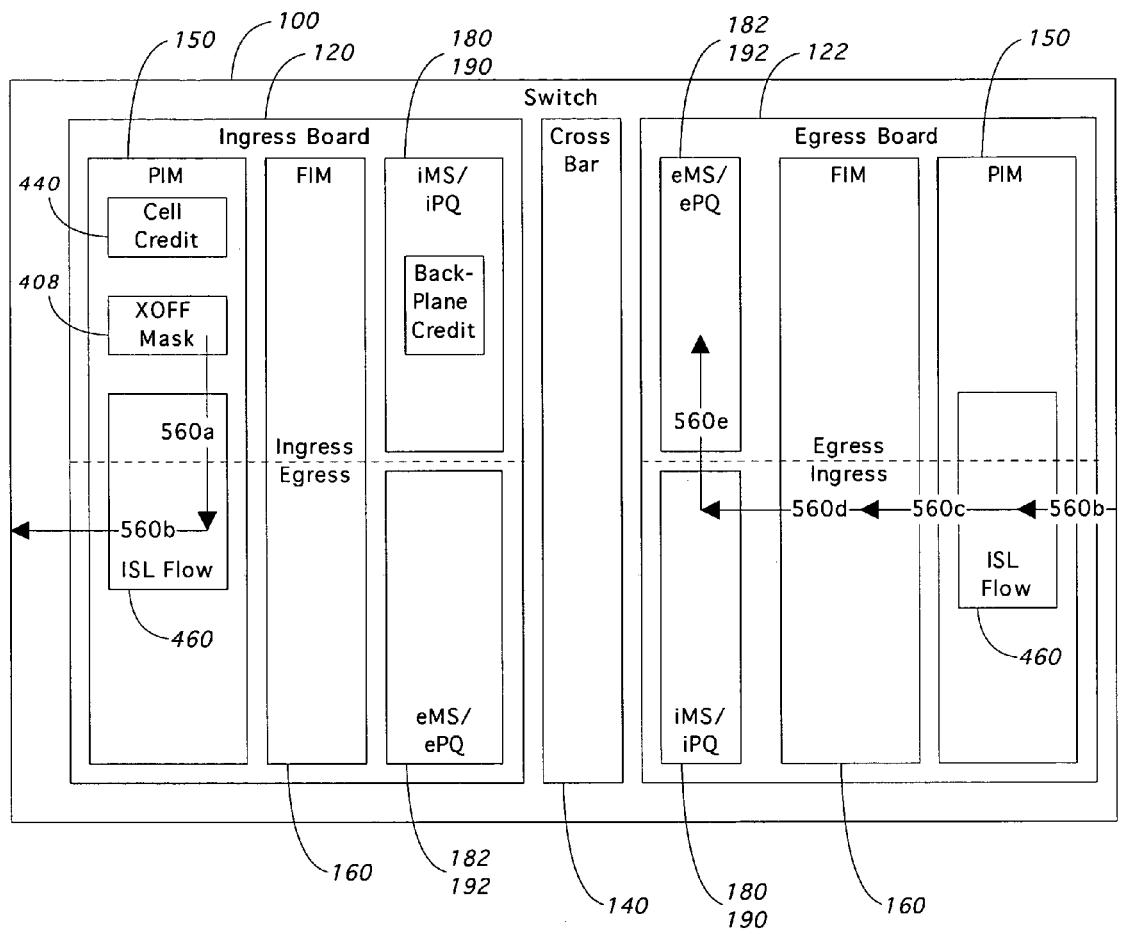
FIG. 14 is a block diagram showing flow control of the present invention between a downstream switch and an upstream switch over an interswitch link.

To determine whether a port 110 is congested, each LCMR 462 is connected to the XOFF mask 408 in queue control 400 (seen as message path 560*a* on FIG. 14). Alternatively, the LCMR 462 can be connected to the XON history register 420, which already needs the ability to output all status bits simultaneously when updating the XOFF mask 408. Either way, the XOFF bits are presented to the LCMR 462 from the XOFF mask 408 or XON history register 420. Only those XOFF bits that are set to "1" both at the XOFF mask 408/XON history register 420 and in the LCMR 462 pass through the LCMR 462 as set to "1"—all other bits will be set to "0". All of these bits are then ORed together to provide a single XOFF bit for each logical channel 240. This means that any participant in a logical channel 240 that has an XOFF status causes an XOFF condition for the entire logical channel.

The current status register 464 receives the XOFF signals and converts them to an 8-bit current status bus 466, one bit for every logical channel 240 on the ISL. If more than eight logical channels 240 were defined on the ISL 230, more bits would appear on the bus 466. The current status bus 466 is monitored for any changes by compare circuitry 468. If a change in status is detected, the new status is stored in the last status register 470 and the primitive generate logic 472 is notified. If the port 110 is enabled to operate as an ISL 230, the primitive generate logic 472 uses the value on the current status bus 466 value to generate a special XOFF/XON primitive signal 560*b* to be sent to the upstream switch 260 by way of the ISL 230.

Figure 15:
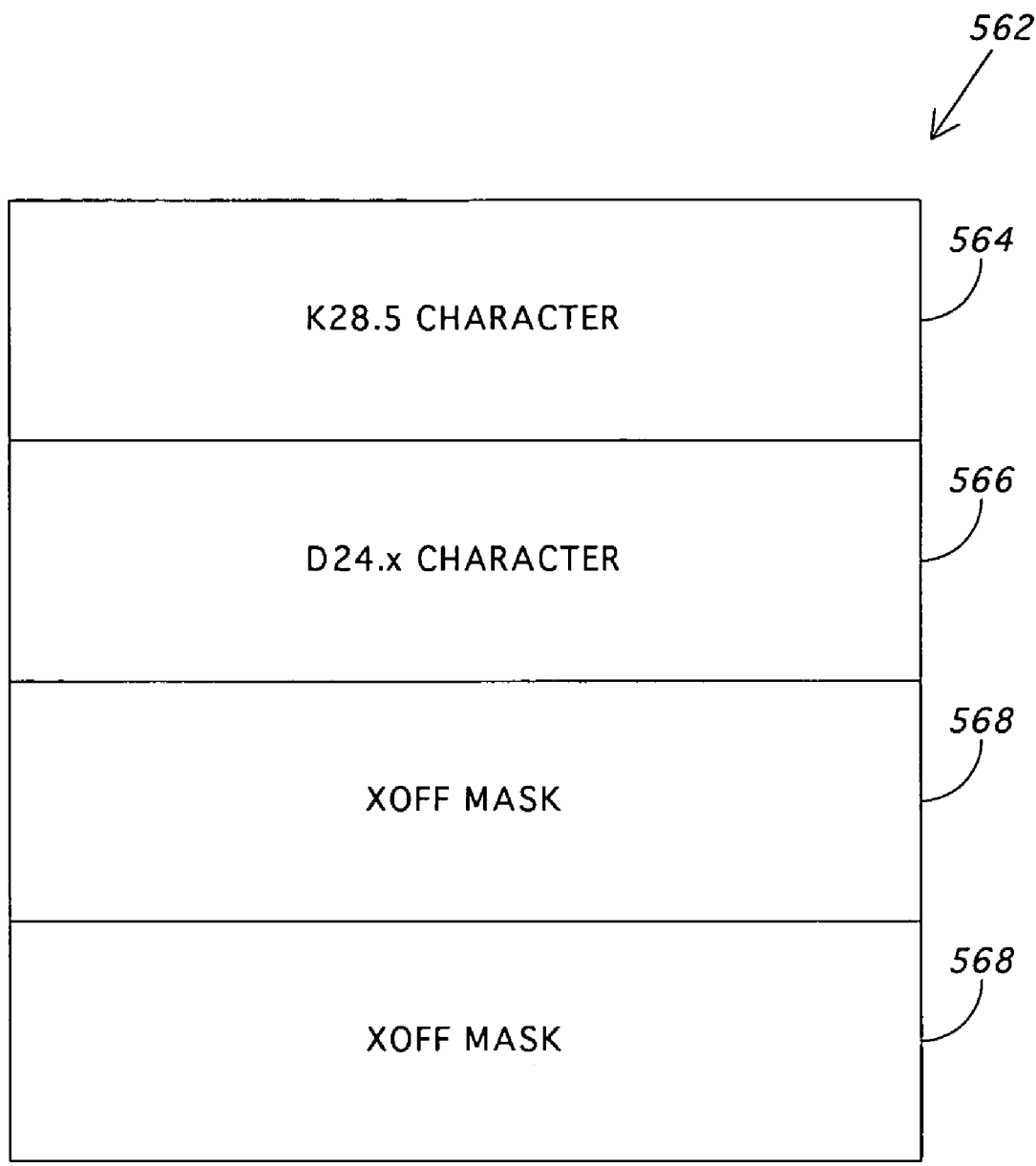
FIG. 15 is a block diagram of a flow control primitive used in the flow control scheme of FIG. 14.

The XOFF XON primitive signal 560*b* sends a Fibre Channel primitive 562 from the downstream switch 270 to the upstream switch 260. The primitive 562 sent is four bytes long, as shown in FIG. 15. The first byte of the primitive is a K28.5 character 564, which is used to identify the word as a primitive. The next character in the primitive 562 is a D24.x character 566, which can be a D24.1 character, a D24.2 character, a D24.3 character, etc. These D24.x characters are unused by other Fibre Channel primitives. Two identical copies of the XOFF mask 568 follow the D24.x character 566. The XOFF mask 568 is 8 bits long, each bit representing the XOFF status of a single virtual channel 240. The first two characters 564, 566 in the XOFF primitive 562 are chosen such that any XOFF mask 568 can be appended to them in duplicate and the primitive 562 will always end with negative running disparity, as is required by Fibre Channel protocols.

When more then eight logical channels 240 are used in the ISL 230, the primitive generate logic 472 runs multiple times. The second character 566 of the primitive indicates which set of XOFF signals are being transmitted. For example, the D24.1 character can be used to identify the primitive 562 as containing the XOFF status for channels 0 through 7, D24.2 can identify channels 8 through 15, D24.3 can identify channels 16 through 23, and D24.5 can identify channels 24 through 31.

When the primitive is ready, the primitive generate logic 472 will notify the link controller module 300 that the primitive 562 is ready to be sent to the upstream switch 260 out the ISL 230. When the primitive 562 is sent, the LCM 300 will respond with a signal so informing the ISL flow control 460. After approximately 40 microseconds, the primitive 562 will be sent again in case the upstream switch 260 did not properly receive the primitive 562. The process of sending the XOFF mask 568 twice within a primitive signal 560b, including the present status of all logical channels 240 within the signal 560b, and periodically retransmitting the primitive signal 560b insure robust signaling integrity.

The length of the interswitch link 230, together with the number of buffers available in credit memory 320, influence the effectiveness of logical channels 240. Credit memory 320 must buffer all frames in transit at the time XOFF primitive 562 is generated as well as those frames sent while the XOFF primitive 562 is in transit from the downstream switch 270 to the upstream switch 260. In the preferred embodiment, the credit memory buffers 320 will support single logical channel links 230 of one hundred kilometers. Considering latencies from all sources, an embodiment having eight logical channels 240 is best used with interswitch links 230 of approximately ten kilometers in length or less. Intermediate link distances will operate effectively when proportionately fewer logical channels 240 are active as link distance is increased.

b) Receiving XOFF Primitive Signal at Egress Port

The ISL egress port 114 receives the XOFF primitive 560b that is sent from the downstream switch 270 over the ISL 230. In FIG. 14, primitive 560b is shown being both sent and received by the same switch 100. This is done for the purpose of explaining the present invention. In the real world, the primitive 560b is sent by the downstream switch 270 and received by the upstream switch 260. When the LCM 300 receives the XON/XOFF primitive 562 sent by the downstream switch 270, the LCM 300 will recognize the primitive 562 and send it directly to the frame check logic 480 of the ISL flow control module 460. The frame check logic 480 checks that the 3rd and 4th bytes of the primitive 562 are equal, strips the XOFF mask 568 from the primitive 562, and places it in the status received register 482. This register 482 has a single bit for every logical channel 240 on the ISL 230. Since the current XOFF status is the only status that is of concern, the status register 482 is always overwritten. However, if the 3rd and 4th bytes are not equal in value, then primitive 562 is considered invalid, the status register 482 is not updated and the last status is used until the next valid special primitive 562 is received.

Compare logic 484 determines when status received register 482 has changed and on which logical channels 240 status has changed. When a status bit changes in the register 482, a cell must be generated and sent into the fabric to notify the O_COS_Q 280 to stop sending data for that logical channel 240. The flow control cell arbiter 486 is used to handle cases where more than one status bit changes at the same time. The arbiter 486 may use a round robin algorithm. If a cell has to be generated to stop an O_COS_Q 280, the arbiter 486 sends to the FIM 160 a generate signal and a status signal (jointly shown as 560c in FIG. 14) for that O_COS_Q 280. The generate signal indicates to the FIM 160 that a flow control cell 560d must be generated and the status signal indicates whether the cell should be an XOFF cell or an XON cell. This cell 560d is then received at the iMS 180, and the iMS 180 instructs the eMS 182 (signal 560e) to XOFF or XON the designated O_COS_Q 280. The fabric interface module 160 informs the arbiter 486 when the flow control cell 560d has been generated. The arbiter 486 can then assert the generate signal for the next highest priority status bit that needs attention.

When the O_COS_Q 280 for a virtual channel 240 is stopped as a result of the ISL flow control signaling 560 received from the downstream switch 270, data in that O_COS_Q 280 will stop flowing from the upstream switch 260 across the ISL 230. Once this occurs, backplane credits 510 will stop being returned across the crossbar 140 from this queue 280 to the iPQ 190. When the iPQ 190 runs out of credits, no more data cells will be sent from the V_O_Q 290 that is associated with the port 110 of the stopped O_COS_Q 280. At this point, the V_O_Q 290 will begin to fill with data. When the threshold for that queue V_O_Q 290 is passed, the iPQ 190 will send a flow control signal 520 to the PPD 130. This flow control signal 520 indicates that the port 110 associated with the filled V_O_Q 190 now has a flow control status of XOFF. This will cause an update to the XOFF mask 408 in memory controller 310. The update to the XOFF mask 408 might in turn cause a new ISL flow control signal 560 to be created and sent to the next switch upstream. In this way, flow control on a virtual channel 240 in an ISL 230 can extend upstream through multiple switches 100, each time stopping only a single virtual channel 240 in each ISL 230.

c) Switch Buffer to Buffer Flow Control

When two switches 260, 270 are connected together over an interswitch link 230, they utilize the same buffer-to-buffer credit based flow control used by all Fibre Channel ports, as shown in FIG. 1. This means that the primitive XOFF signaling 560 that is described above operates in cooperation with the basic BB_Credit flow control over the entire ISL 230.

d) Alternative Virtual Channel Flow Control Techniques

The above description reveals a method of using XOFF/XON signaling to perform flow control on individual virtual channels within an interswitch link. Other techniques would also be available, although they would not be as effective as the technique described above. For instance, it would be possible to simple assign a portion of the credit memory 320 to each virtual channel 240 on an ISL 230. Credits could be given to the upstream switch 260 depending on the size of the memory 320 granted to each channel 240. The upstream switch 260 could then perform credit based flow control for each virtual channel 230. While this technique is more simple than the method described above, it is not as flexible. Furthermore, this technique does not provide the flow control redundancies of having XOFF/XON signaling for each virtual channel 240 within the context of BB_Credit flow control for the entire ISL 230.

Another alternative is to send the entire XOFF mask 408 to the upstream switch 260. However, this mask 408 is much larger than the primitive 562 used in the preferred embodiment. Furthermore, it could be difficult for the upstream switch 260 to interpret the XOFF mask 408 and apply the mask 408 to the virtual channels 240.

e) Class F Frames: Establishing an ISL

Figure 16:
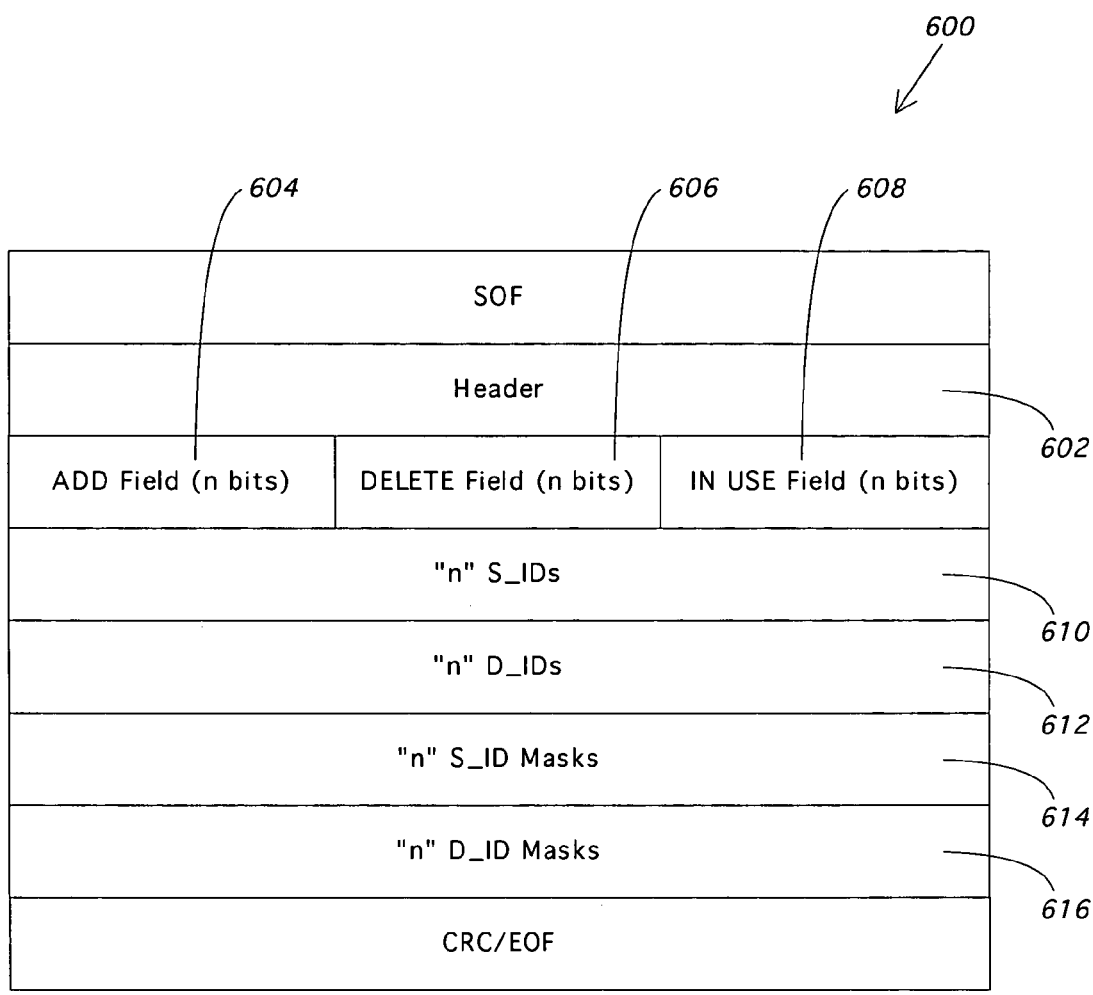
FIG. 16 is a block diagram of an F class frame used to establish virtual channels over an interswitch link in the present invention.

The two switches 260, 270 that communicate over the ISL 230 must establish various parameters before the ISL 230 becomes functional. In all Fibre Channel networks, communication between switches 260, 270 to establish an ISL 230 is done using class F frames. To allow the switches 260, 270 to establish the virtual channels 240 on an ISL 230, the present invention uses special class F frames 600, as shown in FIG. 16. In the preferred embodiment, the F class frames 600 contain a standard header 602 with the R_CTL value set to x0 F (vendor specific class F frame), and both the D_ID and the S_ID set to the fabric controller address (xFFFFFD).

The data payload of frame 600 establishes the logical channel map of the ISL 230. The data portion begins with three fields, an Add field 604, a Delete field 606 and an In Use field 608. Each of these fields is "n" bits long, allowing one bit in each field 604–608 to be associated with one of the "n" logical channels 240 in the ISL 230. Following these fields 604–608 are four multi-valued fields: S_ID values 610, D_ID values 612, S_ID masks 614, and D_ID masks 616. Each of these fields 610–616 contains a total of n values, one for each virtual channel 240. The first entry in the S_ID values 610 and the first entry in the D_ID values 612 make up an S_ID/D_ID pair. If the first bit in the Add field 604 is set (i.e., has a value of "1"), this S_ID/D_ID pair is assigned to the first virtual channel 240 in the ISL 230. Assuming the appropriate bit is set in the ADD field 604, the second S_ID/D_ID pair is assigned to the second virtual channel 240, and so on. If a bit is set on the Delete field 606, then the corresponding S_ID/D_ID pair set forth in values 610 and 612 is deleted from the appropriate virtual channel 240. If the bit value in the Add field 604 and the Delete field 606 are both set (or both not set), no change is made to the definition of that virtual channel 240 by this frame 600.

The mask fields 614, 616 are used to mask out bits in the corresponding values in the S_ID/D_ID pair established in 610, 612. Without the mask values 614, 616, only a single port pair could be included in the definition of a logical channel 240 with each F class frame 600. The S_ID/D_ID mask pairs will allow any of the bits in an S_ID/D_ID to be masked, thereby allowing contiguous S_ID/D_ID pairs to become assigned to a logical channel 240 using a single frame 600. Non-contiguous ranges of S_ID/D_ID pairs are assigned to a virtual channel 240 using multiple F class frames 600.

The logical channel In Use field 608 is used to indicate how many of the "n" paths are actually being used. If all bits in this field 608 are set, all virtual channels 240 in the ISL 230 will be utilized. If a bit in the field 608 is not set, that virtual channel 240 will no longer be utilized.

The switch 100 uses the information in this F class frame 600 to program the inbound routing module 330. The module 330 assigns a priority to each frame destined for the ISL 230 according to its S_ID/D_ID pair and the assignment of that pair to a logical channel 240 according to the exchanged F class frames 600.

7. Deferred Queuing a) Relationship to XOFF mask

Figure 17:
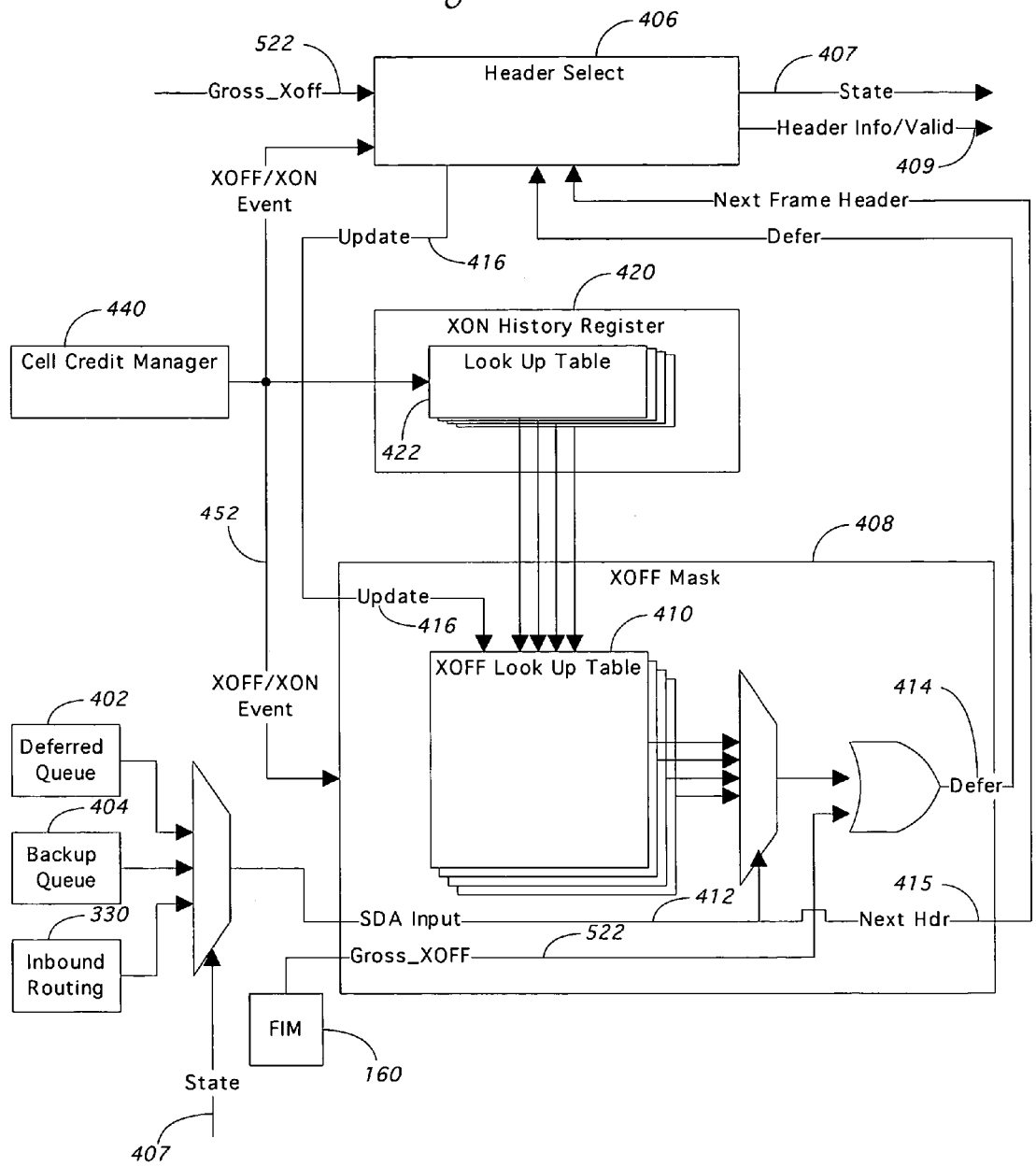
FIG. 17 is a block diagram showing the interactions of the XOFF mask, the XON history register, and the header select component of the queue control module shown in FIG. 3.

As explained above, the XOFF mask 408, shown in FIG. 17, is responsible for notifying the queue control module 400 of the congestion status of all ports 110 and microprocessors 124 in the switch. In the preferred embodiment, the XOFF mask 408 returns a status for a destination by first receiving the switch destination address for that port 110 or microprocessor 124 on SDA input 412. The SDA input 412 contains the switch destination address that is selected from the deferred queue 402, the backup queue 404, or the most recently received frame being analyzed by the inbound routing module 330. The selection of the appropriate address for the XOFF mask 408 is made according to the current "state" 407 of the machine as determined by the header select logic 406. The selected address is made available to the rest of the queue control module through next frame header output 415. The look up table 410 is examined for the SDA on input 412, and the result is ORed with the gross_x-off signal 522 in order to generate the defer signal 414. When the defer signal 414 is set, it informs the header select logic 406 and the remaining elements of the queue module 400 that the port 110 having the address on next frame header output 415 is congested, and this frame should be stored on the deferred queue 402.

The XON history register 420 is used to record the history of the XON status of all destinations in the switch 100. Under the procedure described below for deferred queuing, the XOFF mask 408 cannot be updated with an XON event when the queue control 400 is servicing deferred frames in the deferred queue 402. During that time, whenever a port 110 changes status from XOFF to XON, the XOFF mask 408 will ignore (or not receive) the XOFF signal 452 from the cell credit manager 440 and will therefore not update its lookup table 410. The signal 452 from the cell credit manager 440 will, however, update the lookup table 422 within the XON history register 420. Thus, the XON history register 420 maintains the current XON status of all ports 110. When the update signal 416 is made active by the header select 406 portion of the queue control module 400, the entire content of the lookup table 422 in the XON history register 420 is transferred to the lookup table 410 of the XOFF mask 408. Registers within the table 422 containing a zero (having a status of XON) will cause corresponding registers within the XOFF mask lookup table 410 to be reset to zero. The dual register setup allows for XOFFs to be written directly to the XOFF mask 408 at any time the cell credit manager 440 requires traffic to be halted, and causes XONs to be applied only when the logic within the queue control module 400 allows for a change to an XON value. While a separate queue control module 400 and its associated XOFF mask 408 is necessary for each port 110 in the PPD 130, only one XON history register 420 is necessary to service all four ports 110 in the PPD 130.

b) Deferred Queue 402

Figure 18:
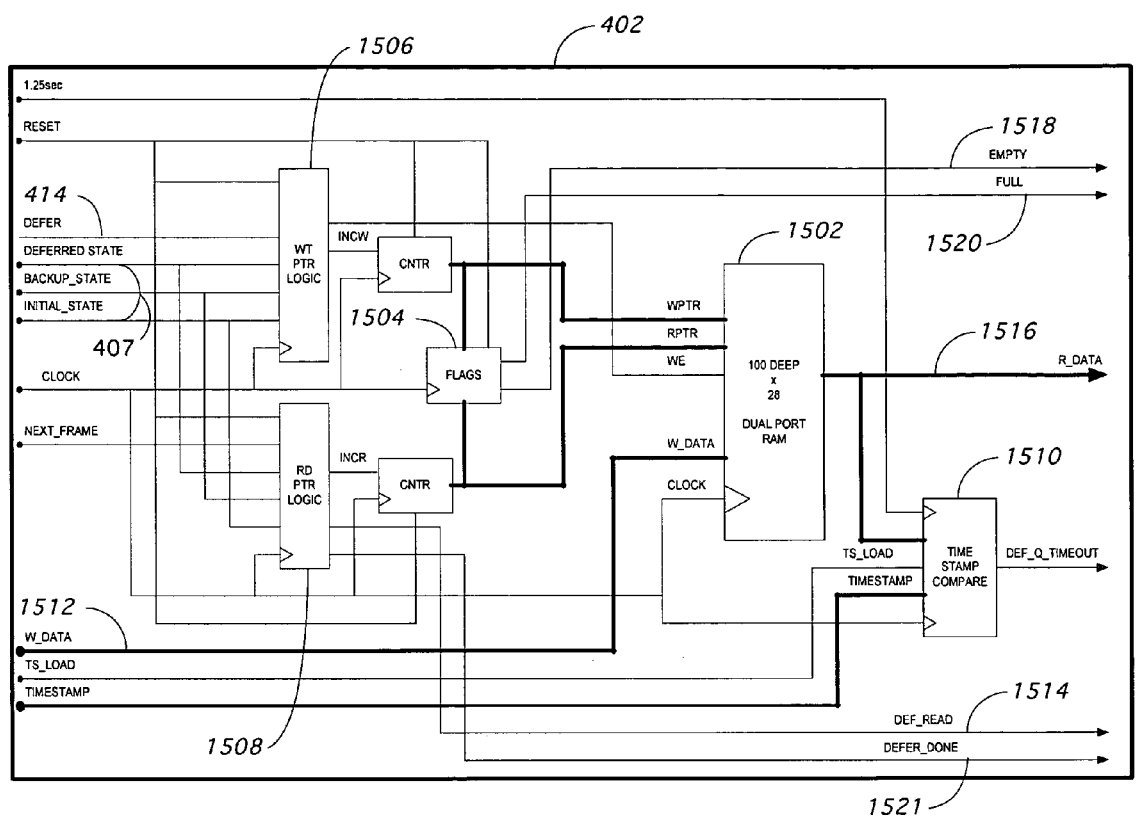
FIG. 18 is a block diagram showing the components of the deferred queue of the queue control module shown in FIG. 3.

As seen in FIG. 18, the deferred queue 402 is comprised of five major components, a dual port memory 1502, a flag register 1504, the write pointer logic 1506 and its associated counter, the read pointer logic 1508 and its associated counter, and time stamp logic 1510. The dual port memory 1502 stores header information and an address pointer that indicates where a frame is stored in credit memory 320. In the preferred embodiment, the dual port memory 1502 is a 128×32 dual port RAM. Other configurations would clearly be within the scope of the present invention. The flag register 1504 is used for error status.

The write pointer logic 1506 determines when the dual port memory 1502 should be written based on the state 407 of the queue control module 400 and the defer signal 414 that originates from the XOFF mask 408. The state 407 can be determined by examining the deferred_state, backup_state, and initial_state inputs shown in FIG. 18, which collectively are referred to as the state signal 407. The write pointer logic 1506 will cause the data found on the write data input (w_data) 1512 to be written to the dual port memory 1502 at the next available location. This write data 1512 is received from the next frame header output 415 of the XOFF mask 408. The following header information is stored in the dual port memory 1502 for each frame in the deferred queue 402: a routing reason code (assigned by the inbound routing module 330); a switch destination address (assigned by IRM 330), and a priority value (assigned by IRM 330; the location of the frame in the credit memory 320; and the time stamp value indicating when the frame was submitted to the deferred queue 402.

The read pointer logic 1508 determines when the dual port memory 1502 should be read based on the state 407 of the queue control module 400. Assuming that it is appropriate to read data from the deferred queue 402, the def_read signal 1514 will be set, and the r_data output 1516 will contain the frame header information for the next frame in the deferred queue 402.

This set up allows the deferred queue 402 to automatically write to its dual port memory 1502 the header information for any frame that is deferred by the XOFF mask 408. This is true even then queue control module 400 is in the deferred state, and that header information is originating from the deferred queue 402 itself out of the r_data output 1516.

The time stamp compare logic 1510 is used to determine if a queue entry has gone "stale". Whenever a frame is deferred, four bits of the time stamp (contained in the SOF) are written into the deferred queue 402. The time stamp compare logic 1510 contains a current copy of those same four bits. The oldest entry in the dual port memory 1502 is always kept available at the output. The stored time stamp is continuously compared to the current time stamp. If the difference ever becomes greater than two seconds, a timeout signal is sent to the microprocessor 124.

In addition to the def_read signal 1514 and the r_data output 1516, the deferred queue 402 is able to signal when it is empty 1518 or full 1520. In addition, the deferred queue 402 can signal on its defer_done output 1521 when it has finished the process of examining all headers in its dual port memory 1502.

c) Backup Queue 404

Figure 19:
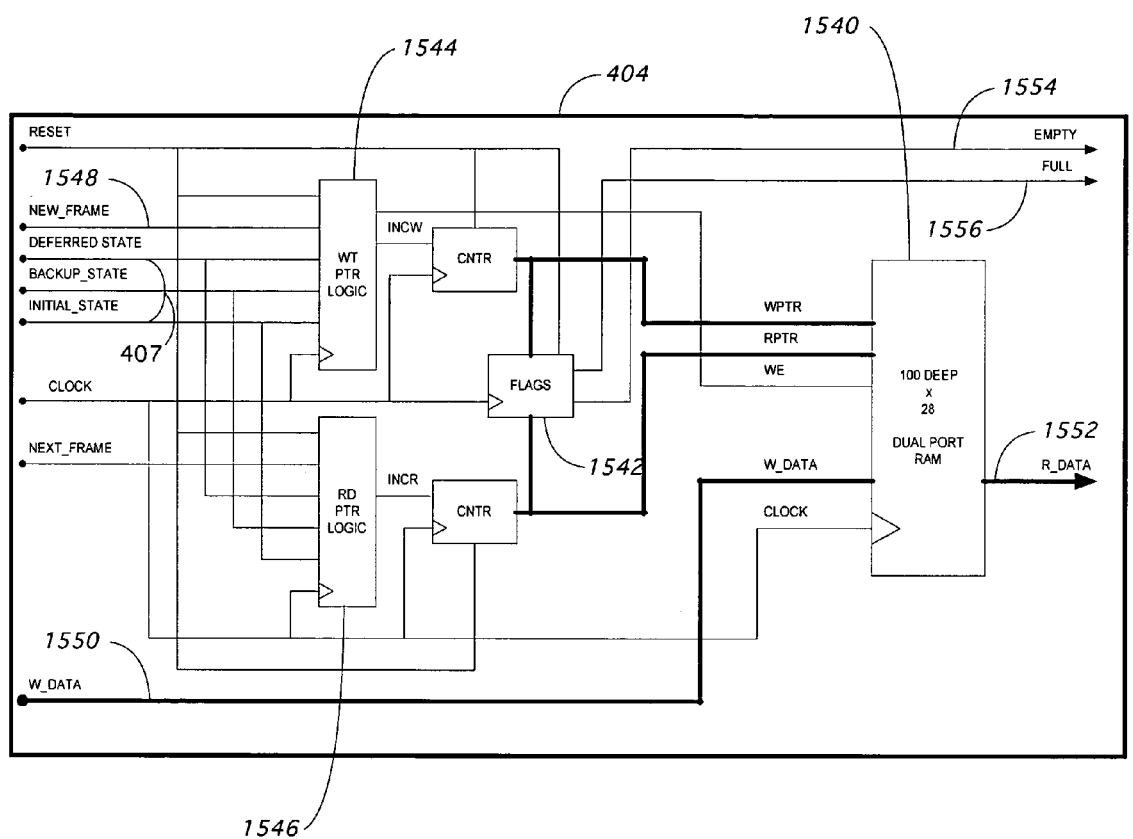
FIG. 19 is a block diagram showing the components of the backup queue of the queue control module shown in FIG. 3.

The backup queue 404 shown in FIG. 19 is comprised of four major components, a dual port memory 1540, a flag register 1542, the write pointer logic 1544 and its associated counter, and the read pointer logic 1546 and its associated counter. Like the memory 1502 in the deferred queue 402, the dual port memory 1540 in the backup queue 404 stores header information and an address pointer that indicates where a frame is stored in credit memory 320. The flag register 1542 is used for error status.

The write pointer logic 1544 determines when the dual port should be written based on the state 407 of the queue control module 400 and the new_frame signal 1548. The inbound routing module 330 asserts the new_frame 1548 signal to indicate that valid heading information is being presented to the backup queue 404 on its w_data input 1550.

The read pointer logic 1546 uses the state 407 of the queue control module 400 to determine when the dual port memory 1540 should be read. The information read from the memory 1540 is presented on the r_data output 1552. The backup queue 404 is also able to inform the rest of queue control module 400 when it is empty 1554 or full 1556.

d) Header Select

Figure 20:
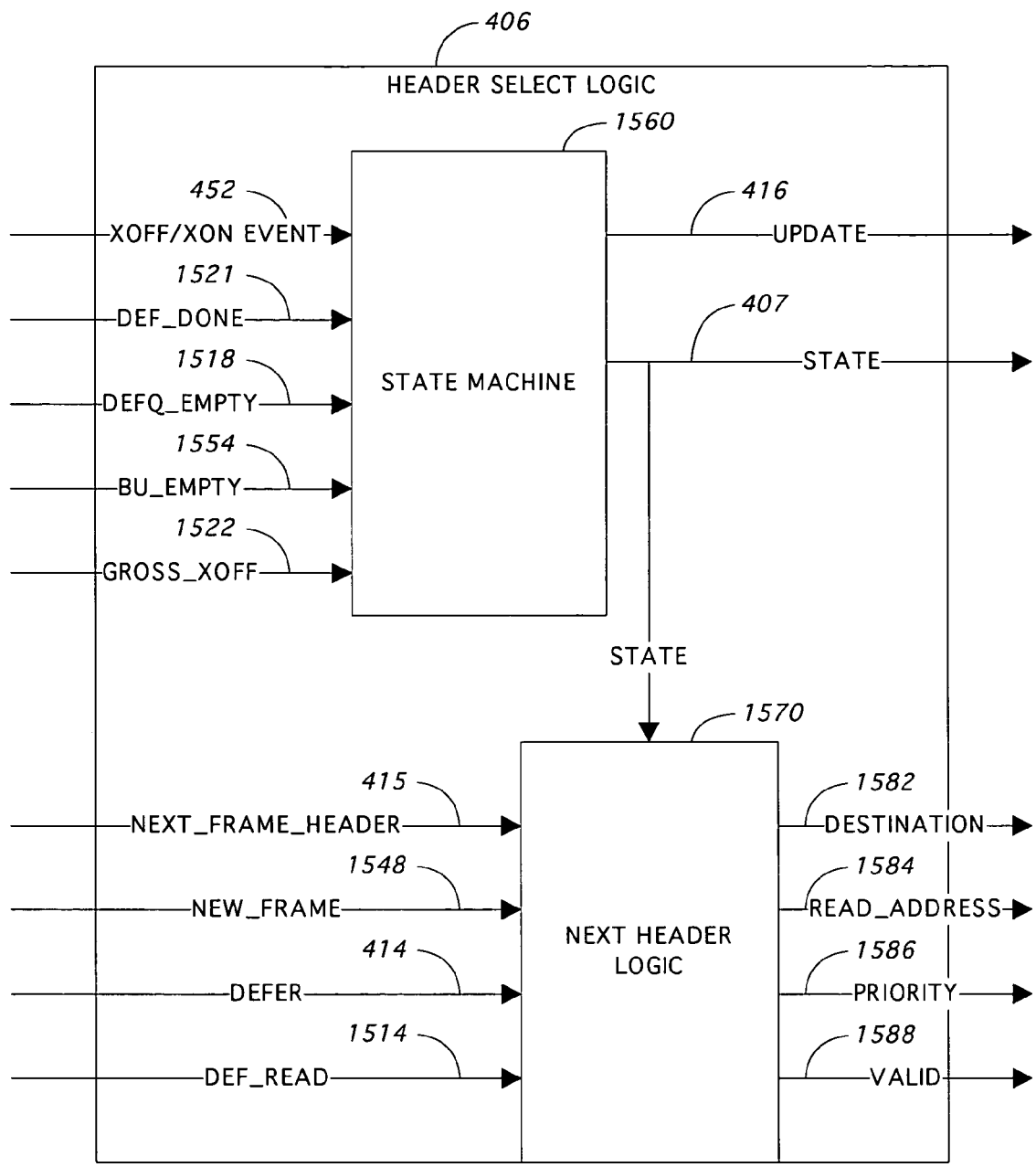
FIG. 20 is a block diagram showing the components of the header select logic of the queue control module shown in FIG. 3.

As shown in FIG. 20, the header select logic 406 contains the deferred queue state machine 1560 and the next header logic 1570. The state machine 1560 is responsible for controlling the operation of the entire queue control module 400 and its associated components. The state machine 1560 monitors XOFF/XON events 1452 from the cell credit manager 1440, the done signal 1521 and the empty signal 1518 from the deferred queue 402, the empty signal 1554 from the backup queue 404, and the gross_xoff signal 1522 to determine the current state 407 of the queue control module 400. As can be seen in the state diagram of FIG. 21, the state machine 1560 can be in one of four states: initial state 1700, deferred state 1720, backup state 1740, and gross_xoff state 1760. These states are described in more detail below. The state machine 1560 is also able to assert the update signal 416 necessary for the values in the XON history register 1420 to update the values in the XOFF mask 408.

The next header logic provides header information 409 (on FIG. 17) to the memory read module 350 so that it can extract the appropriate frame from the credit memory 320 for transmission into the crossbar fabric 40. More particularly, this header information 409 includes the destination SDA 1582 for the frame, the read address location 1584 of the frame in the credit memory 320, the priority 1586 assigned to the frame by the inbound routing module 330, and a validity signal 1588 that determines whether the header information 409 currently being provided by the next header logic 1570 is valid.

e) States in the Queue Control Module 400 i) Initial State 1700

Figure 22:
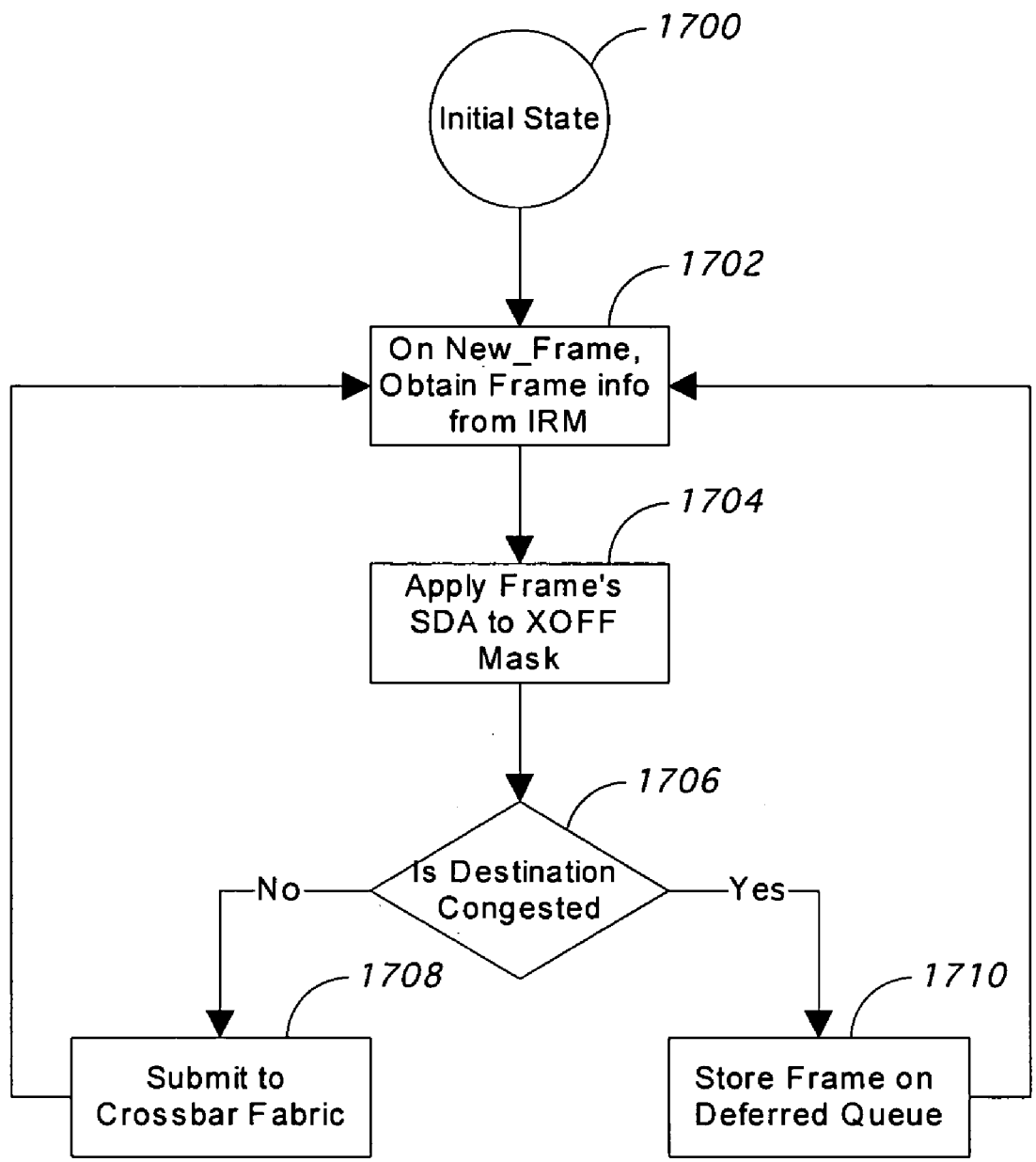
FIG. 22 is a flow chart showing the process used in the initial state of the header select logic of FIG. 20.

The queue module 400 begins in its initial state 1700, which is shown in more detail in FIG. 22. When in this state 1700, the queue module 400 is able to send incoming data packets directly to the crossbar fabric 40. Information about the incoming frame is presented to the queue control module 400 by the inbound routing module 330, which provides the frame's location in credit memory 320, its destination SDA, and its priority class assignment. When the IRM 330 asserts the new_frame signal 1548, the queue control module 400 obtains this information in step 1702. The SDA received from the routing module 330 is then presented to the XOFF mask 408 in step 1704. If the XOFF mask 408 does not find the destination to be congested in step 1706, the packet is submitted to the crossbar fabric 40 in step 1708. If the destination is found to be congested in step 1706, then the packet is placed in the deferred queue 402 in step 1710. In both circumstances, control returns to step 1702 where information about the next frame is then received from the routing module 330 and analyzed.

Figure 21:
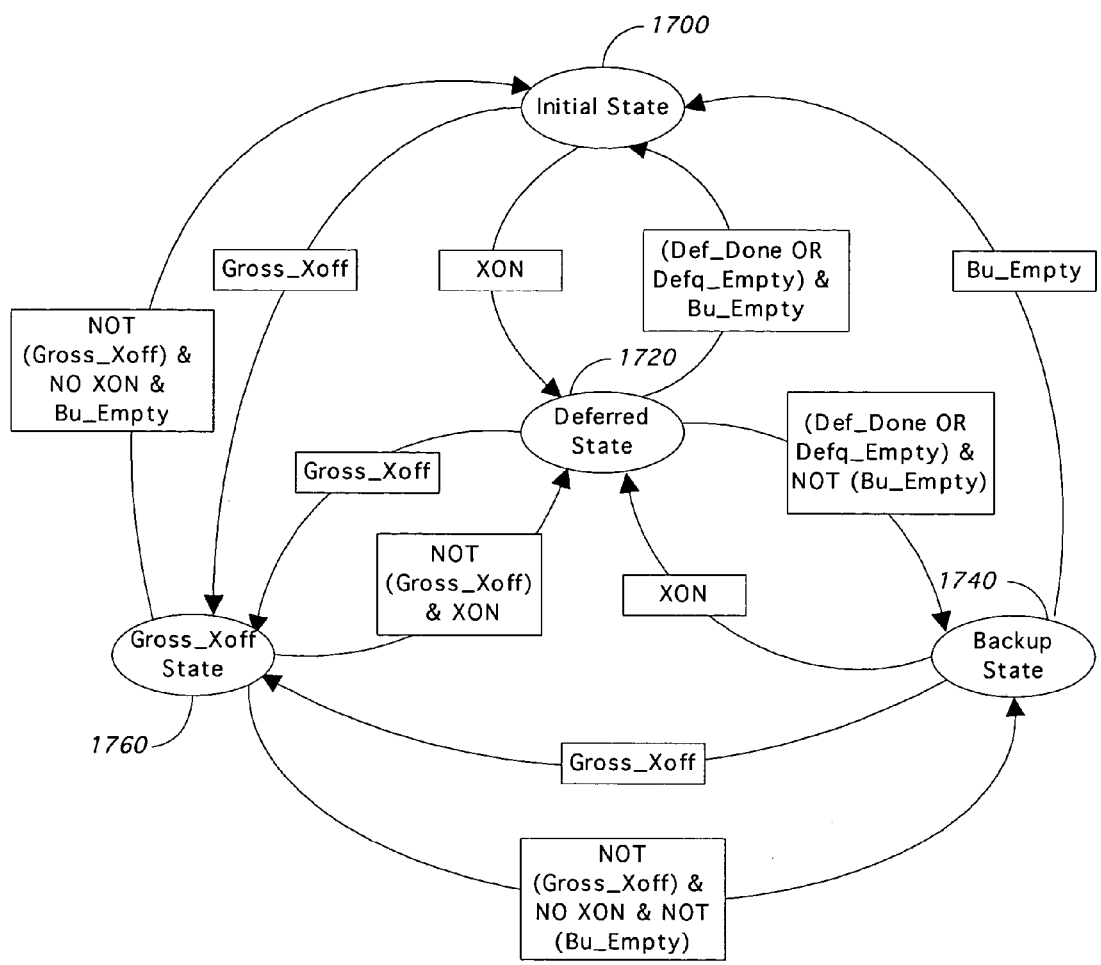
FIG. 21 is a state diagram for the state machine found in the header select logic of FIG. 20.

In this initial state 400, the queue control module 400 is able to send all incoming data frames either directly to the crossbar fabric 40 or to the deferred queue 402. As seen in FIG. 21, the state machine 1560 remains in this initial state 1700 until an XON event is received from the cell credit manager 1440 on line 1452, or a gross_xoff signal 1522 is received from the FIM 160.

ii) Deferred State 1720

When the header select logic 406 notices an XON event 1452 changing the congestion status of a port 110 from XOFF to XON, the state machine 1560 enters the deferred state 1720. At this point, the headers in the deferred queue 402 are examined to see if this change in congestion status will allow any of the previously deferred frames to be submitted over the crossbar fabric 40. Of course, if the deferred queue 402 is empty, there is no reason for the state machine 1560 to enter the deferred state 1720. Thus, the state machine 1560 may choose to enter this state 1720 only when the deferred queue 402 is not empty. This is true whether entering the deferred state 1720 from the initial state 1700, the backup state 1740, or the gross_xoff state 1760.

Figure 23:
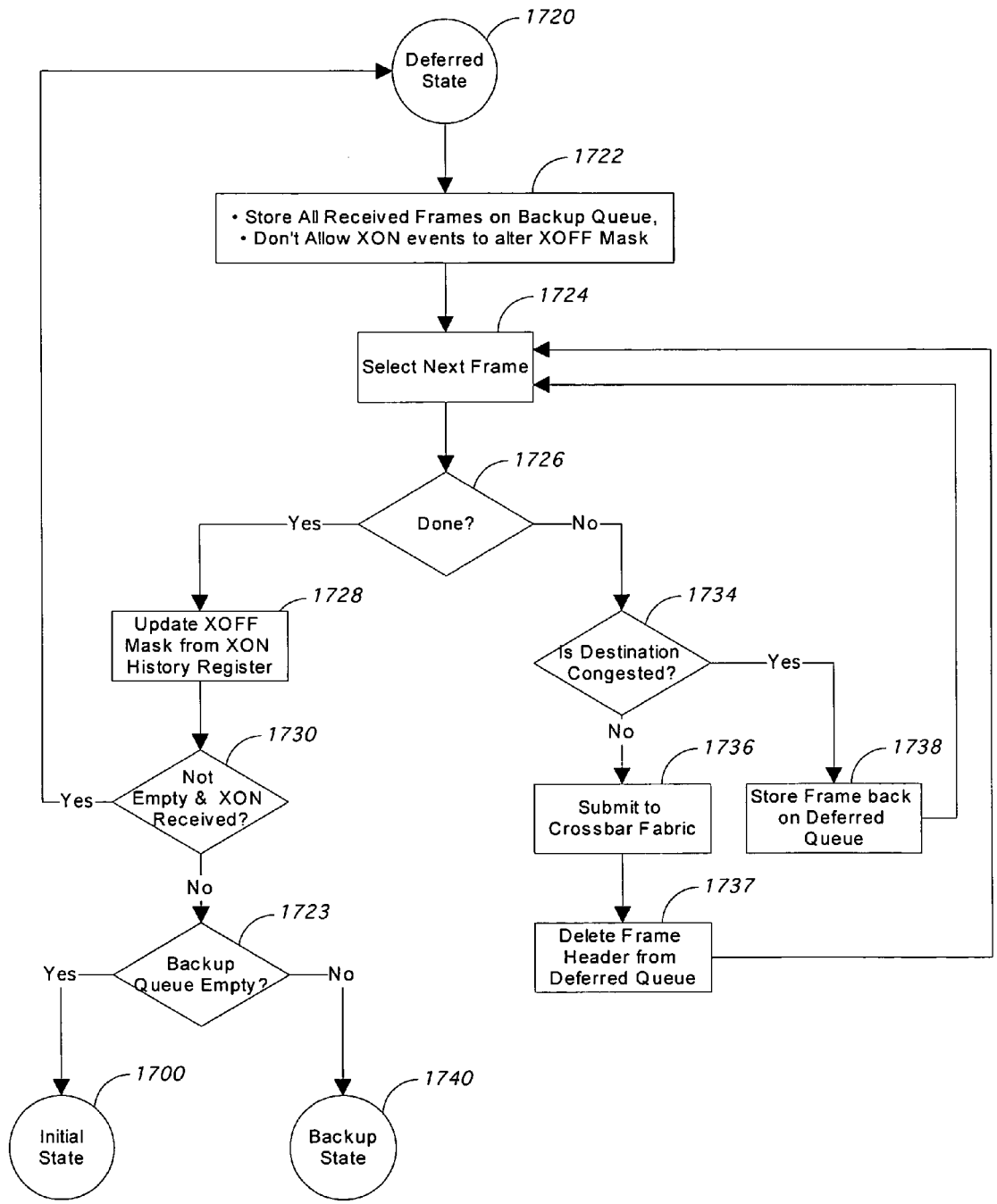
FIG. 23 is a flow chart showing the process used in the deferred state of the header select logic of FIG. 20.
Figure 24:
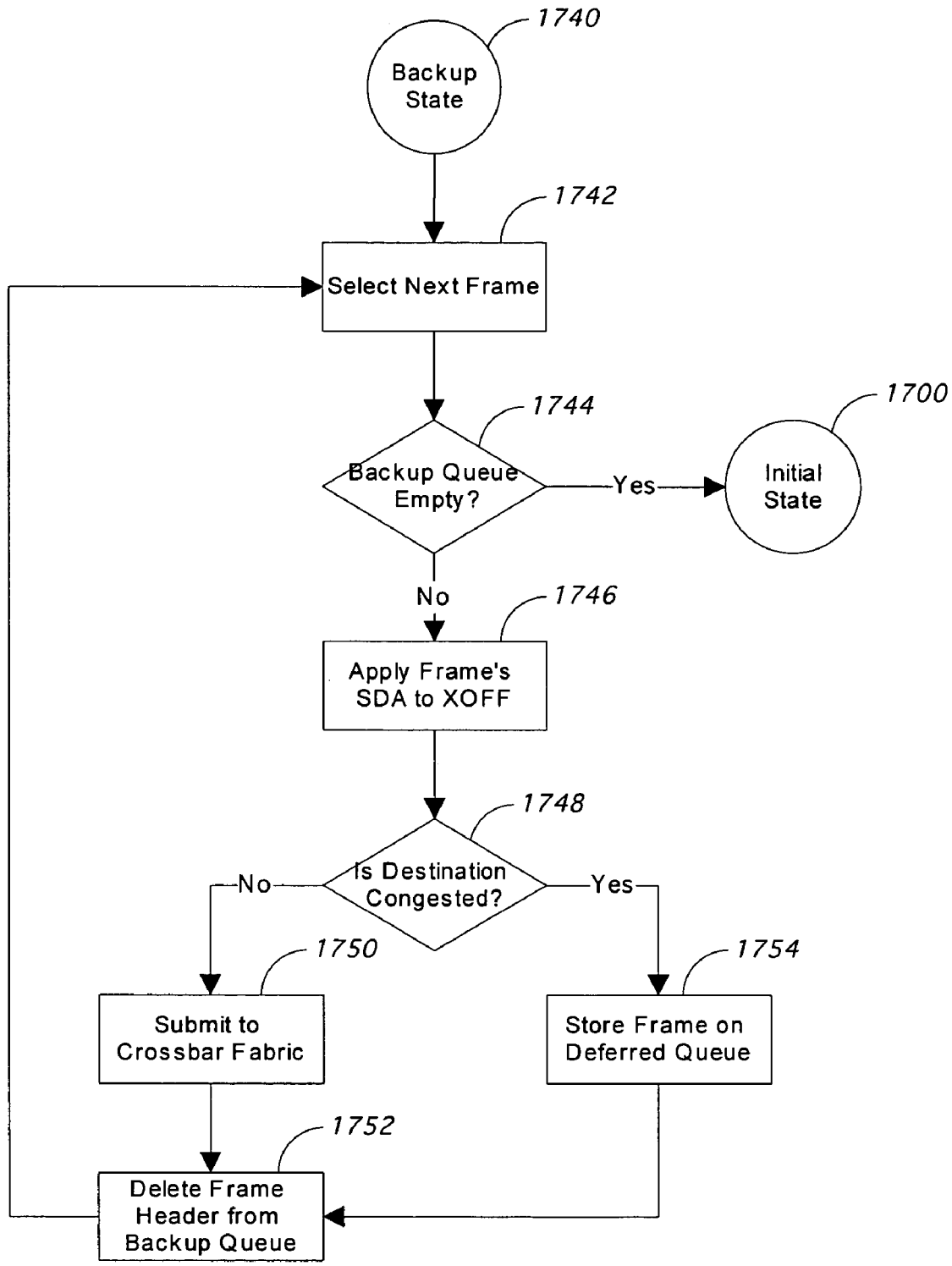
FIG. 24 is a flow chart showing the process used in the backup state of the header select logic of FIG. 20.

Once the state machine 1560 enters the deferred state 1720, two changes take place in the functioning of the queue control module 400, as shown in step 1722 of FIG. 23. First, rather than analyzing the congestion status of all new frames received from the inbound routing module 330 (as was done in the initial state 1700), new frames are now automatically placed on the backup queue 404. This ensures that previously deferred frames for a particular destination will be sent over the crossbar 40 before any later received frames for the same destination.

Second, the XOFF mask 408 is no longer updated with events that would change the state of a congestion port from XOFF to XON. This can be avoided by instructing the XOFF mask 408 to ignore such updates while in the deferred state 1720, or by instructing the cell credit manager 1440 to stop sending such signals to the XOFF mask 408. In a third alternative, the XOFF mask 408 can never change values from XOFF to XON unless the update 416 signal is asserted. In this latter case, all changes in the XOFF mask 408 from XOFF status to XON status pass through the XON history register 1420. If a change in port status from XOFF to XON were allowed to take place during the middle of the examination of the headers in the deferred state 1720, it would be possible for a frame at the end of the deferred queue 402 to be sent to a particular destination prior to a frame that was received earlier and is nearer the beginning of the deferred queue 402. This would be unacceptable. However, if the status of a port 110 changes during the deferred state 1720 from XON to XOFF, that change is immediately reflected in the XOFF mask 408 and will take effect on the analysis of the next frame header in the deferred queue 402. If these XOFF status changes were not available immediately, the entire contents of the deferred queue 402 could possibly flood a destination port 114 that only had room for a single frame.

At step 1724, the queue module 400 begins the process of analyzing all of the packet headers in the deferred queue 402 by selecting a frame header. Each time that the deferred state 1720 begins, the review of frame headers starts at the top of the deferred queue 402 with the oldest frame header. At step 1726, the queue module 400 ensures that it has not finished analyzing the entire queue 402. Assuming that not all frames in the queue 402 have been analyzed, step 1734 compares the switch destination address for the selected frame with the current values in the XOFF mask 408 to determine whether that destination is still congested. If the destination port is not congested, the packet is submitted to the crossbar fabric 40 in step 1736 and the frame header is deleted from the deferred queue 402 in step 1737. If the destination is still congested, the packet is added back to the deferred queue 402 in step 1738. In either case, the next frame in the deferred queue 402 is then selected and analyzed in step 1724. When this operation is complete, all deferred headers that could not be serviced will have been written back into the deferred queue 402 in the same order that they were read out.

If the status of a switch port 110 changes during the deferred state 1720 from XOFF to XON, that change is made to the XON history register 1420 but not immediately to the XOFF mask 408. The examination of every header in the deferred queue 402 continues with the old XON status values in the XOFF mask 408. When this is completed, as determined by step 1726, it is time to update the values in the XOFF mask 408. In step 1728, the update signal 416 is asserted and the values in the XON history register 1420 are applied to the XOFF mask 408 in step 1730. Step 1730 will then determine whether there had been any XON events during the deferred state 1720 procedure. If so, and assuming the deferred queue 402 is not empty, it is necessary to re-examine the deferred queue 402 with the updated values in the XOFF mask 408. To accomplish this, the deferred state 1720 is entered again, and the examination of all headers in the deferred queue 402 is repeated.

If any packets are received at the port 110 while the queue module 400 is in the deferred state, they are stored in the backup queue 404. When the deferred state has finished examining all headers in the deferred queue 402, and step 1730 determines that no XON status events have been received, the queue control module will then check the status of the backup queue 404 in step 1732. If the backup queue 404 is empty, the queue module returns to the initial state 1700. If the backup queue 404 is not empty, the queue module enters the backup state 1740.

iii) Backup State 1740

Frames are entered into the backup queue 404 during the deferred state 1720 and the gross_xoff state 1760. As shown in FIG. 21, the backup state 1740 is entered after these two states 1720, 1760 are completed and data is found to exist in the backup queue 404. Alternatively, the initial state could check the status of the backup queue 404 and initiate the backup state 1740 when necessary. In this alternative embodiment, the deferred state 1720 and the gross_xoff state 1760 would simply return control to the initial state 1700 when completed.

The first step 1742 of the backup state 1740 is to select the first frame in the backup queue 404. Assuming that the backup queue 404 is not empty (step 1744), the switch destination address for this frame will then be compared to the current status of the XOFF mask 408 in step 1746. If the destination is not congested, as determined by step 1748, the frame will be sent to the crossbar fabric 40 in step 1750. The frame header will then be deleted from the backup queue 404 in step 1752, and the next frame header will be selected again in step 1742. If step 1748 determines that the destination port is congested, the frame will be placed in the deferred queue 402 in step 1754, and the process again returns to step 1742.

If there is a change in the congestion status of any destination to an XON state, the queue control module 400 will immediately leave the backup state 1740 enter the deferred state 1720. However, if the queue module 400 completely empties the backup queue 404 in backup mode without any port changing to an XON status, as determined in step 1744, the queue module 400 returns to the initial state 1700.

f) Gross_XOFF State 1760

Figure 25:
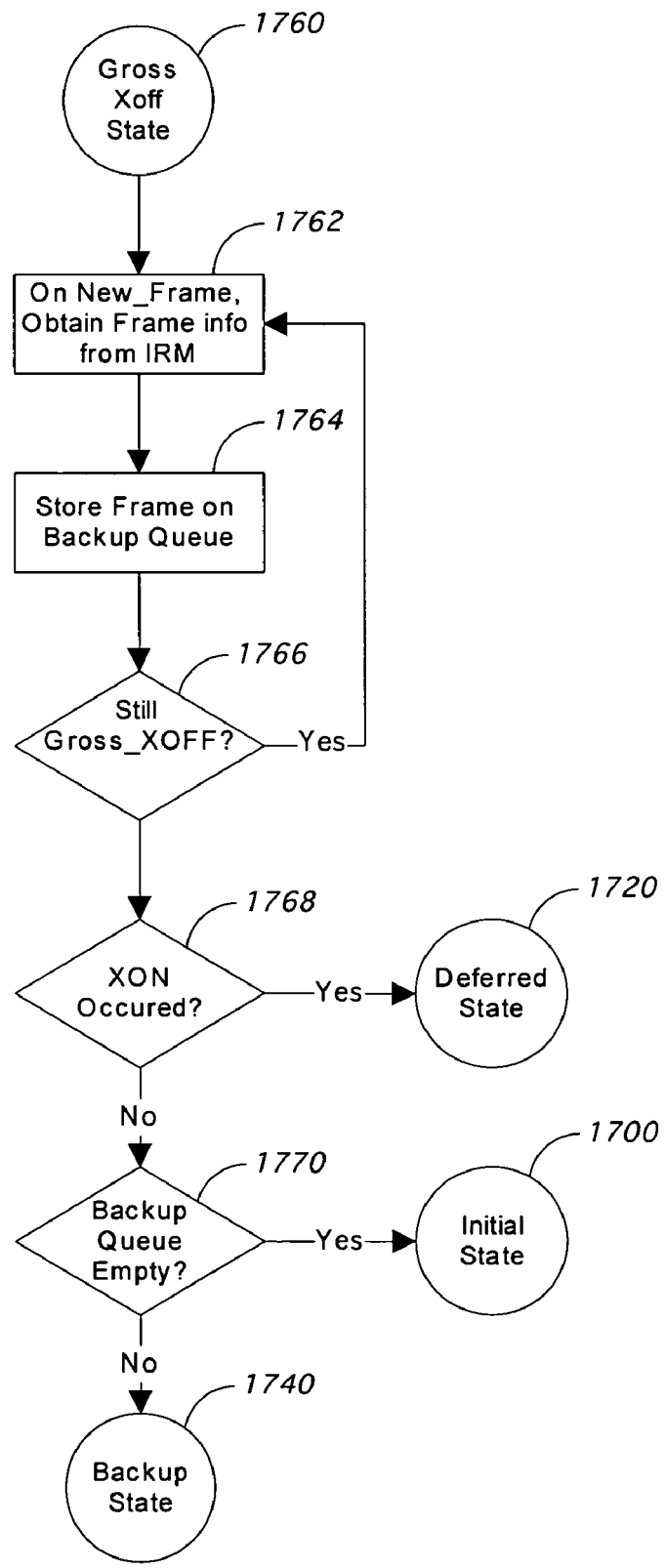
FIG. 25 is a flow chart showing the process used in the gross_xoff state of the header select logic of FIG. 20.

If a gross_xoff signal 1522 is received, the input memory subsystem 180 supporting the crossbar fabric 40 cannot receive any additional data. The queue control module 400 immediately enters the gross_xoff state 1760 regardless of the state it was in when the gross_xoff signal 1522 was received (FIG. 21). During this state 1760, new frame data can be received from the inbound routing module 330, as indicated by the new_frame signal 1548. When this occurs, as shown in the flow chart of FIG. 25, frame information is obtained in step 1762. This frame data is then stored on the backup queue 404 at step 1764. If step 1766 determines that the gross_xoff signal 1522 is still set, the state 1760 simple waits for more information to be received and stored in the backup queue 404 at steps 1762 and 1764. Assuming that step 1766 determines that the gross_xoff signal 1522 is no longer set, the queue control module 400 enters the initial state 1700, the deferred state 1720, or the backup state 1740. Step 1768 determines whether any XON events were received over XOFF event line 1452 during the gross_xoff state 1760. If so, and the deferred queue 402 is not empty, the queue control module is placed in the deferred mode 1740. If not, step 1770 determines whether the backup queue 404 is empty. If the backup queue 404 is empty, the queue control module is put in the initial state 1700; otherwise the module 400 is put in the backup state 1740.

8. Rule Based Routing a) Inbound Routing Module 330

Figure 26:
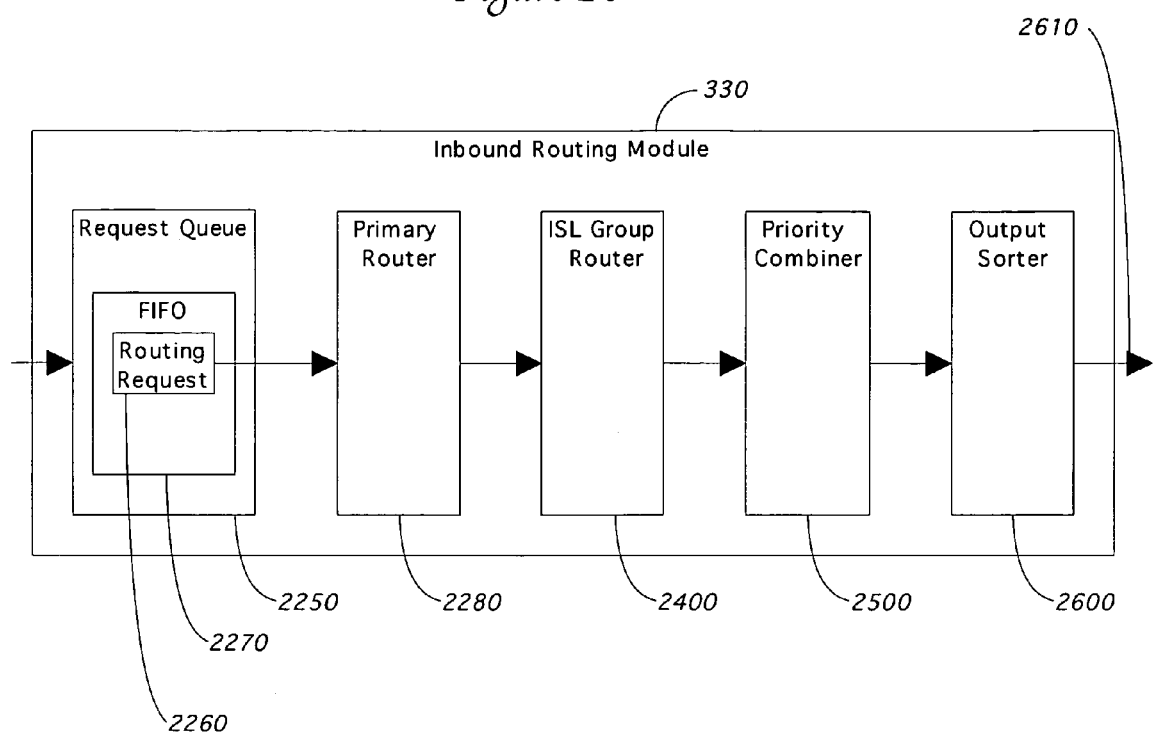
FIG. 26 is a block diagram showing the details of the inbound routing module of the input port protocol device shown in FIG. 2.

FIG. 26 shows the primary components of the inbound routing module (IRM) 330 of the present invention. The request queue 2250 examines each Fibre Channel frame header received from the Memory Controller Module 156 and forms a routing request, which contains the information required for routing the frame including the source port 112 and the D_ID for the frame. The request queue 2250 also arbitrates routing requests from the four ports 110 associated with the PPD 130.

The primary router 2280 uses the source port 112 and the D_ID found in the routing request to determine the appropriate switch destination address for that D_ID. This determination takes into account a variety of zoning rules. The primary router 2280 also determines an out-of-band priority designation that is used in the preferred embodiment to associate the frame with a virtual channel 106 across the output port 114.

The ISL group router 2400 examines the routing result created by the primary router 2280 to determine if the chosen destination port is an ISL group 108. If so, the ISL group router 2400 determines which of the links 104 in the ISL group 108 will carry the frame to the other switch 100. It then converts the destination port identifying the ISL group 108 received from primary router 2280 to a switch destination address identifying an E_Port for a single ISL 104 within the group 108.

The priority combiner 2500 examines an in-band priority designation and an out-of-band priority designation made by the primary router 2280, and assigns the actual priority level for the routing decision.

The output sorter 2600 uses the source port found in the routing result and delivers each routing result to the correct MCM 156. The output from this component 2600 serves as the output of the entire IRM 330. The MCM 156 then stores the routing results in its queues as maintained by queue control module 158. When the MCM 156 reads each frame from credit memory 154, the MCM 156 modifies the frame's header and inserts the frame's source part, destination port, priority, and routing reason code. The fabric interface module 160 uses this information to segment the frames into cells 168 that can be switched across the crossbar 140.

b) Addressing i) Ports & Regions

The S_ID and D_ID are designated using standard, twenty-four bit Fibre Channel switch fabric addressing. These addresses are assigned using two different addressing modes: auto discovery addressing and fixed addressing. In auto discovery mode, new devices added to Fibre Channel loop automatically negotiate for the first available port address or Port_ID. In fixed addressing, the administrator for a device selects a port address for the device. In either mode, all devices on a single loop share a Domain_ID and an Area_ID. Although the Fibre Channel specifications describe both types of addressing, all known applications use auto discovery addressing.

Figure 27:
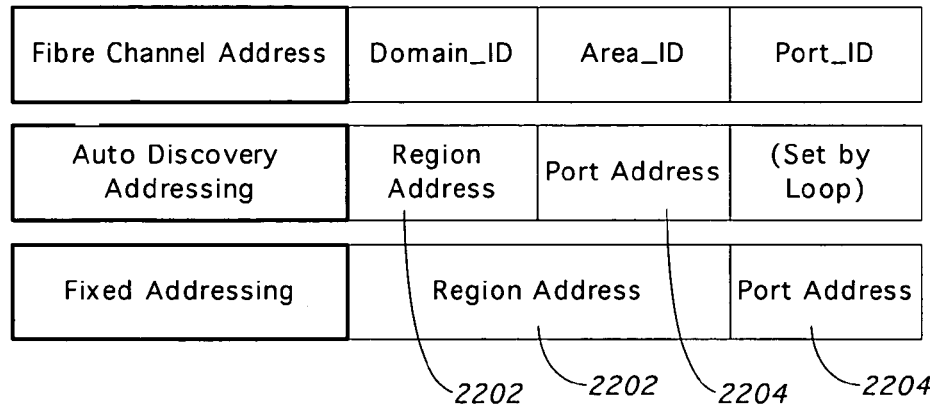
FIG. 27 is a block diagram illustrating the addressing scheme used in connection with auto discovery addressing and fixed addressing.

The present invention treats these two different addressing schemes differently, as shown in FIG. 27. In auto discovery addressing, the Port_ID is not fixed and therefore all routing is done to the loop as a whole. The present invention treats the Domain_ID as a "region" address 2202, and treats the Area_ID as the "port" address 2204. Since the loop protocol handles its own routing, the IRM 330 ignores the Port_ID for auto discovery addressing. If fixed addressing is used, the true Port_ID (bits 7–0 of the Fibre Channel address) is considered the port address, with the Domain_ID and the AreaID being considered the region address. A region is a set of two hundred fifty-six port addresses that share a region address. A region corresponds roughly to a Fibre Channel domain.

The two addressing modes may be mixed in a single switch 100. For example, the fabric 101 may primarily use auto discovery addressing, but the user may desire to view a loop or a virtual adapter as a fixed addressing region so that the destination devices in the loop or virtual adapter can be independently prioritized and/or zoned based on their Port_ID.

ii) Lumped Region View and Split Region View

The inbound routing module 330 has two ways of viewing regions, the lumped region view and the split region view. In the lumped region view, the IRM 330 sees the region as a single entity. When making routing and zoning decisions, the switch 100 considers only the region address 202, and not the port address 2204. In the split region view, the IRM 330 sees the individual ports within the region. When making routing and zoning decisions in the split region view, the switch 100 considers both the region address 2202 and port address 204. The split region view is required for regions that are served by switch 100, and for regions served by other switches that require routing or hard zoning based on port address. For other regions, the lumped region view is generally sufficient.

For fabrics that use auto discovery addressing, the IRM 330 supports all of the legal 2239 regions (there are 2239 valid Domain IDs). For thirty-two of the two hundred thirty-nine regions, the IRM can use the split region view, viewing the ports within those regions individually for purposes of routing, prioritization, and hard zoning. For the other regions, the IRM uses the lumped region view. For fabrics that use fixed addressing (no known fabrics fall into this category), the IRM supports only thirty-two regions, and all of the regions use the split region view.

iii) Switch Destination Address

IRM 330 determines the frame's physical destination, which may be one of five hundred twelve Fibre Channel ports 110 or one of microprocessors 124 found on the I/O boards 120, 122. The IRM 330 also recognizes intermediate logical destinations relating to internal multicasts groups (eight per I/O board 120, 122) or one of eight ISL groups 108. These intermediate logical destinations are later mapped to the switch destination address of a physical destination.

Figure 28:
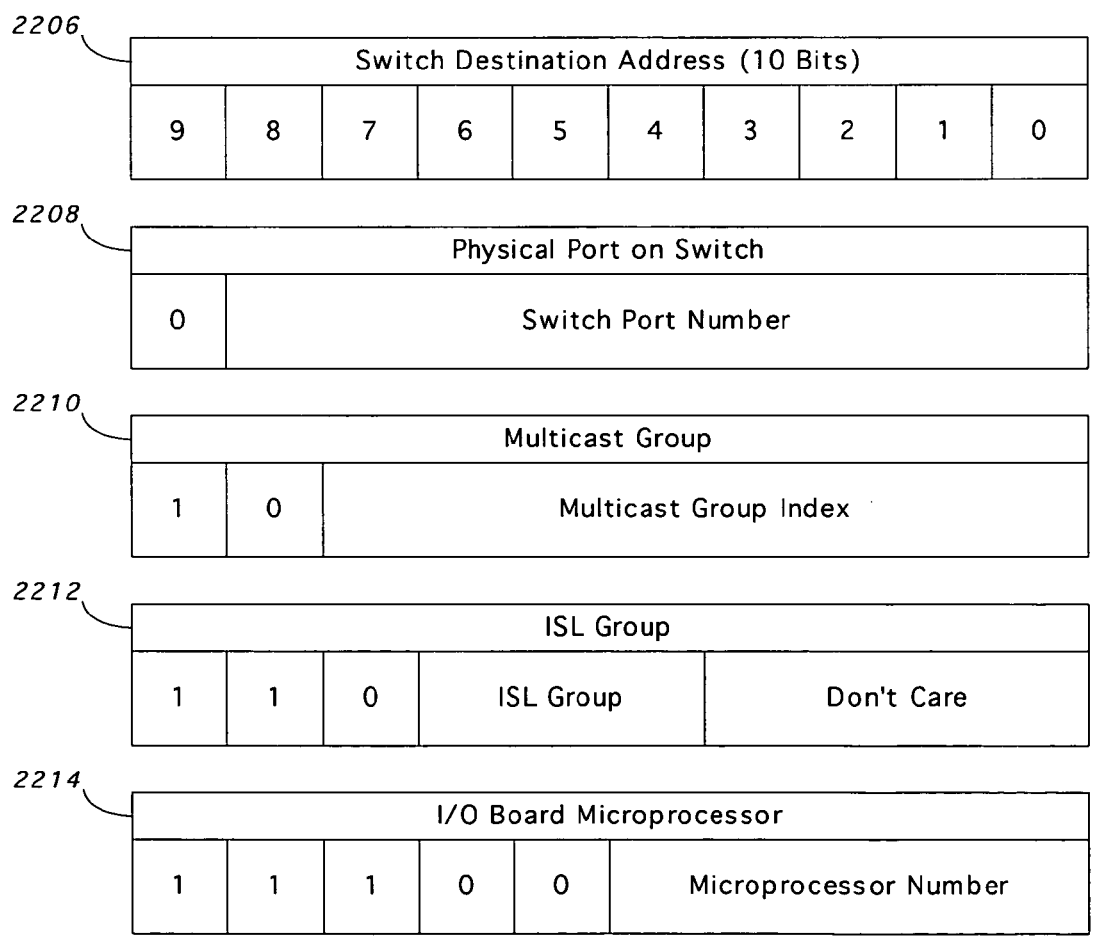
FIG. 28 is a block diagram illustrating the switch destination addresses used in one embodiment of the present invention.

As shown in FIG. 28 the present invention uses a ten bit address to define the switch destination address 2206, which can address physical ports 110, multicast groups, ISL groups 108, and microprocessor directed communication. The switch destination address 2206 is the address used by the switch 100 for internal routing. Addresses 2208 for actual physical ports always have a 0 in the most significant bit. Multicast group addresses 2210 start "10" in their most significant bits, while ISL group addresses 2212 start "110," and microprocessor addresses 2214 start "11100."

Each of the address formats in FIG. 28 can be easily changed to accommodate different numbers of physical ports 110, multicast groups, ISL groups, or microprocessors 124. For instance, the switch destination addresses 2206 could have more than ten bits, which would allow physical port address 2208 to have a larger address range. In addition, even though the ISL group addresses 2212 in FIG. 28 show only three bits being used to select an ISL group, all six available bits could be used. This would allow a total of one hundred twenty-eight different ISL group addresses 2212 even without expanding the size of the switch destination addresses 2206.

c) Request Queue 2250

Referring back to FIG. 26, the memory control module 156 provides the request queue 2250 with header information and a buffer memory location for each new frame that enters memory 154. The preferred embodiment presents this information through eight separate inputs, one memory location input and one header input for each of the four ports 110 associated with PPD 130. An arbiter within request queue 2250 is able to arbitrate routing requests from the four ports 110. The primary purpose of the request queue 2250 is to examine the received frame header and extract a routing request 2260 for each frame. In the preferred embodiment, the routing request 2260 is fifty-two bits in length and contains the information shown in Table 1.

TABLE 1

| Length (in bits) | Information | Source |
|---|---|---|
| 2 | Source Port Number | MCM 156 |
| 4 | SOF Type | Frame Header |
| 24 | D_ID | Frame Header |
| 8 | Frame's Type Field | Frame Header |
| 1 | Type Field Valid Indicator | Frame Header |
| 3 | In-Band Priority | Derived from the Frame Header |
| 9 | Credit Memory Location | MCM 156 |
| 1 | CRC Regeneration | MCM 156 (set when change made to frame header) |
| 2 | Source Port Number | MCM 156 |

The request queue 2250 writes the requests 2260, one at a time, into a buffer or FIFO 2270. In the preferred embodiment, the request FIFO 2270 is big enough to hold four hundred routing requests 2260, one hundred for each port 110.

When it is necessary to configure the primary router 2280 and ISL group router 2400, a command is sent to the request queue 2250 to stop sending routing requests from the FIFO 2270 to the primary router 2280. Routing requests 2260 accumulate in the FIFO 2270 until the primary router 2280 and ISL group router 2400 are configured. While the request FIFO 2270 holds routing requests 2260, frames accumulate in the credit memory 154. When the configuration is complete, the requests 2260 in the FIFO 2270 are again made available to the primary router 2280. The request FIFO 2270 may also need to be stopped when the processor 124 reads the contents of the routing tables of primary router 2280, at least in cases where the routing tables are implemented using single ported memory.

The request queue 2250 also has the ability to purge stale routing requests 2260 for a port 110 from the FIFO 2270. In the preferred embodiment, this is accomplished by setting a bit in a register. When this purge enable bit is set, the request queue 2250 will create a special purge routing request and add it to the request FIFO 2270. This purge request 2260 contains the two bit source port number, a unique, unused SOF type ("1110"), and port purge compare value (the four least significant bits of the D_ID). All other bits in the purge request are set to zero. The IRM 330 will discard all routing requests for the designated port 110 while the purge enable bit is set until the purge routing request that matches the purge compare value is read out of the request queue FIFO 2270. At this point, the IRM 330 will discard the purge routing request and set the purge enable bit to zero. Routing requests 2260 will resume being sent to the primary router 2280.

Each time the purge compare value is changed, a new "purge routing request" will be written into the FIFO 2270. One possibility for this is if a link reset occurs multiple times while the IRM 330 is still disabled. While the IRM 330 is disabled, the processor 124 may change the purge compare value while the purge enable bit is set, but may only do so up to the value "1111". This will ensure that the FIFO 2270 will not overflow and that the IRM 330 will not stop purging on the incorrect "purge routing request".

d) Primary Router 2280

Figure 29:
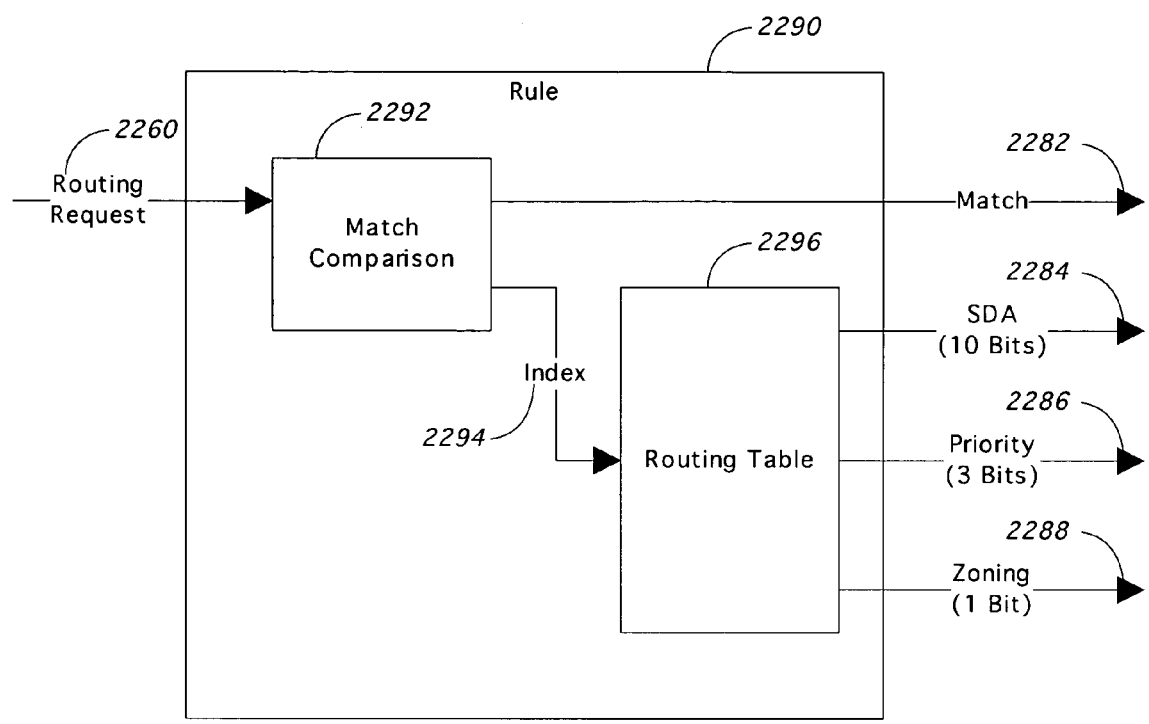
FIG. 29 is a block diagram of a typical rule used in a primary router found in the inbound routing module shown in FIG. 26.

As shown generally in FIG. 29, the primary router 2280 receives routing requests 2260 and then uses a plurality of routing rules 2290 to determine the correct routing for the frame. The primary router 2280 functions by simultaneously applying different routing rules 2290 to the routing request 2260. In most of the rules 2290, a match comparison component 2292 examines the routing request 2260 to see if the D_ID within the request 2260 matches the addresses that are relevant to the rule 2290. In most cases, the match comparison component 2292 also determines an index 2294 that is used to look up routing results for the request 2260 in a routing table 2296. Each rule 2290 produces for its result a match indicator 2282 that tells whether the rule 2290 is applicable to the routing request 2260, as well as a switch destination address 2284, an out-of-band priority designation 2286, and a zoning indicator 2288. All of the rules 2290 function in parallel, so as to speed up the routing determination. A selector 2380 (shown in FIG. 30) is then responsible for selecting the appropriate result from these rules 2290.

In the preferred embodiment, the priority for a routed frame is used to associate the frame with one of eight virtual channels 106 across a switch port 110. The priority fields are therefore only three bits long. Generally speaking, in-band priority is a priority based upon the content of the Fibre Channel frame, while out-of-band priority is based upon a routing determination using routing tables in the primary router 2280. In one instance, the in-band priority is taken from three bits within the Fibre Channel header, such as the bit 17 from the F_CTL (or frame control field) and bits thirty to thirty-one in the CS_CTL (or class specific control field). Alternatively, the in-band priority can be partially randomized. One way to do so is to based the in-band priority on the least significant bits of the assigned switch destination address 2206. For instance, if either bit 17 from F_CTL or bit thirty-one of CS_CTL were set to zero, the in-band priority could be 0 plus the two least significant bits of the switch destination address 2206. If both bit 17 from F_CTL and bit thirty-one of CS_CTL were set to one, the in-band priority would be "1" plus the two least significant bits of the switch destination address 2206.

Some of the routing tables used by the rules 2320–370 will contain an out-of-band priority enable bit. This bit indicates whether the inbound routing module 330 is to assign out-of-band priority or in-band priority to the routed frames. If the out-of-band priority enable bit is zero, the frame will be assigned in-band priority, otherwise the frame will use out-of-band priority. The priority will be assigned to a known level (i.e., six or seven) for any frame that is sent to the violation switch destination address.

The routing tables may also include a zoning indicator that confirms that the source port is allowed to communicate with the destination port according to the current zoning rules. The zoning indicator uses a single bit to establish permission for a source to communicate with a destination, with the bit being set to one to indicate permission. In some routing tables, multiple zoning bits are associated with a single source-destination pair, with each bit being associated with a different Fibre Channel frame type (such as SCSI-3 or FICON).

The routing tables may also contain a destination enable bit to indicate whether a particular destination is present and able to accept frames. If this bit is zero, the destination is not present or cannot accept frames. When combined with the zoning indicator, this allows the present invention to distinguish between zoning errors (the destination is present, but the source is not zoned to communicate with the destination) and destination not present errors. In both cases, the primary router 2280 sends frames with these errors to the violation destination along with an error code indicating the source of the error. Frames received that are shorter than the Fibre Channel definition of nine words are automatically routed to the violation register with a reason code of "short frame received".

Figure 30:
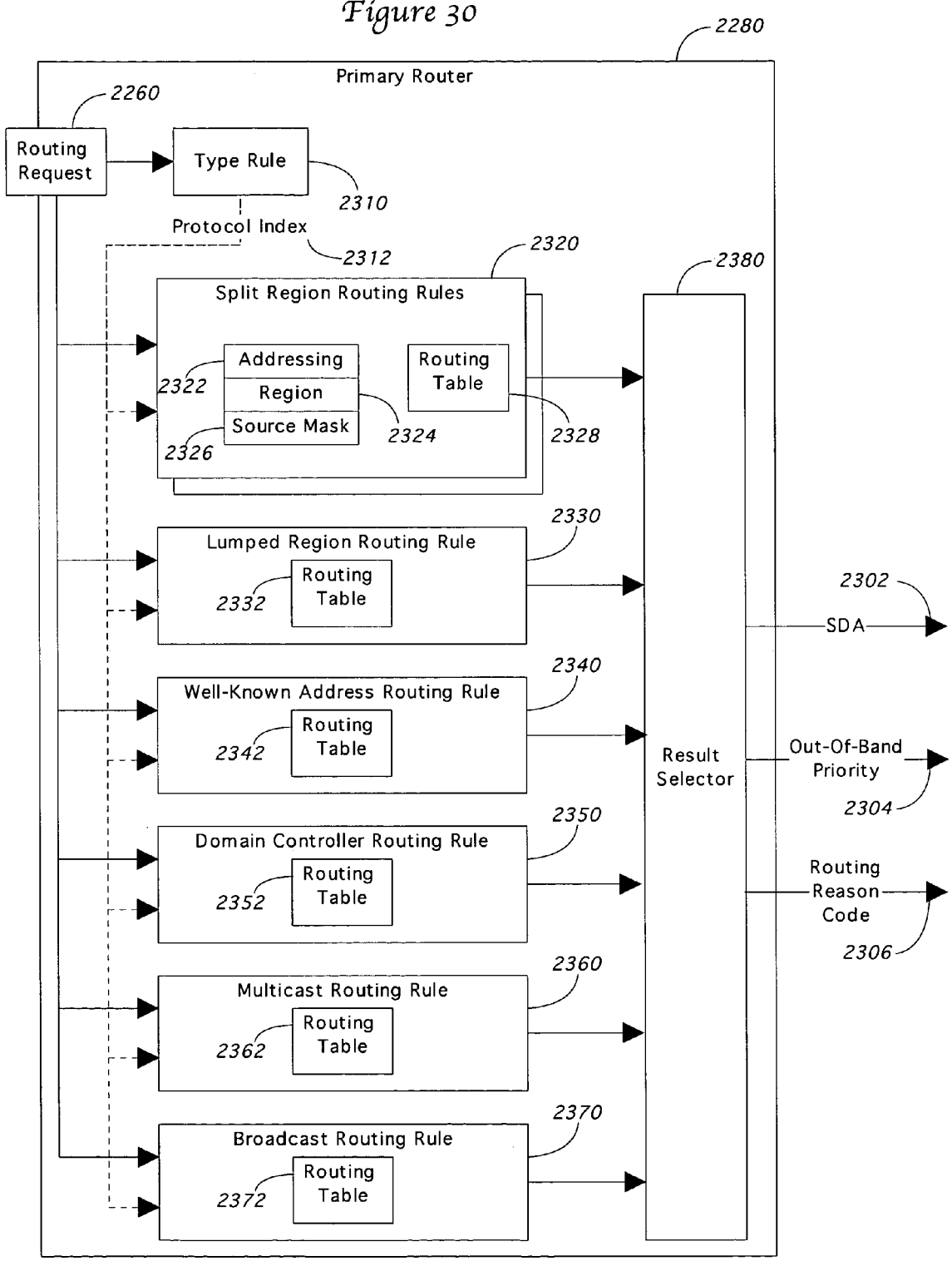
FIG. 30 is a block diagram of the primary router found in the inbound routing module shown in FIG. 26.

The primary components of the primary router 2280 are shown in FIG. 30. These components are described in detail below.

i) Type Rule 2310

The type rule 2310 does not route routing requests 2260. Rather, this rule 2310 transforms the type field found in the routing request 2260 into a format that the primary router 2280 can use. Although the routing request's eight-bit type field has two hundred fifty-six possible values, the primary router 2280 only supports eight logical protocols. The type rule 2310 converts the routing request's eight-bit type field and one-bit type field valid indicator into a three-bit protocol index 2312. If the type field valid indicator shows that the type field in the routing request 2260 is not valid, the type rule sets the protocol index 2312 to seven. Otherwise, the type rule 2310 examines the type field from the routing request 2260, and assigns one of six programmable types to this Fibre Channel frame by setting the protocol index 2312 to a number between zero and five. If the type field matches multiple programmable values, the type rule chooses the lowest matching protocol index 2312. A protocol index value of six indicates that the type field of the routing request 2260 did not match any of the six programmable types. The protocol index 2312 is then used by the other rules 2320–370 to make protocol-based routing and zoning decisions.

ii) Split Region Routing Rules 2320

As explained above, the term split region means that the IRM 330 bases its routing on the port address 2204 found in the D_ID. This is in contrast to the lumped region view of the D_ID, which routes according to the region address 2202 only. Of the possible 2239 regions, a maximum of thirty-two are routed according to the split region routing rules 2320. Each region is handled by a different rule 2320 meaning that there are a total of thirty-two split region routing rules 2320.

As shown in FIG. 30, each split region routing rule 2320 identifies routing requests for its region using a register specially configured for that rule. This register has an addressing mode 2322, region identifier 2324, and source port mask 2326. The addressing mode 2322 is a single bit that communicates whether auto discovery addressing or fixed addressing is being used in the rule's region. The region identifier 2324 specifies the region that is applicable to the rule 2320. The identifier is sixteen bits long, but only the most significant eight bits are used in auto discovery addressing. Together, the region identifier 2324 and the address mode identifier 2322 can determine whether the region address 2202 in the routing request 2260 matches the region for that rule 2320. The address mode identifier 2322 is also used to identify the port address 2204 for that D_ID.

The source port mask 2326 indicates if the source port 112 is allowed to use this split region routing rule 2320. The mask 2326 is four bits long, one bit for each port in the PPD 130. Setting the correct bit in this mask 2326 allows the processor 124 to disable the use of this rule 2320 with the ports 110 on the PPD 130. If the source port mask 2326 indicates that the rule 2320 is disabled for the source port 112 indicated in the routing request 2260, the primary router 2280 will attempt to match the routing requests 2260 to some other rule.

When a rule 2320 determines that a routing request 2260 belongs to its region and the source port 112 is allowed to use this rule 2320, the rule 2320 uses the port address 2204 of the D_ID as an index to a region routing table 2328. Each rule 2320 contains its own routing table 2328, meaning that the routing table 2328 applies only to a single region address 2202. The routing table 2328 is configurable by the processor 124, and contains two hundred fifty-six entries. Each entry in the routing table contains the switch destination address 2206 (with all ports 110 in the PPD 130 using the same switch destination address 2206), and four separate entries (one for each port on the PPD 130) of the following fields: a three-bit priority field, a one-bit destination enable bit, a one-bit out-of-band priority enable bit, and an eight-bit zoning field. As explained above, the priority field specifies the out-of-band priority for this combination of source port 112 and D_ID, the destination enable bit determines whether this destination is enabled for this source port 112, the out-of-band priority bit chooses between in-band or out-of-band priority, and the zoning field indicates whether the zoning rules allow this source port 112 to communicate to this D_ID for the frame type.

iii) Lumped Region Routing Rule 2330

The lumped region routing rule 2330 routes requests for frames that are intended to flow from a source port 112 to destination port 114 using the lumped region view. Since all port addresses 2204 within a region are routed identically, there is no need for a separate routing table for each region address 2202. Rather, the lumped region routing rule 2330 uses a single routing table 2332 for all regions, with the region address 2202 acting as the index to the table 2332. Much like the thirty-two split region routing tables 2328, each entry in the lumped region routing table 2332 contains one switch destination address 2206, and four priority, destination enable, and zoning fields (one for each port 110 on the PPD 130). In the preferred embodiment, the lumped region routing table 2332 contains only two hundred fifty-six entries, meaning that the lumped region routing rule 2330 supports only two hundred fifty-six different regions. Consequently, the rule 2330 in this form is useful only for auto discovery addressing mode since only two hundred fifty-six different region addresses 2202 exist in this mode. To support fixed addressing mode, which uses a sixteen-bit region address 2202, the lumped region routing table would need to have over thirty-two thousand entries.

iv) Well-Known Address Routing Rule 2340

The well-known address routing rule 2340 identifies and routes routing requests for frames that are intended to flow from source port 112 to a well-known address destinations as defined by the Fibre Channel protocol. The single well-known address routing rule 2340 handles frames destined for all fifteen well-known addresses in the range 0×FFFFF0 through 0×FFFFFE.

The well-known address routing rule identifies routing requests for frames destined for well-known addresses by comparing bits four to twenty-three in each routing request's D_ID to 0xFFFFF. The result selector 2380 gives preference to the broadcast routing rule 2370 over the well-known address routing rule 2340, ensuring that the well-known address routing rule's routing result is ignored when the routing request's D_ID is 0xFFFFFF (indicating broadcast).

When the rule 2340 determines that a routing request is destined for a well-known address, it uses the four least significant bits in the routing request's D_ID as an index to a processor-configurable, fifteen-entry, well-known address routing table 2342. This table contains the switch destination address 2206, destination enable bits, and the zoning indicators for each well-known address. This routing table 2342 does not contain priority fields, as the well-known address routing rule 2340 assigns all frames to fixed out-of-band priority level, such as priority level six or seven.

v) Domain Controller Routing Rule 2350

The domain controller routing rule 2350 identifies and routes routing requests for frames that are intended to flow from a source port 112 to a domain controller destination. A single domain controller routing rule 2350 handles routing requests for frames destined for all two hundred fifty-six domain controller addresses in the range 0xFFFC00 through 0xFFFCFF. The domain controller routing rule 2350 identifies frames destined for domain controllers by comparing bits 8–23 of each routing request's D_ID to 0xFFFC. When the rule 2350 determines that a routing request 2260 is destined for a domain controller address, it uses bits 0–7 of the routing request's D_ID as an index to a processor-configurable, two hundred fifty-six entry domain controller routing table 2352, which contains the switch destination address and zoning indicator for that domain controller. Much like the well-known address routing rule 2340, the domain controller routing table 2352 does not contain priority information, since the domain controller routing rule 2350 assigns all frames to a single, predetermined out-of-band priority level such as six or seven.

vi) Multicast Routing Rule 2360

The multicast routing rule 2360 identifies and routes routing requests for frames that are intended to flow from a source port 112 to multiple destination ports 114. A single multicast routing rule 2360 handles routing requests 2260 for frames destined for all two hundred fifty-six multicast group addresses in the range 0xFFFB00 through 0xFFFBFF. The multicast routing rule 2360 identifies routing requests for frames destined for Fibre Channel multicast groups by comparing bits 8–23 of the frame's D_ID to 0xFFFB. When the rule 2360 determines that a routing request 2260 is destined for a Fibre Channel multicast group address, it uses bits 0–7 of the routing request's D_ID as an index to a processor-configurable, two hundred fifty-six entry multicast group routing table 2362. This table 2362 contains the switch destination address and zoning indicator for that Fibre Channel multicast group. Once again, this rule 2360 sets the out-of-band priority to a fixed level.

In the preferred embodiment, the switch destination addresses in the multicast group routing table are multicast switch destination addresses 2210. Each of the two hundred fifty-six multicast switch destination addresses 2210 identifies one of two hundred fifty-six internal logical multicast groups. For each logical multicast group, the IRM 330, MCM 156, and FIM 160 cooperate to send frames for that group to a subset of the microprocessors 124 that control the I/O boards 120, 122. Those microprocessors 124 replicate the frames to the Fibre Channel ports 110 on their I/O boards 120, 122.

vii) Broadcast Routing Rule 2370

Like the multicast routing rule 2360, the broadcast routing rule 2370 identifies and routes routing requests 2260 for frames that are intended to flow from a source port 112 to multiple Fibre Channel destination ports 114. The broadcast routing rule handles frames with D_ID=0xFFFFFF. The broadcast routing rule is unique because the switch destination address 2206 assigned to broadcast frames depends on the routing request's protocol index 2312, not just the on the D_ID in the routing request 2260.

The broadcast routing rule 2370 identifies routing requests 2260 for broadcast frames by comparing the routing request's D_ID to 0xFFFFFF. When the rule 2370 determines that a routing request 2260 belongs to a broadcast frame, it uses the routing request's protocol index 2312 as an index to a processor-configurable, eight-entry broadcast routing table 2372, which contains the broadcast switch destination address 2206 and zoning for that protocol index 2312. In the preferred embodiment, the switch destination addresses in the broadcast routing table 2372 are multicast switch destination addresses 2210. The PPD 130 uses its multicast mechanism to replicate broadcast frames. The broadcast routing rule 2370 assigns all frames to set out-of-band priority level. Preferably, the well-known address routing rule 2340, the domain controller routing rule 2350, the multicast routing rule 2360, and the broadcast routing rule 2370 all assign their frames to the same priority level.

viii) Result Selector 2380

Figure 31:
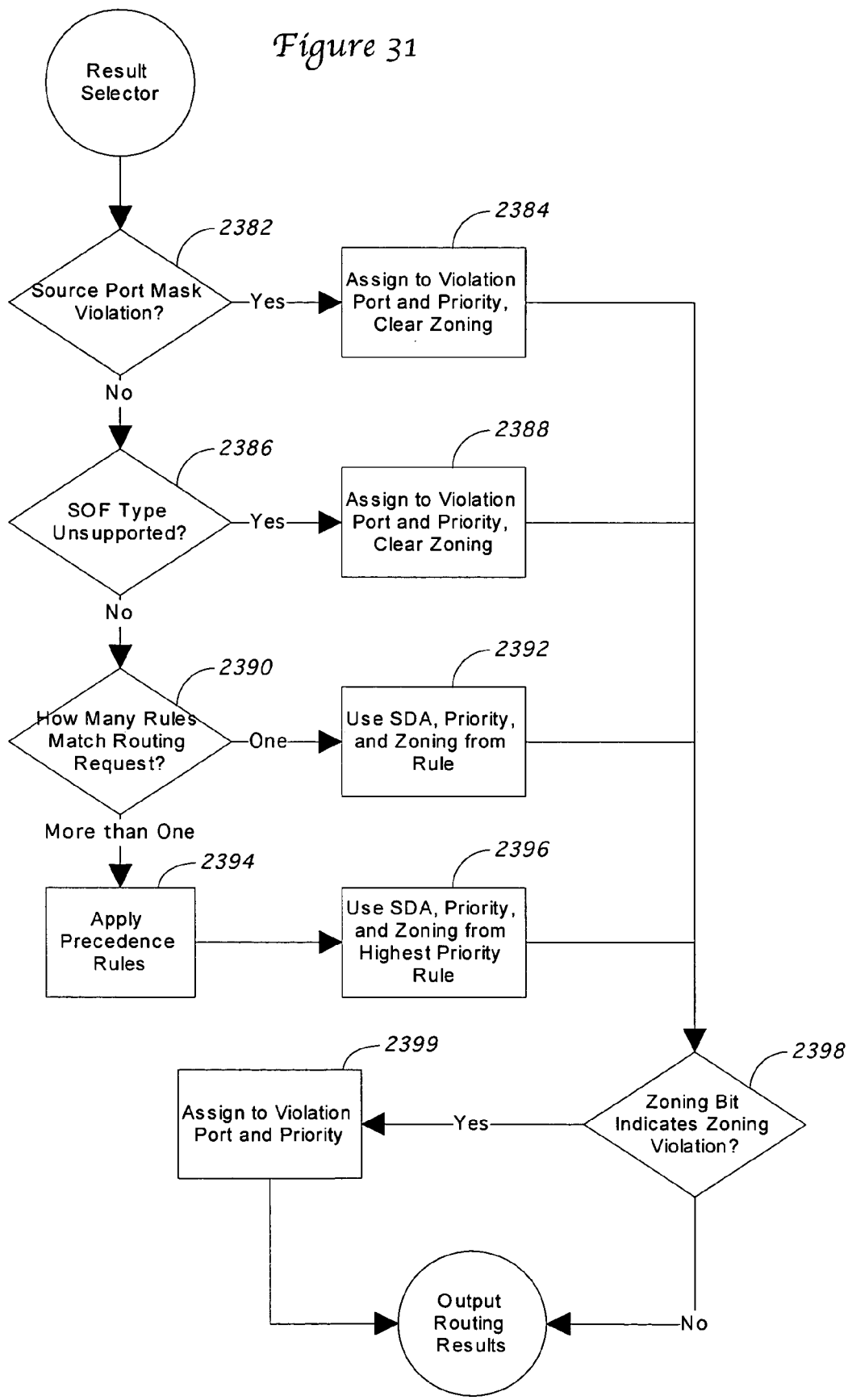
FIG. 31 is a flow chart showing a process used in one embodiment of a result selector found in the primary router of FIG. 30.

The result selector 2380 examines the outputs of all of the routing rules 2320–370, and chooses a switch destination address 2206, out-of-band priority, and zoning indicator for each routing request according to the rules set forth in FIG. 31. As shown in this flow chart, the first step 2382 is to determine if the split region routing rules 2320 indicated a source port mask 2326 violation. If so, the result selector 2380 assigns the routing result's switch destination address to the violation switch destination address 2206 selected by the processor 124, and assigns a predetermined out-of-band priority level and a zoning indicator of one as seen in step 2384. If there is no source port mask 2326 violation, the routing selector 2380 determines if the routing request's SOF type is not supported by the switch 100 at step 2386. For example, switches 100 often do not support Class "1" or Class "4" Fibre Channel frames. If the frame is not supported, the result selector 2380 assigns the routing result's switch destination address to the violation switch destination address, and assigns a predetermined out-of-band priority level and a zoning indicator of one, as indicated in step 2388.

If neither test 2382 nor test 2386 is positive, step 2390 determines if the routing request 2260 matches exactly one routing rule 2320–370. If so, the result selector 2380 uses the switch destination address 2206, out-of-band priority, and zoning indicator from the matching rule 2320–370 in step 2392. If the routing request 2260 matches more than one routing rule 2320–370, the result selector 2380 applies the following priority list in step 2394 (from highest priority to lowest):

the split region routing rules 2320 (with rule zero having the highest precedence), the broadcast routing rule 2370, the well-known address routing rule 2340, domain controller routing rule 2350, and multicast routing rule 2360 (which are mutually exclusive), and the lumped region routing rule (every frame matches this rule).

The highest priority rule then determines the switch destination address 2206, out-of-band priority, and zoning indicator in step 2396.

After choosing the switch destination address 2206, out-of-band priority, and zoning indicator, the result selector 2380 examines the zoning indicator in step 2398. If the zoning indicator is zero, this means there is a zoning violation. At step 2399, the result selector 2380 changes the switch destination address to the violation switch destination address and changes the out-of-band priority to a predetermined level.

The output of the result selector 2380 is the routing result's switch destination address 2302, an out-of-band priority 2304. The result selector 2380 also creates the routing reason code 2306, according to a predefined definition. The output of the result selector 2380 is the output of the primary router 2280, which is then submitted to the ISL group router 2400.

e) ISL Group Router 2400

When one switch 100 sends traffic to another switch 100 through an ISL group 108, the ISL group router 2400 helps balance the traffic across the various interswitch links 104 in the ISL group 108 (load balancing), while ensuring that all frames belonging to a single exchange are sent over a single interswitch link 104. The ISL group router 2400 supports eight different ISL groups 108, with an unlimited number of physical interswitch links 104 in each group 108. Other embodiments could easily support thirty-two or even one hundred twenty-eight ISL groups 108 without any change in the size or apportioning of the switch destination addresses 2206.

The processor 124 programs the primary router 2280 to recognize routing requests 2260 for frames that should travel through one of the eight ISL groups 108, and to map each of those routing requests to an ISL group switch destination address 2212. Any number of primary router entries can point to one of the ISL groups 108. An ISL group switch destination address 2212 identifies which of the eight ISL groups 108 should carry the frame out of the switch 100.

In the preferred embodiment, the ISL group router 2400 balances traffic across the links in an ISL group 108 based on the traffic's source port 112. Each IRM 330 serves four source ports 110, so every routing request 2260 comes from one of four possible sources. After the primary router 2280 tags a routing result with an ISL group switch destination address 2212, the ISL group router 2400 chooses a new ISL or E_Port switch destination address 2208 for the routing result based on its source port 112. The preferred embodiment uses a simple mapping table that directly assigns a specific ISL port address 2208 for each possible source port/ISL group pairs.

Other techniques for load balancing across an ISL group 108 would be possible with the current invention, and would be clear to those of ordinary skill. For instance, the Fibre Channel S_ID, D_ID, OX_ID, or any combination of these elements could be used as a key to a hash function that would be used to select a physical port switch destination address 2208 for a particular ISL group (or for an ISL group/source port 112 combination). It would also be possible to subject these elements to a mask that would allow the processor 124 to set certain bits in these elements as "don't care" or "ignored" bits. One constant in all these techniques is that all frames belonging to an individual exchange will be sent over the same physical interswitch link 104.

The processor 124 configures the mapping between source port/ISL group pairs and the selected E_Port in the ISL group router 2400. For each of the eight ISL groups 108, the processor 124 provides four switch destination addresses 2208, one for routing requests from each source port 112. Each of these addresses is the switch destination address 2208 of a destination E_Port. By programming all of the ISL group routers 2400 in the switch, the processor 124 can choose an ISL 104 for each source port/ISL group combination.

Figure 32:
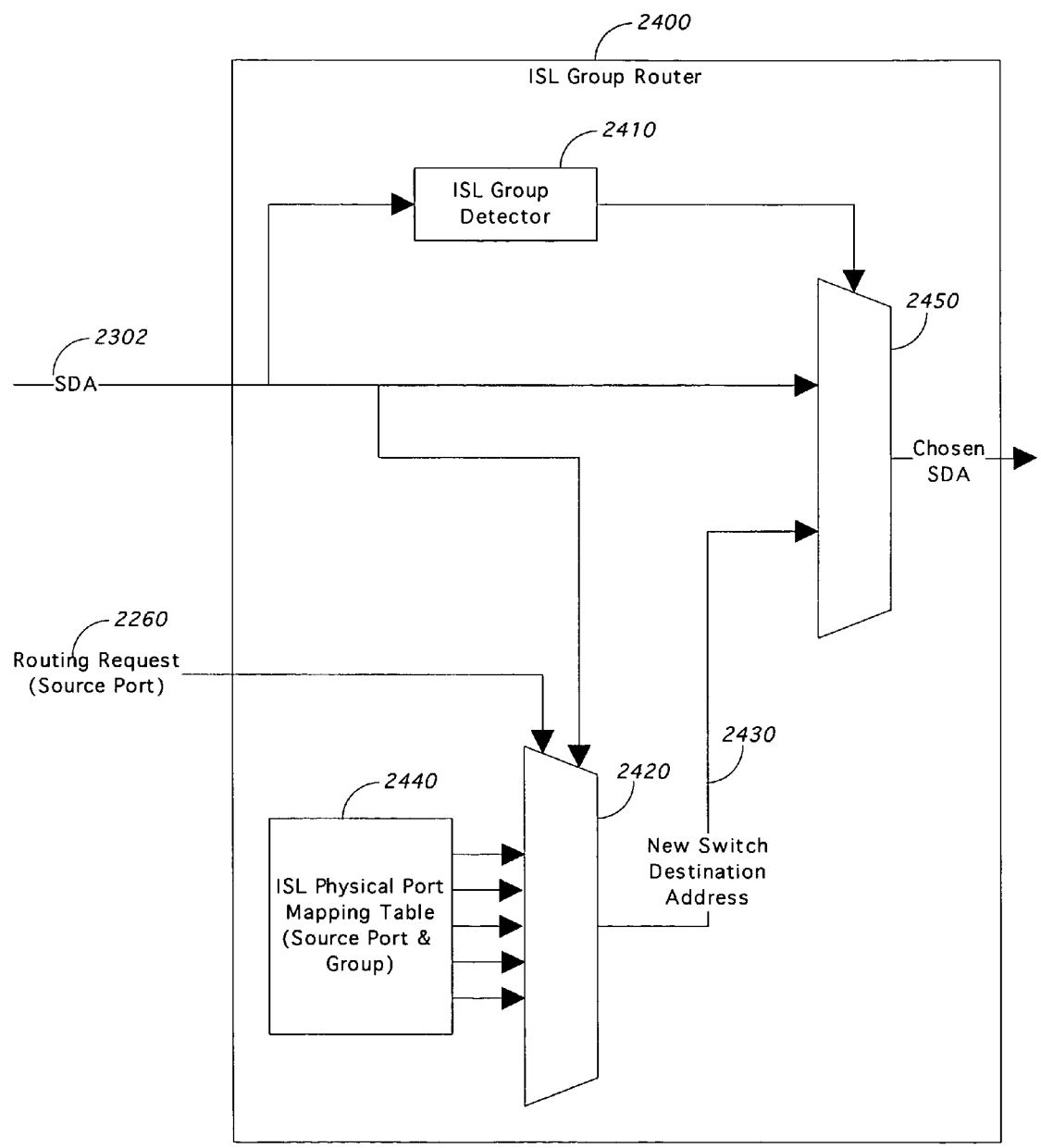
FIG. 32 is a block diagram of the ISL Group Router found in the inbound routing module shown in FIG. 26.

FIG. 32 shows a block diagram for the ISL group router 2400. The ISL group detector 2410 reads the switch destination address output 2302 from the primary router 2280. In the preferred embodiment, when the three most significant bits in address 2302 are set to 110, the switch destination address 2212 is an ISL group 108. Hence, ISL group detector 2410 need only look at the three most significant bits in address 2302 to make its determination.

Meanwhile, the ISL group address redirector 2420 reads three bits (bits 6:4 in the preferred embodiment) from the switch destination address 2302 that distinguish between the eight possible ISL groups 108. The redirector 2420 combines this information with source port information from the routing request 2260 to determine a new switch destination address 2430 for an individual ISL 104 using mapping table 2440. A selector 2450 under the control of the ISL group detector 2410 then chooses between the switch destination address 2302 created by the primary router 2280 and the switch destination address 2430 created by the redirector 2420. The ISL group router 2400 does not alter the priority or zoning that was assigned to the frame by the primary router 2280.

f) Priority Combiner 2500

The priority combiner 2500 examines each routing result's switch destination address 2302, in-band priority level, and out-of-band priority level 2304, and assigns a single final priority level. If out-of-band priority has been enabled, either by having the bit set in the routing table or by the hardware forcing a priority level due to an error, the final priority level will be the out-of-band priority level 2304. If out-of-band priority 2384 is not enabled, the final priority level will be the in-band priority level.

g) Output Sorter 2600

The output sorter 2600 is responsible for routing the routing result from the rest of the inbound routing module 330 and delivering it to the MCM 156 for the input port 112. The routing result delivered to the MCM 156 contains the following elements: i) the switch destination address 2206 for the output port 114, ii) the three-bit final priority level, iii) a seven-bit reason code, which indicates which indicates why the IRM 330 routed the frame to its destination, iv) the frame's location in credit memory 154, taken directly from the routing request 2260, and v) the frame's one-bit CRC regeneration flag, also taken directly from the routing request.

9. Early Packet Termination and Rate Adaptation a) Frame to Cell Conversion

Figure 34:
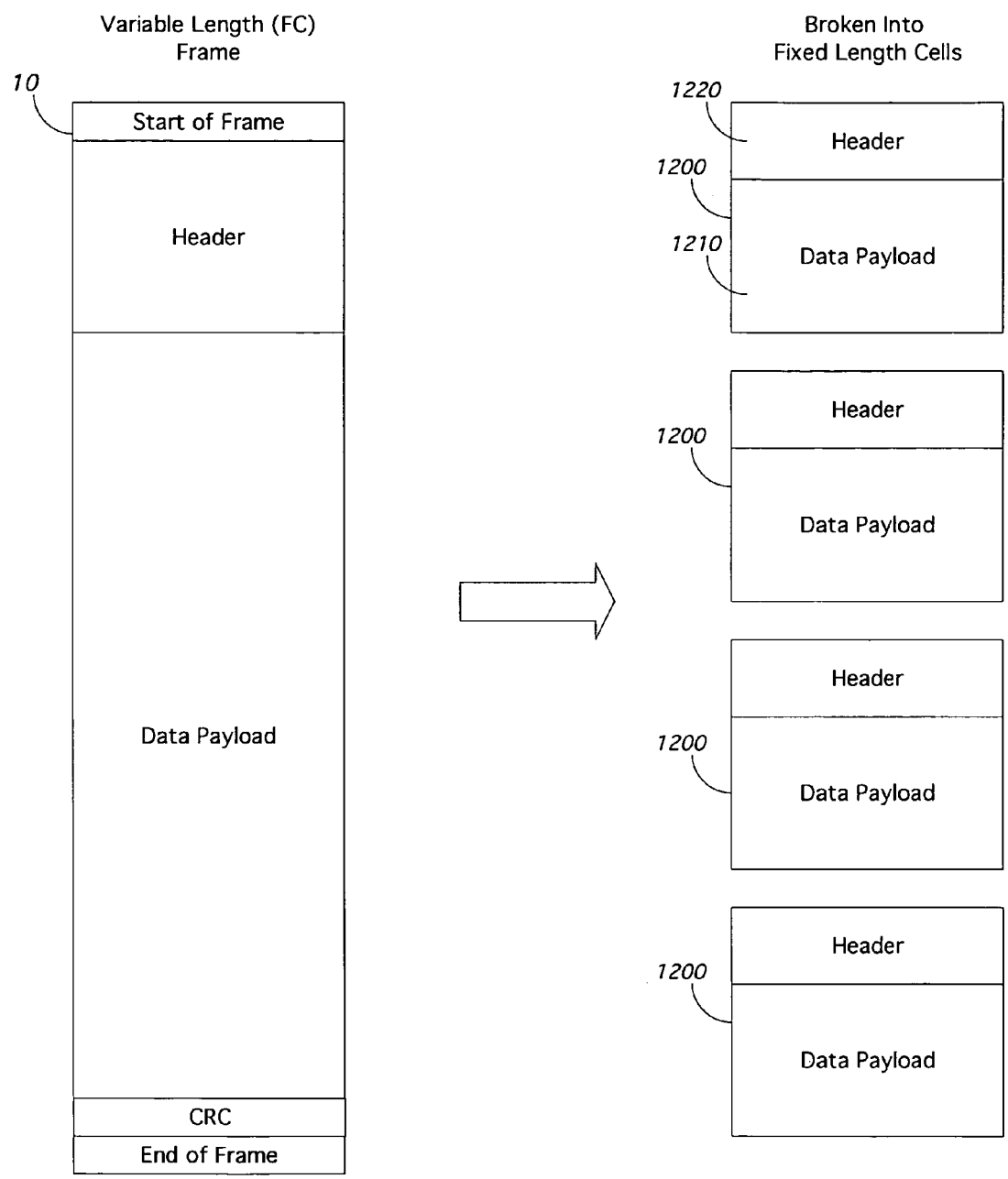
FIG. 34 is a block drawing showing the segmentation of a Fibre Channel frame into fixed length data cells.

The basic functionality of the frame to cell conversion component 164 is shown in FIG. 34. The component 164 converts a variable length Fibre Channel frame into a plurality of fixed-length data cells 1200. A Fibre Channel frame can vary between thirty-six and two thousand one hundred forty-eight bytes in length. In the preferred embodiment, unicast data cells are sixty-four bytes long. Each data cell 1200 has both a data payload component 1210 and a header component 1220. The preferred embodiment uses a header 1220 of 8 bytes, leaving fifty-six bytes per cell for data in a unicast cell. Multicast data cells 1200 are the same size, but have an eleven-byte header component 1220. Although this leaves fifty-three bytes for data in a multicast data cell 1200, the preferred embodiment uses only fifty-two bytes of this data payload 1210 in order to simplify logic.

As explained above, the cell-based crossbar 140 and related arbiter 170 maintain a connection through the crossbar 140 throughout the transmission of a data packet. With the AMCC chipset, the maximum packet length is one hundred ninety-two data cells. This means that the data packet using the preferred embodiment components can be up to ten thousand seven hundred fifty-two bytes long, which is more than enough to handle a maximum sized Fibre Channel frame.

b) Minimizing Latency in a Cell-Based Fibre Channel Switch

As explained above, the biggest hurdle in using a cell-based crossbar 140 for Fibre Channel frames is determining how long the crossbar 140 should hold a connection for a particular frame. One alternative is to set the packet length to the maximum size necessary to transmit a Fibre Channel frame. Unfortunately, this means that shorter frames will complete their transmission long before the crossbar 140 releases the connection, which greatly decreases the efficiency of the crossbar 140 and the switch 100 in general.

Alternatively, the length of the packet could be set to exactly match the number of cells 1200 necessary to transmit each individual Fibre Channel frame. Unfortunately, the Fibre Channel protocol does not indicate the length of each frame in the frame header. The only way to determine the frame length is to detect the EOF indicator. This means that the entire frame would need to be received in the credit memory 1320 before the first cell 1200 for the frame is constructed and transmitted over the crossbar 140. Unfortunately, the latency caused by this delay is unacceptable in Fibre Channel switches 100.

c) Termination and Adaptation

The present invention overcomes this problem by devising an ability to terminate a packet connection through the crossbar 140 before the entire packet has been transmitted. This is accomplished by adding certain fields to the header of each cell 1200. As shown in FIG. 35, the header 1220 of a data cell in the preferred embodiment contains numerous fields, including a start of packet (SOP) flag 1222, an end of packet (EOP) flag 1224, and a packet length field 1226. When set, the SOP flag 1222 indicates that the current cell 1200 contains the start of a new data packet. Similarly, the EOP flag 1224 indicates that the cell 1200 contains the end of a data packet. The length field 1226 is the same field used by prior art cell-based switches to indicate the length of the current packet, in number of cells 1200.

FIG. 36 shows how the present invention uses these header fields 1222–226 to minimize latency in the switch 100. When a Fibre Channel frame first begins to arrive at the switch 100, it can be immediately forwarded to the fabric interface module 160 for conversion to data cells 1200 and transmission through the crossbar 140. The frame to cell conversion component 164 waits until a full payload of data (56 bytes) has arrived, and creates the first data cell 1202. The header 1220 in this first cell 1202 indicates that it is the first cell in a packet by setting the SOP flag 1222 and also indicates that it is not the last cell in the packet (the EOP flag 1224 is not set). The length field 1226 is set to some large number of cells sufficient to send an entire maximum-length Fibre Channel frame. While only thirty-nine cells would be necessary to send a maximum sized Fibre Channel frame if every data payload 1210 in the cells were completely full, the present invention does not require or expect this to be the case. Hence, the number of cells indicated in the length field 1226 of the first data cell 1202 is larger than thirty-nine, and can be as large as the maximum number of cells 1200 allowed in a data packet by the utilized crossbar 140. In the preferred embodiment, no Fibre Channel frame uses more than seventy-nine cells, making this number a good option for length field 1226. Alternatively, the length field 1226 can vary depending upon the data transfer rate of the Fibre Channel device attached to the incoming port 112 and whether unicast or multicast packets are being sent. In the preferred embodiment, the maximum packet length for two Gbps and four Gbps devices is forty cells for unicast packets and forty-one cells for multicast packets. The maximum packet length for one Gbps devices is seventy-eight cells for unicast packets and seventy-nine cells for multicast packets.

The next two data cells 1204 are neither the first nor the last cells 1200 in the Fibre Channel frame. In these cells 1204, neither the SOP flag 1222 nor the EOP flag 1224 are set. In addition, these cells 1204 are allowed to carry a partially full data payload 1210. As explained above, cells 1200 are transmitted from the fabric interface module 160 to the iMS 180 via a plurality of data lines 166. The data lines 166 are handled sequentially in a round robin format, with a data cell 1200 being sent in turn whether data is ready to be sent or not. Under old techniques, it was necessary to fill the data payload of an entire data cell 1200 before the cell 1200 was submitted to the iMS 180. In contrast, the present invention submits a cell 1200 for transmission across the crossbar 140 even when the data payload 1210 is not full. The amount of real data in the cell 1204 is indicate in the same length field 1226 that is used to communicate the length of the packet in the first data cell 1202. The egress fabric interface module 162 uses the number of valid bytes indicated in this field 1226 in these intermediate cells 1204 to add only valid data bytes to the reconstructed Fibre Channel frame and to discard any fill bytes.

When the frame to cell conversion component 164 encounters the EOF indicator, it creates a final cell 1206 with the EOP flag 1224 set. Like the intermediate cells 1204, the final cell 1206 can be partially filled with valid data, and therefore indicates the number of valid bytes in the cell in the length field 1226 of its header 1220.

When a cell 1200 with the end of packet flag 1224 set exits the cell-based crossbar fabric 140, it triggers a release of the connection used by this packet in the crossbar switch 140. The act of releasing the connection can be performed through a variety of techniques, depending on the requirements of the crossbar 140 and arbiter 170. For instance, egress PPD 162 might signal the release of a connection by setting a register bit or sending a signal on a dedicated path (such as by setting a pin to ground).

Filling the data payload 1210 of the first data cell 1202 contain a full data payload 1210 helps to avoid a data underrun at the egress port 114. As long as the first cell 1202 contains a full amount of data, the egress PPD 132 is assured of having sufficient data to output the frame data at the same nominal rate that data was input to the switch 100 at input port 112. Filling the first data cell 1202 also allows the cell 1202 to be transmitted without the need for sending a valid byte count in the cell 1202. If the first data cell 1202 cannot be filled due to a very small Fibre Channel frame, both the SOF flag 1222 and the EOF flag 1224 will be set, and the length field 1226 will indicate the number of valid bytes in the cell 1202.

d) Alternative Embodiment

Figure 37:
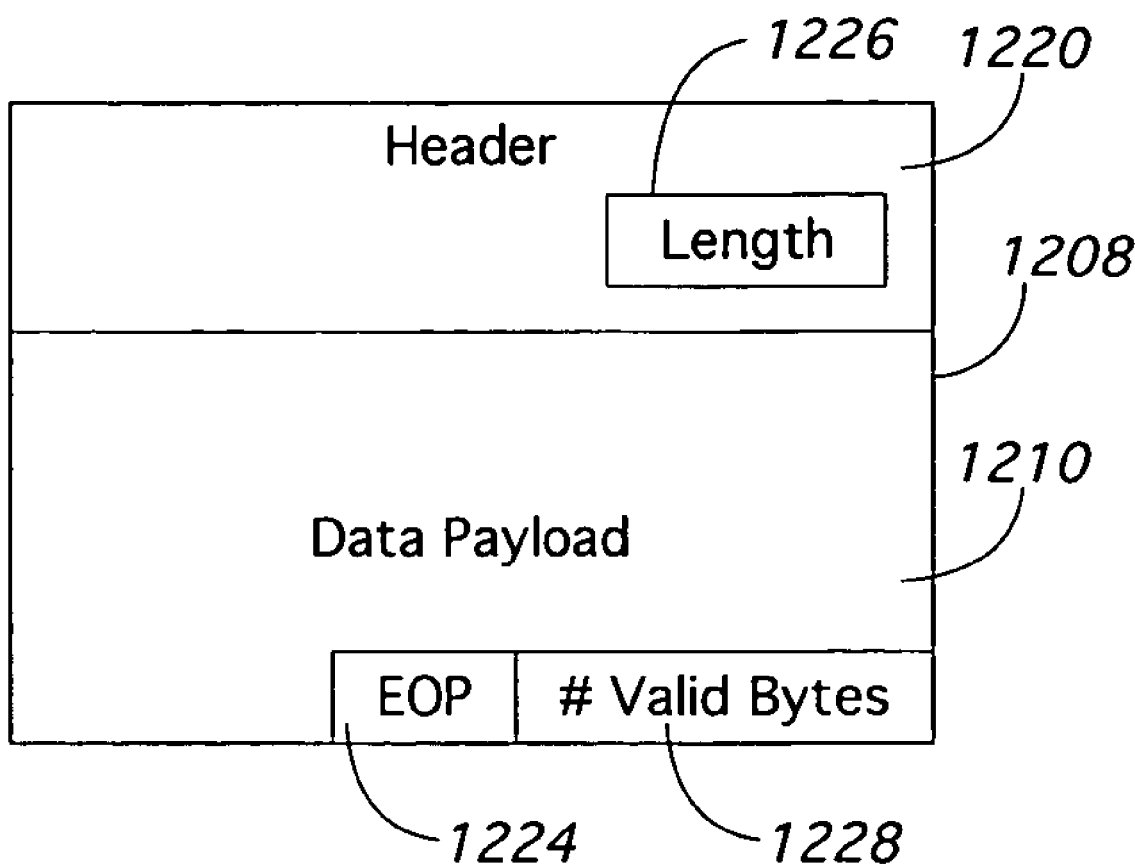
FIG. 37 is a block drawing showing an alternative embodiment for a fixed length data cell.

FIG. 37 shows an alternative embodiment cell 1208 in which the header 1220 is not used to transmit end of packet information. In this embodiment, the end of packet flag 1224 and a valid byte count field 1228 are inserted into the data payload 1210 of the cell 1208. The packet length field 1226 remains in the header, and is used to indicate the packet length in number of cells. Fields 1224, 1228 should occur at the same position within every cell 1208. At the switch input, the contents of a cell's EOP 1224 and valid byte count fields 1228 cannot be calculated until data for an entire cell 1208 has been received. If these fields 1224, 1228 are located at the beginning of the data payload 1210, each cell 1208 must be buffered at the switch input. After the entire cell 1208 has been buffered, the valid byte count 1228 and EOP indicator 1224 for that cell 1208 are calculated and placed in the fields at the beginning of the cell 1208. Then the cell is transmitted into the iMS 180 and crossbar 140. At the switch output, the valid byte count 1228 and EOP indicator 1224 are available at the beginning of the data payload 1210, and no output buffering is required.

If the valid byte count 1228 and EOP indicator 1224 are located at the end of each cell 1208, no buffering at the switch input is required. The beginning of the cell 1208 is transmitted to the iMS 180 and crossbar 140 as soon as it is available. While the cell 1208 is entering the crossbar 140, the valid byte count 1228 and EOP indicator 1224 for that cell 1208 are calculated. As the end of the cell 1208 is being submitted to the iMS 180, the valid byte count 1228 and EOP indicator 1224 are placed in the fields at the end of the cell 1208. However, at the switch output, the entire cell 1208 must be buffered. After the entire cell 1208 has been buffered at the switch output, the valid byte count 1228 and EOP indicator 1224 are extracted from the fields at the end of the cell 1208. Then, the cell's payload data 1210 can be extracted.

Segmenting variable-length frames into fixed-length cells with the above early termination procedure results in a latency of one cell, rather than a latency of one frame. If the valid byte count 1228 and EOP indicator 1224 are in the header 1220 or at the beginning of the data payload 1210, a one-cell latency at the switch input results. If the valid byte count 1228 and EOP indicator 1224 are at the end of the data payload 1210, a one-cell latency at the switch output results. If the valid byte count 1228 and EOP indicator 1224 are in the middle of a cell 1208, a half-cell latency at the switch input and a half-cell latency at the switch output result. The total latency is always one cell, and the location of the latency is determined by the position of the valid byte count 1228 and EOP indicator 1224 within the cell. The location of the latency may be chosen to suit any other design criteria.

e) Method

Figure 38:
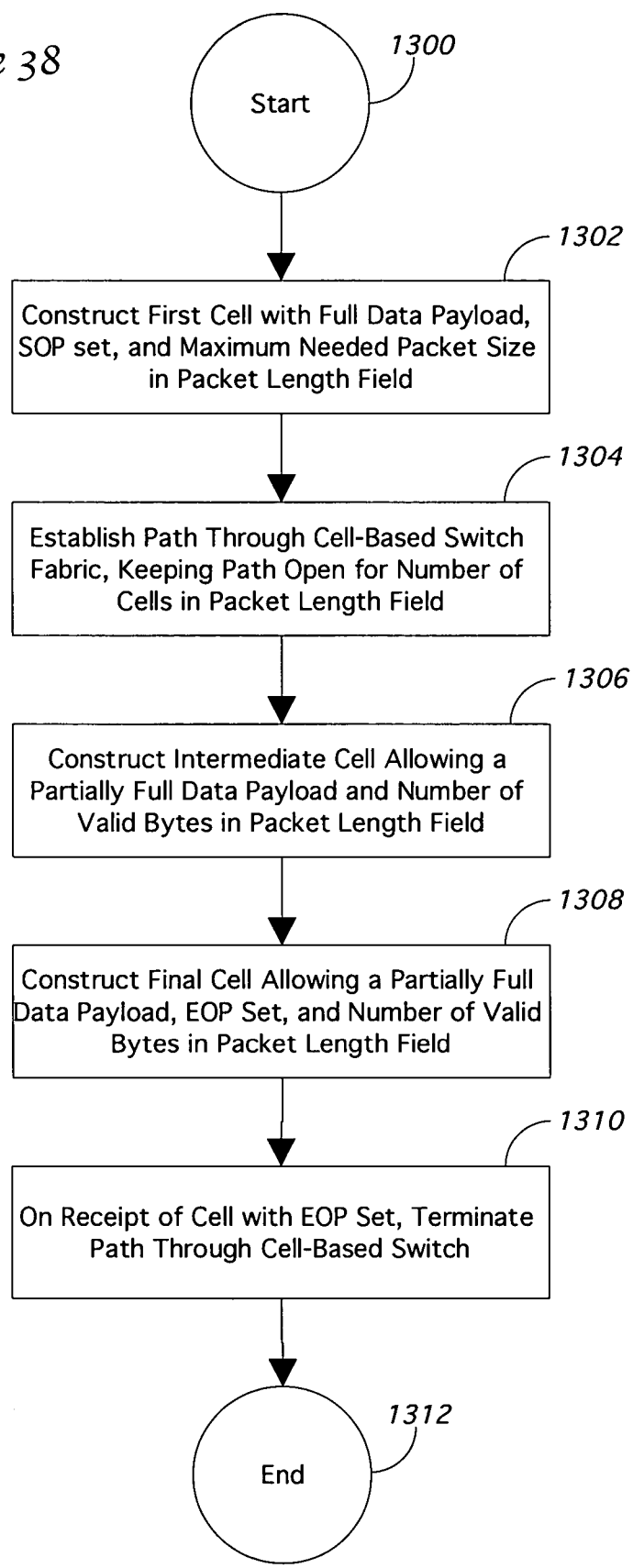
FIG. 38 is a flow chart showing one embodiment of the method used by the present invention.

The procedure used by the present invention to send a variable-length Fibre Channel frame over a cell-based switch fabric is shown as flow chart 1300 in FIG. 38. The procedure starts with step 1302, in which a first data cell 1202 is constructed from the Fibre Channel frame. This cell 1202 has the SOP 1222 flag set, indicates the maximum number of cells needed to transmit a frame in the length of packet field 1226, and contains a full data payload 1210.

In step 1304, a path is established through the cell-based crossbar 140. This path will normally be kept open until the number of cells indicated in field 1226 has passed through the crossbar 140. This path need not be created before the intermediate cells 1204 and the final cells 1206 are constructed (steps 1306, 1308), although flow chart 1300 correctly indicates that this may be true.

In step 1306, the intermediate cells 1204 are constructed. In these cells 1204, neither SOP 1222 nor EOP 1224 is set, and the data payload may be only partially filled with valid data. In these cells 1204, the packet length field 1226 indicates the number of valid data bytes in the cell 1204. Step 1308 then creates the final cell 1206, with the EOP flag 1224 set and with the packet length field 1226 again indicating the number of valid data bytes in the cell 1206. It is not necessary that the intermediate cells 1204 be created. The size of the Fibre Channel frame may be such that only two cells 1202, 1206 are necessary. In this case, step 1306 may be skipped.

In step 1310, the receipt of the final cell on the destination port side of the cell-based crossbar 140 triggers the termination of the path established in step 1304. This path is terminated even though the number of cells specified in the length of packet field in step 1302 may not have passed through the crossbar.

10. Microprocessor Communication a) Fabric to Microprocessor Communication

Communication directed to a microprocessor 124 can be sent over the crossbar 140 via the virtual output queues 290 of the iMS 180. This communication will be directed to one of the ports 110 serviced by the microprocessor 124, and will be assigned to the microprocessor class of service by the fabric interface module 160. In the preferred embodiment, each microprocessor 124 services numerous ports 110 on its I/O board 120. Hence, it is possible to design a switch 100 where communication to the microprocessor 124 could be directed to the switch destination address of any of its ports 110, and the communication would still be received by the microprocessor 124 as long as the microprocessor class of service was also specified. In the preferred embodiment, the switch 100 is simplified by specifying that all communication to a microprocessor 124 should go to the last port 110 on the board 120. More particularly, the preferred embodiment sends these communications to the third port 110 (numbered 0–3) on the third PPD 130 (numbered 0–3) on each board 120. Thus, to send communications to a microprocessor 124, the third port on the third PPD 130 is specified as the switch destination address, and the communication is assigned to the microprocessor class of service level on the virtual output queues 290.

The data is then sent over the crossbar 140 using the traffic shaping algorithm of the iMS 180, and is received at the destination side by the eMS 182. The eMS 182 will examine the SDA of the received data, and place the data in the output class of service queue structures 280 relating to the last port 110 on the last PPD 130 on the board 120. In FIG. 39, this was labeled port 116. In FIG. 5, this is "Port 15," identified again by reference numeral 116. In one of the preferred embodiments, the eMS 182 uses eight classes of services for each port 110 (numbered 0–7) in its output class of service queues 280. In order for the output priority queue 280 to differentiate between real data directed to physical ports 110 and communication directed to microprocessors 124, microprocessor communication is again assigned to a specific class of service level. In the output class of service queues 280 in one embodiment, microprocessor communication is always directed to output class of service 7 (assuming eight classes numbered 0–7), on the last port 116 of an I/O board 120. All of these assignments are recorded in the cell headers of all microprocessor-directed cells entering the cell-based switch fabric and in the extended headers of the frames themselves. Thus, the SDA, the class of service for the virtual output queue 290, and the class of service for the output class of service queue 280 are all assigned before the cells enter the switch, either by the PPD 130 or the microprocessor 124 that submitted the data to the switch fabric. The assignment of a packet to output class of service seven on the last port 116 of an I/O board 120 ensures that this is a microprocessor-bound packet. Consequently, an explicit assignment to the microprocessor class of service in V_O_Q 290 by the routing module 330 is redundant and could be avoided in alternative switch designs.

As shown in FIG. 39, data to this port 116 utilizes a special, dual port OPM 451 connected to two separate fabric interface modules 160, each handling a separate physical connection to the eMS 182. The eMS 182 in the preferred embodiment views these two connections as two equivalent, available paths to the same location, and will use either path to communicate with this port 116. The OPM 451 therefore must therefore expect incoming Fibre Channel frames on both of its two FIMs 160, 162, and must be capable of handling frames directed either to the port 116 or the microprocessor 124. Thus, while other OPMs 454 have a single port data buffer 454 to handle communications received from the FIM 160, the dual port OPM 451 has two port data buffers 454 (one for each originating FIM 160, 162) and two microprocessor buffers 456 (one for each FIM 160, 162). To keep data frames in order, the dual port OPM 451 utilizes two one-bit FIFOs called "order FIFOs," one for fabric-to-port frames and one for fabric-to-microprocessor frames. Depending on whether the frame comes from the first FIM 160 or the second FIM 162, the frame order FIFO is written with a '0' or '1' and the write pointer is advanced. The output of these FIFOs are available to the microprocessor interface 360 as part of the status of the OPM 451, and are also used internally by the OPM 451 to maintain frame order.

When the OPM 451 detects frames received from one of its two fabric interface modules 160, 162 that are labeled class of service level seven, the OPM 451 knows that the frames are to be delivered to the microprocessor 124. The frames are placed in one of the microprocessor buffers 456, and an interrupt is provided to the microprocessor interface module 360. The microprocessor 124 will receive this interrupt, and access the microprocessor buffers 456 to retrieve this frame. In so doing, the microprocessor 124 will read a frame length register in the buffer 456 in order to determine the length of frame found in the buffer. The microprocessor will also utilize the frame order FIFO to select the buffer 456 containing the next frame for the microprocessor 124. When the frame has been sent, the microprocessor 124 receives another interrupt.

b) Microprocessor to Fabric or Port Communication

Each port protocol device contains a microprocessor-to-port frame buffer 362 and a microprocessor-to-fabric frame buffer 364. These buffers 362, 364 are used by the microprocessor 124 to send frames to one of the local Fibre Channel ports 110 or to a remote destination through the switch fabric. Both of these frame buffers 362, 364 are implemented in the preferred embodiment as a FIFO that can hold one maximum sized frame or several small frames. Each frame buffer 362, 364 also has a control register and a status register associated with it. The control register contains a frame length field and destination bits, the latter of which are used solely by the port frame buffer 362. There are no hardware timeouts associated with these frame buffers 362, 364. Instead, microprocessor 124 keeps track of the frame timeout periods.

When one of the frame buffers 362, 364 goes empty, an interrupt is sent to the microprocessor 124. The processor 124 keeps track of the free space in the frame buffers 362, 364 by subtracting the length of the frames it transmits to these buffers 362, 364. This allows the processor 124 to avoid having to poll the frame buffers 362, 364 to see if there is enough space for the next frame. The processor 124 assumes that sent frames always sit in the buffer. This means that even when a frame leaves the buffer, firmware is not made aware of the freed space. Instead, firmware will set its free length count to the maximum when the buffer empty interrupt occurs. Of course, other techniques for managing the microprocessor 124 to buffer 362, 364 interfaces are well known and could also be implemented. Such techniques include credit-based or XON/XOFF flow control methods.

As mentioned above, in situations where the transmission speed coming over the port 110 is less than the transmission speed of a single physical link to the iMS 180, each of the first fifteen ports 110 uses only a single FIM 160. In these cases, although the last port 116 on an I/O board will receive data from the eMS 182 over two FIMs 160, 162, it will transmit data from the memory controller module 310 over a single FIM 160. This means that the microprocessor-to-fabric frame buffer 364 can use the additional capacity provided by the second FIM 162 as a dedicated link to the iMS 180 for microprocessor-originating traffic. This prevents a frame from ever getting stuck in the fabric frame buffer 364. However, in situations where each port 110 uses two FIMs 160 to meet the bandwidth requirement of port traffic, the fabric frame buffer 364 is forced to share the bandwidth provided by the second FIM 162 with port-originating traffic. In this case, frame data will occasionally be delayed in the fabric frame buffer 364.

Frames destined for a local port 110 are sent to the microprocessor-to-port frame buffer 362. The microprocessor 124 then programs the destination bits in the control register for the buffer 362. These bits determine which port or ports 110 in the port protocol device 130 should transmit the frame residing in the port frame buffer 362, with each port 110 being assigned a separate bit. Multicast frames are sent to the local ports 110 simply by setting multiple destination bits and writing the frame into the microprocessor-to-port buffer 362. For instance, local ports 0, 1 and 2 might be destinations for a multicast frame. The microprocessor 124 would set the destination bits to be "0111" and write the frame once into the port frame buffer 362. The microprocessor interface module 360 would then ensure that the frame would be sent to port 0 first, then to port 1, and finally to port 2. In the preferred embodiment, the frame is always sent to the lowest numbered port 110 first.

Once a frame is completely written to the port frame buffer 362 and the destination bits are set, a ready signal is sent by the microprocessor interface module 360 to the OPM(s) 450, 451 designated in the destination bits. When the OPM 450, 451 is ready to send the frame to its link control module 300, it asserts a read signal to the microprocessor interface module 360 and the MIM 360 places the frame data on a special data bus connecting the OPMs 450, 451 to the MIM 360. The ready signal is unasserted by the MIM 360 when an end of frame is detected. The OPM 450, 451 then delivers this frame to its link controller module 300, which then communicates the frame out of the port 110, 116. The microprocessor-to-port frame traffic has higher priority than the regular port traffic. This means that the only way a frame can get stuck in buffer 362 is if the Fibre Channel link used by the port 110 goes down. When the microprocessor 124 is sending frames to the ports 116, the OPM 451 buffers the frames received from its fabric interface module 160 that is destined for its port 110, 116.

Frames destined for the fabric interface are sent to the extra FIM 162 by placing the frame in the microprocessor-to-fabric frame buffer 364 and writing the frame length in the control register. To avoid overflowing the iMS 180 or one of its virtual output queues 290, the microprocessor 124 must check for the gross_xoff signal and the destination's status in the XOFF mask 408 before writing to the fabric frame buffer 364. This is necessary because data from the fabric frame buffer 364 does not go through the memory controller 310 and its XOFF logic before entering the FIM 162 and the iMS 180. Since data in the fabric frame buffer 364 is always sent to the same FIM 162, there are no destination bits for the microprocessor 124 to program. The FIM 162 then receives a ready signal from the microprocessor interface module 360 and responds with a read signal requesting the frame from the fabric frame buffer 364. The remainder of the process is similar to the submission of a frame to a port 110 through the port frame buffer 362 as described above.

The many features and advantages of the invention are apparent from the above description. Numerous modifications and variations will readily occur to those skilled in the art. For instance, it would be a simple matter to define the virtual channels 240 by simply dividing the entire Fibre Channel address space into "n" channels, rather than using the F class frames 600 described above. In addition, persons of ordinary skill could easily reconfigure the various components described above into different elements, each of which has a slightly different functionality than those described. Neither of these changes fundamentally alters the present invention. Since such modifications are possible, the invention is not to be limited to the exact construction and operation illustrated and described. Rather, the present invention should be limited only by the following claims.

What is claimed is:

1. A method for sending a variable length data packet through a downstream switch having a plurality of destination ports comprising:
   a) tracking a congestion status of the destination ports in an XOFF mask;
   b) using changes in the XOFF mask values to trigger a flow control primitive to an upstream switch to control flow over a virtual channel to the downstream switch;
   c) routing the data packet to a particular destination port by selecting an applicable routing rule from a plurality of routing rules based on a destination field within the data packet;
   d) if the particular destination port has a congested status in the XOFF mask, storing the data packet in a deferred queue for later processing after a change in the XOFF mask;
   e) transmitting the data packet over a cell-based switch fabric to the particular destination port; and
   f) transmitting over the same cell-based switch fabric a communication destined for a microprocessor that services the particular destination port.

2. The method of claim 1, wherein step a) further comprises:
   i) maintaining at each ingress port a lookup table having multiple entries, each entry containing a congestion status for a different destination in the switch, each lookup table containing entries for all available destinations in the switch, each lookup table returning the congestion status in response to a status query for a particular destination,
   ii) maintaining at a credit module an indicator of an amount of data submitted for each destination,
   iii) when the indicator passes a threshold value, sending a congestion update from the credit module to a first lookup table, the congestion update containing a destination identifier and an updated congestion status, and
   iv) updating the entry in the first lookup table corresponding to the destination identifier using the updated congestion status.

3. The method of claim 1, wherein step b) further comprises:
   i) establishing a map between each virtual channel and the possible destination ports for that virtual channel, and
   ii) comparing the map and the XOFF mask status for all of the possible destination ports to determine a flow control status for each virtual channel.

4. The method of claim 1, wherein step c) further comprises:
   a) applying multiple routing rules to the data packet in parallel, each rule:
      i) determining whether the rule applies to the data packet, and, at the same time, and
      ii) determining a routing result for the data packet, the result including an address for internal routing within the switch; and
   b) selecting a preferred result from among all of the results obtained from the multiple routing rules.

5. The method of claim 1, wherein step d) further comprises:
   i) forwarding the data packet to the destination port if the congestion status is in the XOFF mask is non-congested,
   ii) storing the data packet in a deferred queue if the congestion status is congested, and
   iii) repeating the above steps for additional data packets, such that multiple packets that are routed to a plurality of different congested destination ports are stored in the same deferred queue.

6. The method of claim 1, wherein the cell-based switch fabric requires cells having a data payload and a packet length field, wherein step e) further comprises:
   i) constructing a first data cell from the data frame, the first data cell containing a full data payload and a packet length value in the packet length field, the packet length value being indicative of the number of data cells in the data frame, and
   ii) constructing a second data cell from the data frame, the second data cell containing a partially filled data payload and a valid data value in the packet length field, the valid data value being indicative of the amount of valid data in the data payload.

7. The method of claim 1, wherein step f) further comprises:
   i) assigning the data packet destined for the particular destination port a first class of service level;
   ii) assigning processor data destined for the microprocessor a second class of service level; and
   iii) sending the data packet and the processor data over an identical crossbar using a traffic shaping algorithm that treats traffic according to its class of service level.

8. The method of claim 1, further comprising
g) maintaining packet order at an egress from the cell-based switch fabric by:
   i) storing packets received from a first source in a first buffer;
   ii) storing a first indicator in a storage mechanism whenever one of the packets is stored in the first buffer;
   iii) storing packets received from a second source in a second buffer;
   iv) storing a second indicator on the storage mechanism whenever one of the packets is stored in the second buffer;
   v) removing packets from the first and second buffer using the indicators stored in the storage mechanism to determine whether a next packet is removed from the first or second buffer.

9. A data switch for switching a variable-length data packet comprising:
   a) a plurality of ports,
   b) a cell-based crossbar switching fabric in communication with the ports;
   c) an XOFF mask containing the status of each port on the data switch;
   d) a routing module having routing rules that determine routing information based on a header in the data packet;
   e) a queuing module that receives the routing information and stores data packets destined for a congested port in a deferred queue;
   f) a segmentation module that segments the data packet into at least a first and second fixed-size data cells, the first data cell containing a full data payload and the second data cell containing a partially filled data payload;
   g) a microprocessor;
   h) a memory subsystem for queuing data for submission to the crossbar switching fabric into a plurality of output queues having different classes of service for data directed to one of the ports and data directed to one of the microprocessors; and
   i) a virtual input queue mapping between a first virtual channel on an interswitch link and a subset of the plurality of output queues.

10. A data switch comprising:
    a) a plurality of ports receiving and transmitting variable-length data packets;
    b) a buffer in communication with at least one of the ports;
    c) a plurality of microprocessors that control the ports;
    d) a cell-based switch crossbar in communication with at least two of the ports;
    e) a routing means for determining a destination port for the data packets;
    f) a congestion indicator means indicating the congestion status of the plurality of ports;
    g) a deferred queuing means for avoiding head of line blocking in the buffer by storing a subset of the received data packets in a deferred queue;
    h) a cell segmentation means for segmenting one of the variable length data packets into a plurality of fixed-sized data cells;
    i) data transmission means for transmitting data cells over the crossbar, the data transmission means transmitting data to at least one of the ports and at least one of the microprocessors over the same crossbar; and
    j) interswitch link flow control means for providing flow control on a single virtual channel within an interswitch link communicating with the data switch.

11. The data switch of claim 10 wherein the congestion indicator means further comprises:
    i) an indicating means at each port for indicating the congestion status of the plurality of ports, and
    ii) a congestion signaling means for signaling a need to update the input indicating means with a new congestion status for at least one port.

12. The data switch of claim 10 wherein the deferred queuing means further comprises a queue controller means for directing the data packet to the deferred queue if the congestion status for the destination port of the data packet is congested and for directing the data packet to the destination port if the congestion status is non-congested.

13. The data switch of claim 10, wherein cell segmentation means further comprises:
    i) means for constructing a first data cell from the variable-length data packet, the first data cell containing a full data payload and a packet length value in the packet length field, the packet length value being set large enough to represent a maximum sized data packet,
    ii) means for establishing a path through the cell based switch fabric and associating with the path a duration determined by the packet length value,
    iii) means for constructing a second data cell from the variable-length data packet, the second data cell containing a partially filled data payload and a valid data value in the packet length field, the valid data value indicating the number of valid data bytes in the partially filled data payload, and
    iv) means for reconstructing the data packet at least in part from the transmitted first and second data cells, the reconstructed data packet containing data from the entire full data payload of the first data cell and the valid data bytes of the second data cell data payload.

14. The data switch of claim 10 wherein the interswitch link flow control means further comprises:
    i) means for establishing an interswitch link with an upstream switch, the interswitch link having a plurality of virtual channels;
    ii) means for determining a flow control status for each virtual channel in the interswitch link based on the congestion indicator means; and
    iii) means for communicating a change in flow control status for a particular virtual channel to the upstream switch.

* * * * *